United States Patent
Tao et al.

(10) Patent No.: US 12,382,423 B2
(45) Date of Patent: Aug. 5, 2025

(54) POSITIONING METHOD AND RELATED APPARATUS

(71) Applicant: Huawei Technologies Co., Ltd., Shenzhen (CN)

(72) Inventors: Zhenyu Tao, Shanghai (CN); Runze Zhou, Shanghai (CN); Bin Xu, Shanghai (CN); Jinping Hao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 18/173,446

(22) Filed: Feb. 23, 2023

(65) Prior Publication Data

US 2023/0209435 A1 Jun. 29, 2023

Related U.S. Application Data

(63) Continuation of application No. PCT/CN2021/114052, filed on Aug. 23, 2021.

(30) Foreign Application Priority Data

Aug. 25, 2020 (CN) .......................... 202010865853.7

(51) Int. Cl.
*H04W 64/00* (2009.01)
*H04W 36/00* (2009.01)
*H04W 36/32* (2009.01)

(52) U.S. Cl.
CPC ....... *H04W 64/00* (2013.01); *H04W 36/0055* (2013.01); *H04W 36/322* (2023.05)

(58) Field of Classification Search
None
See application file for complete search history.

(56) References Cited

U.S. PATENT DOCUMENTS

2020/0196101 A1* 6/2020 Edge .................... H04W 12/06

FOREIGN PATENT DOCUMENTS

| CN | 107306448 A | 10/2017 |
|----|-------------|---------|
| CN | 110636571 A | 12/2019 |

(Continued)

OTHER PUBLICATIONS

S2-186696, CATT, New Solution for KI#15: Location continuity support for N26 based Handovers, 3GPP TSG-SA2 Meeting #128, Jul. 2-6, 2018, Vilnius, Lithuania, 6 pages.

(Continued)

*Primary Examiner* — Suhail Khan
(74) *Attorney, Agent, or Firm* — Conley Rose, P.C.

(57) ABSTRACT

A positioning method, applied to a mobility management network element, includes when learning that a terminal device needs to be handed over from a first access network device to a second access network device, sending a first message to a location management network element, where the first message indicates to suspend positioning measurement on the terminal device, and when learning that the terminal device has been handed over to the second access network device, sending a second message to the location management network element, where the second message enables the location management network element to send a first positioning request, and the first positioning request requests to perform positioning measurement on the terminal device.

20 Claims, 17 Drawing Sheets

(56) References Cited

FOREIGN PATENT DOCUMENTS

| EP | 2890163 A1 | 7/2015 |
|---|---|---|
| EP | 2925052 A1 | 9/2015 |
| WO | 2011017898 A1 | 2/2011 |
| WO | 2019192389 A1 | 10/2019 |

OTHER PUBLICATIONS

S2-2005675, Huawei et al., Several FASMO corrections in TS 23.273, 3GPP TSG-WG SA2 Meeting #140E e-meeting, Elbonia, Aug. 19-Sep. 1, 2020, 13 pages.

R2-2006578, Huawei et al., Discussion on R17 Positioning enhancement, 3GPP TSG-RAN WG2 Meeting #111-e, Aug. 17-28, 2020, 10 pages.

Nokia et al., "Mobility Handling," SA WG2 Meeting #129, Oct. 15-19, 2018, Dongguan, China, S2-1810410, Oct. 9, 2018, 4 pages.

\* cited by examiner

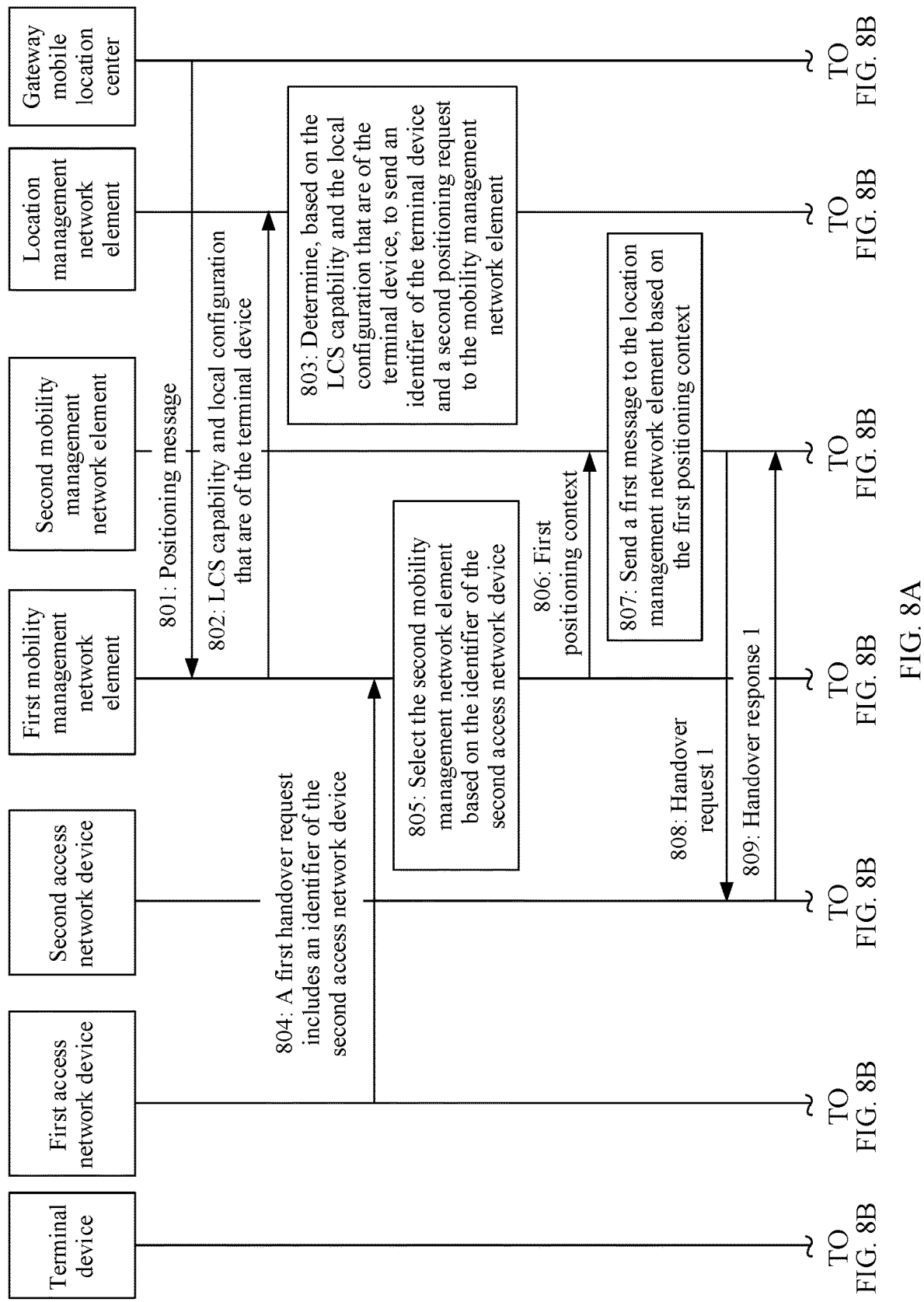

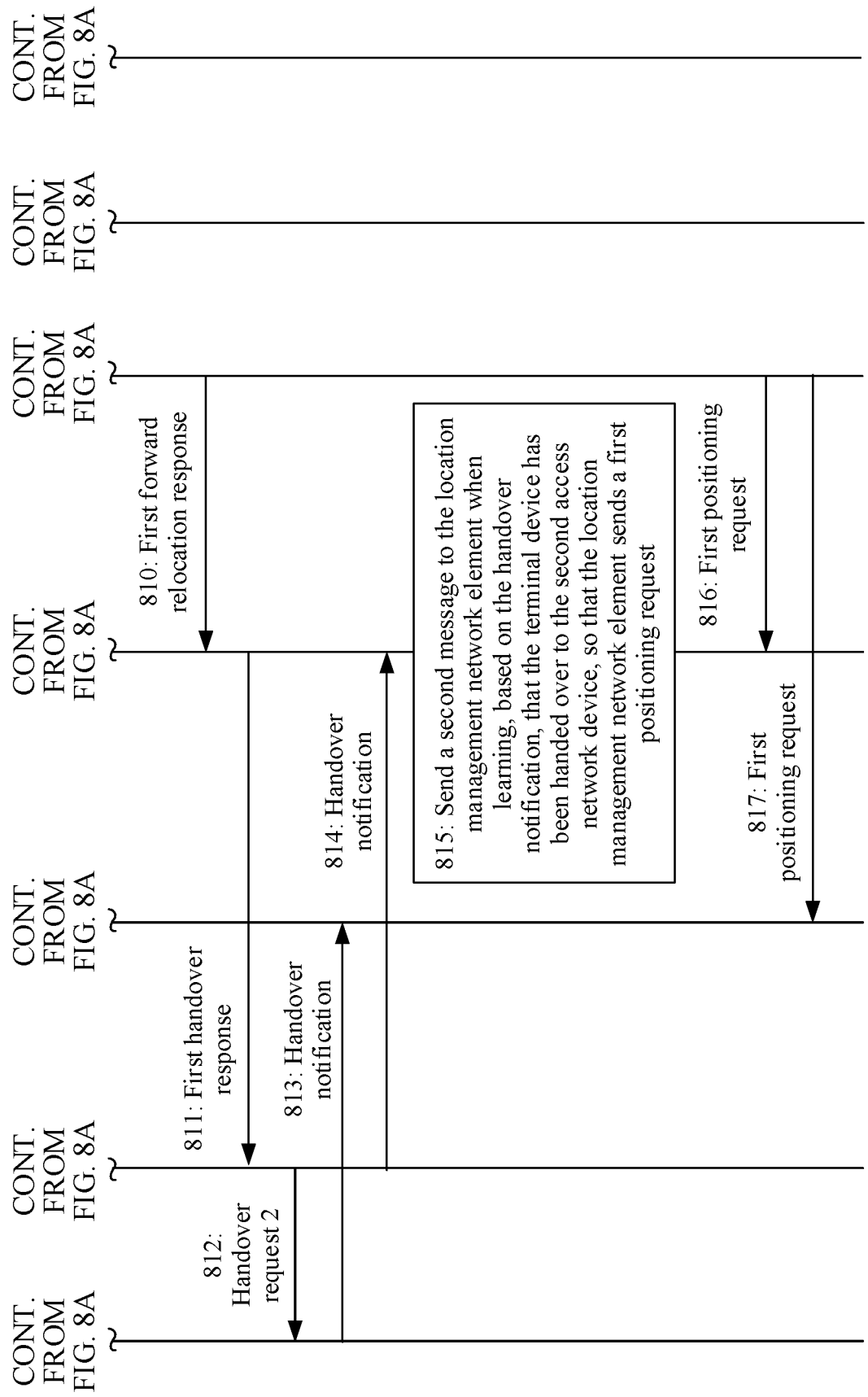

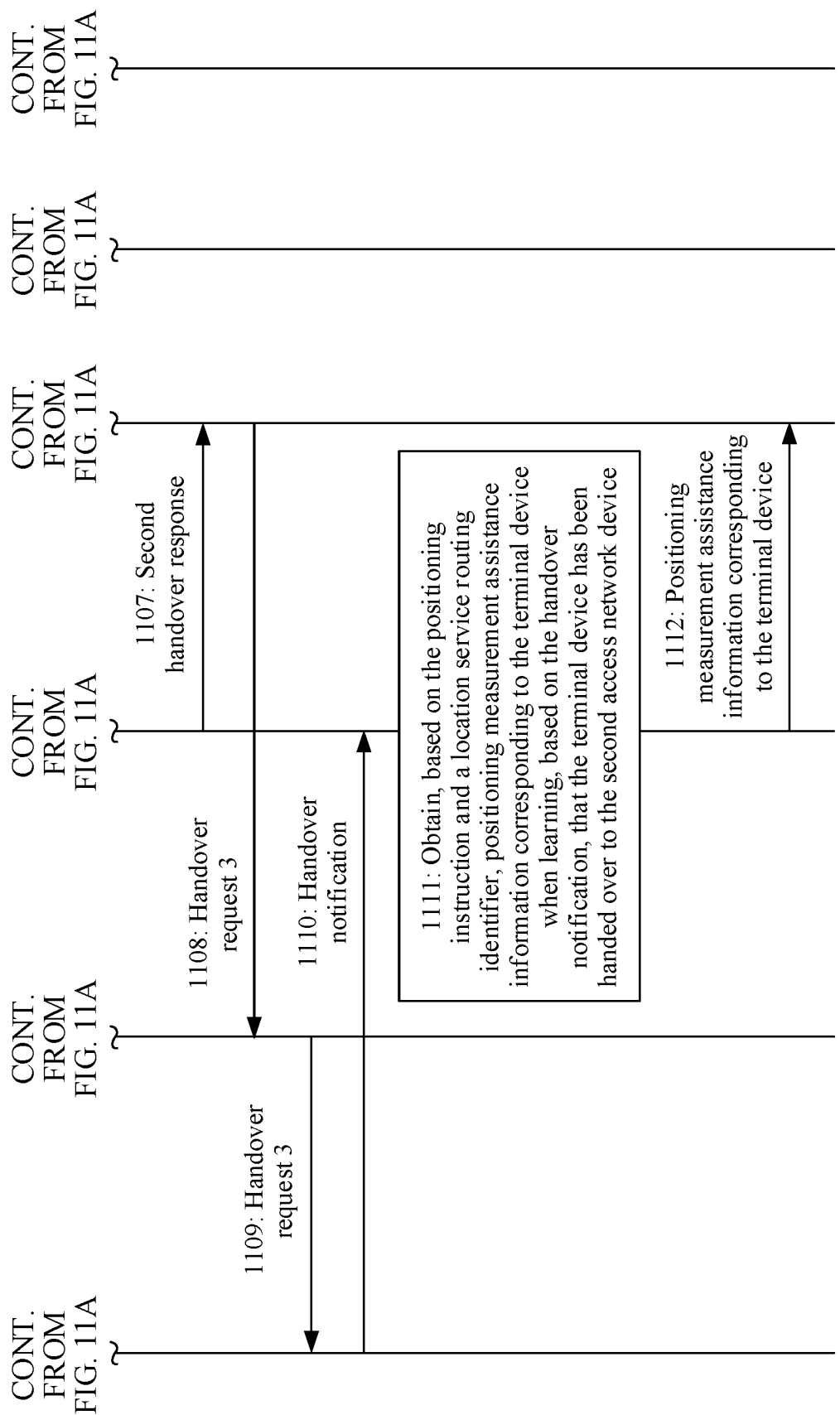

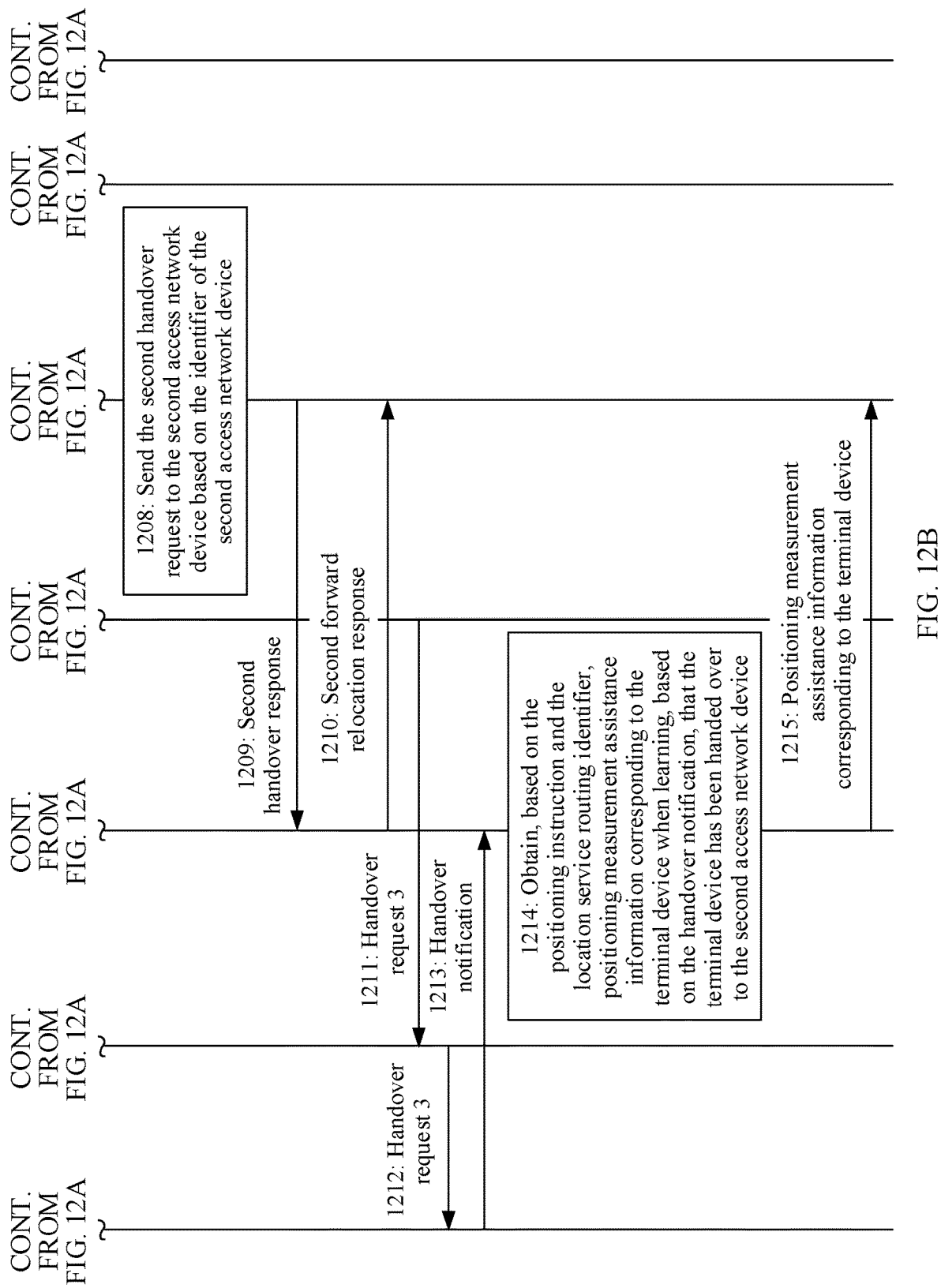

POSITIONING METHOD AND RELATED APPARATUS

CROSS-REFERENCE TO RELATED APPLICATIONS

This is a continuation of International Patent Application No. PCT/CN2021/114052 filed on Aug. 23, 2021, which claims priority to Chinese Patent Application No. 202010865853.7 filed on Aug. 25, 2020. The disclosures of the aforementioned applications are hereby incorporated by reference in their entireties.

TECHNICAL FIELD

This application relates to the field of communication technologies, and in particular, to a positioning method and a related apparatus.

BACKGROUND

Effective coverage of a base station usually ranges from several hundred meters to several thousand meters. For example, in an urban area, a penetration capability of radio signals is greatly attenuated because there are many buildings. As a result, the effective coverage of the base station is small. Therefore, the terminal device often moves across base stations in a communication process. However, in a network-assisted positioning procedure, a base station needs to assist a location management function (LMF) network element in completing positioning measurement on a terminal device. In this case, if the terminal device moves across base stations, the positioning measurement on the terminal device cannot be completed. Therefore, how to complete positioning measurement on the terminal device when a positioning process of the terminal device conflicts with a handover process needs to be resolved urgently.

SUMMARY

This application provides a positioning method and a related apparatus. Embodiments of this application are implemented to perform positioning measurement on a terminal device.

According to a first aspect, a positioning method is provided, where the method is applied to a mobility management network element, and the method includes sending a first message to a location management network element when learning that a terminal device needs to be handed over from a first access network device to a second access network device, where the first message indicates to suspend positioning measurement on the terminal device; and sending a second message to the location management network element when learning that the terminal device has been handed over to the second access network device, so that the location management network element sends a first positioning request, where the first positioning request requests to perform positioning measurement on the terminal device.

It can be learned that in the foregoing technical solution, when it is learned that the terminal device needs to be handed over from the first access network device to the second access network device, the first message is sent to the location management network element such that the positioning measurement on the terminal device is suspended. This avoids a problem that positioning measurement performed on the terminal device fails when positioning measurement performed on the terminal device conflicts with handover performed on the terminal device. Further, when it is learned that the terminal device has been handed over to the second access network device, the second message is sent to the location management network element, so that positioning measurement continues to be performed on the terminal device when the handover is completed.

In a possible implementation, if the mobility management network element is a first mobility management network element, before the sending a first message to a location management network element, the method further includes receiving, by the first mobility management network element, a second positioning request, where the second positioning request requests to perform positioning measurement on the terminal device; and receiving, by the first mobility management network element, a first handover request.

It can be learned that in the foregoing technical solution, the second positioning request and the first handover request are received, to determine that positioning measurement performed on the terminal device conflicts with handover performed on the terminal device such as to prepare for subsequent suspension of the positioning measurement on the terminal device.

In a possible implementation, receiving a first handover request includes receiving, by the first mobility management network element, the first handover request sent by the first access network device; or receiving, by the first mobility management network element, a path switch request sent by the second access network device.

It can be learned that in the foregoing technical solution, the handover request is obtained in a plurality of manners, to prepare for subsequently determining that positioning measurement performed on the terminal device conflicts with handover performed on the terminal device.

In a possible implementation, the first handover request includes an identifier of the second access network device, and the method further includes selecting, by the first mobility management network element, a second mobility management network element based on the identifier of the second access network device, where the first mobility management network element is a source mobility management network element, and the second mobility management network element is a target mobility management network element; and sending, by the first mobility management network element, a first positioning context to the second mobility management network element, where the first positioning context is determined after the first mobility management network element receives a positioning message from a gateway mobile location center.

It can be learned that in the foregoing technical solution, when determining that there is no connection to the second access network device, the first mobility management network element selects a new mobility management network element, and sends positioning related information to the new mobility management network element. Therefore, the new mobility management network element may implement the positioning measurement on the terminal device based on the positioning related information, to implement the positioning measurement on the terminal device when the mobility management network element changes.

In a possible implementation, if the mobility management network element is the second mobility management network element and the second mobility management network element is a target mobility management network element, sending a first message to a location management network element includes receiving, by the second mobility management network element, the first positioning context from the first mobility management network element, where the first mobility management network element is a source mobility management network element, and the first positioning context is determined after the first mobility management network element receives the positioning message from the gateway mobile location center; and sending, by the second mobility management network element, the first message to the location management network element based on the first positioning context.

It can be learned that in the foregoing technical solution, when the mobility management network element changes, the new mobility management network element may send the first message to the location management network element based on the context, to suspend the positioning measurement on the terminal device. This avoids a problem that positioning measurement performed on the terminal device fails when positioning measurement performed on the terminal device conflicts with handover performed on the terminal device.

In a possible implementation, the first positioning context includes at least one of a location service correlation identifier, a location service routing identifier, address information of the location management network element, an identifier of the location management network element, address information of the gateway mobile location center, a callback address of location information of the terminal device, an N1N2 notify subscription identifier, an N2 notify subscription identifier, a location service (LCS) client type, a LCS type, a LCS priority, a location quality of service, and a supported geographical area description shape.

It can be learned that in the foregoing technical solution, the positioning related information is sent to the new mobility management network element such that the new mobility management network element can implement the positioning measurement on the terminal device based on the positioning related information, to implement the positioning measurement on the terminal device when the mobility management network element changes.

In a possible implementation, the first positioning context further includes a location service suspension identifier, and sending, by the second mobility management network element, the first message to the location management network element based on the first positioning context of the terminal device includes sending, by the second mobility management network element, the first message to the location management network element based on the location service suspension identifier.

It can be learned that in the foregoing technical solution, after the mobility management network element changes, the new mobility management network element may send the first message to the location management network element, to suspend the positioning measurement on the terminal device. This avoids a problem that positioning measurement performed on the terminal device fails when positioning measurement performed on the terminal device conflicts with handover performed on the terminal device.

In a possible implementation, the method further includes sending a third message to the gateway mobile location center when learning that the terminal device needs to be handed over from the first access network device to the second access network device, where the third message enables the gateway mobile location center to stop a timer for waiting for a location response message, enables the gateway mobile location center to send a message requesting a location service client to defer returning location information, and enables the gateway mobile location center to enter a state of asynchronously waiting for the location information.

It can be learned that in the foregoing technical solution, when positioning measurement performed on the terminal device conflicts with handover performed on the terminal device, the timer for waiting for a location response message is stopped, to avoid a problem that the positioning measurement fails because the timer expires. In addition, the gateway mobile location center also enters the state of asynchronously waiting for the location information.

According to a second aspect, a positioning method is provided, where the method is applied to a mobility management network element, and the method includes sending a second message to a location management network element when learning that a terminal device has been handed over to a second access network device such that the location management network element sends a first positioning request, where the first positioning request requests to perform positioning measurement on the terminal device.

It can be learned that in the foregoing technical solution, when it is learned that the terminal device has been handed over to the second access network device, the second message is sent to the location management network element, to avoid a problem that positioning measurement performed on the terminal device fails when positioning measurement performed on the terminal device conflicts with handover performed on the terminal device such that positioning measurement continues to be performed on the terminal device when the handover is completed.

In a possible implementation, if the mobility management network element is a first mobility management network element, before the sending a second message to a location management network element, the method further includes receiving, by the first mobility management network element, a second positioning request, where the second positioning request requests to perform positioning measurement on the terminal device; and receiving, by the first mobility management network element, a first handover request.

It can be learned that in the foregoing technical solution, the second positioning request and the first handover request are received, to determine that positioning measurement performed on the terminal device conflicts with handover performed on the terminal device.

In a possible implementation, receiving a first handover request includes receiving, by the first mobility management network element, the first handover request sent by the first access network device; or receiving, by the first mobility management network element, a path switch request sent by the second access network device.

It can be learned that in the foregoing technical solution, the handover request is obtained in a plurality of manners, to prepare for subsequently determining that positioning measurement performed on the terminal device conflicts with handover performed on the terminal device.

In a possible implementation, the first handover request includes an identifier of the second access network device, and the method further includes selecting, by the first mobility management network element, a second mobility management network element based on the identifier of the second access network device, where the first mobility management network element is a source mobility management network element, and the second mobility management network element is a target mobility management network element; and sending, by the first mobility management network element, a first positioning context to the second mobility management network element, where the first positioning context is determined after the first mobility management network element receives a positioning message from a gateway mobile location center.

It can be learned that in the foregoing technical solution, when determining that there is no connection to the second access network device, the first mobility management network element selects a new mobility management network element, and sends positioning related information to the new mobility management network element. Therefore, the new mobility management network element may implement the positioning measurement on the terminal device based on the positioning related information, to implement the positioning measurement on the terminal device when the mobility management network element changes.

In a possible implementation, if the mobility management network element is the second mobility management network element and the second mobility management network element is a target mobility management network element, sending a second message to a location management network element includes receiving, by the second mobility management network element, the first positioning context from the first mobility management network element, where the first mobility management network element is a source mobility management network element, and the first positioning context is determined after the first mobility management network element receives the positioning message from the gateway mobile location center; and sending, by the second mobility management network element, the second message to the location management network element based on the first positioning context.

It can be learned that in the foregoing technical solution, when determining that there is no connection to the second access network device, the first mobility management network element selects a new mobility management network element, and sends positioning related information to the new mobility management network element. Therefore, the new mobility management network element may send the second message to the location management network element based on the positioning related information, to implement the positioning measurement on the terminal device, that is, implement the positioning measurement on the terminal device when the mobility management network element changes.

In a possible implementation, the first positioning context includes at least one of the following: a location service correlation identifier, a location service routing identifier, address information of the location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, and a supported geographical area description shape.

It can be learned that in the foregoing technical solution, the positioning related information is sent to the new mobility management network element such that the new mobility management network element can implement the positioning measurement on the terminal device based on the positioning related information, to implement the positioning measurement on the terminal device when the mobility management network element changes.

In a possible implementation, the method further includes sending a third message to the gateway mobile location center when learning that the terminal device needs to be handed over from the first access network device to the second access network device, where the third message enables the gateway mobile location center to stop a timer for waiting for a location response message, enables the gateway mobile location center to send a message requesting a location service client to defer returning location information, and enables the gateway mobile location center to enter a state of asynchronously waiting for the location information.

It can be learned that in the foregoing technical solution, when positioning measurement performed on the terminal device conflicts with handover performed on the terminal device, the timer for waiting for a location response message is stopped, to avoid a problem that the positioning measurement fails because the timer expires. In addition, the gateway mobile location center also enters the state of asynchronously waiting for the location information.

According to a third aspect, a positioning method is provided, where the method is applied to a location management network element, and the method includes sending a second positioning request to a first mobility management network element, where the second positioning request requests to perform positioning measurement on a terminal device; when the terminal device needs to be handed over from a first access network device to a second access network device, receiving a first message, and suspending the positioning measurement on the terminal device based on the first message; and when the terminal device has been handed over to the second access network device, receiving a second message, and sending a first positioning request based on the second message, where the first positioning request requests to perform positioning measurement on the terminal device.

It can be learned that in the foregoing technical solution, when the terminal device needs to be handed over from the first access network device to the second access network device, the first message received, and the positioning measurement on the terminal device is suspended based on the first message, to avoid a problem that positioning measurement performed on the terminal device fails when positioning measurement performed on the terminal device conflicts with handover performed on the terminal device. In addition, when the terminal device has been handed over to the second access network device, the second message is received, and the first positioning request is sent based on the second message such that positioning measurement continues to be performed on the terminal device when the handover is completed.

In a possible implementation, receiving the first message includes receiving the first message sent by the first mobility management network element; or receiving the first message sent by a second mobility management network element, where the first mobility management network element is a source mobility management network element, and the second mobility management network element is a target mobility management network element.

It can be learned that in the foregoing technical solution, the first message is obtained in a plurality of manners, to prepare for subsequently suspending the positioning measurement on the terminal device based on the first message. In a possible implementation, receiving the second message includes receiving the second message sent by the first mobility management network element; or receiving the second message sent by the second mobility management network element, where the first mobility management network element is a source mobility management network element, and the second mobility management network element is a target mobility management network element.

It can be learned that in the foregoing technical solution, the second message is obtained in a plurality of manners, to prepare for subsequent sending of the first positioning request to continue to perform positioning measurement on the terminal device.

In a possible implementation, sending a first positioning request based on the second message includes sending the first positioning request to the first mobility management network element based on the second message; or send the first positioning request to the second mobility management network element based on the second message.

It can be learned that in the foregoing technical solution, the first positioning request is sent in a plurality of manners, to prepare for subsequently continuing to perform positioning measurement on the terminal device.

In a possible implementation, the method further includes receiving a location service correlation identifier and a location service routing identifier that are sent by the second mobility management network element; and learning, based on the location service correlation identifier and the location service routing identifier, that the second mobility management network element is an authorized network element that provides a service for the terminal device or that the terminal device has been handed over from the first mobility management network element to the second mobility management network element.

It can be learned that in the foregoing technical solution, when the mobility management network element changes, the location management network element learns that the new mobility management network element is the authorized network element, to avoid a problem that the location management network element does not process information from the new mobility learns that the mobile network element that provides the service for the terminal device has changed.

According to a fourth aspect, a positioning method is provided, where the method is applied to a second access network device, and the method includes receiving a second handover request when a terminal device needs to be handed over from a first access network device to the second access network device, where the second handover request includes a positioning instruction and a location service routing identifier, the positioning instruction is used to obtain positioning measurement assistance information, and the location service routing identifier is an identifier used to identify a current positioning measurement task that is of the positioned terminal device and that is performed between a first mobility management network element and the first access network device; obtaining, based on the positioning instruction and the location service routing identifier, the positioning measurement assistance information corresponding to the terminal device when learning that the terminal device has been handed over to the second access network device; and sending the positioning measurement assistance information corresponding to the terminal device.

It can be learned that in the foregoing technical solution, when the terminal device needs to be handed over from the first access network device to the second access network device, the second handover request is received, where the second handover request includes the positioning instruction and the location service routing identifier such that it is determined that positioning measurement performed on the terminal device conflicts with handover performed on the terminal device. Further, when it is learned that the handover is completed, the positioning measurement assistance information corresponding to the terminal device is obtained based on the positioning instruction and the location service routing identifier, to prepare for subsequently continuing to perform positioning measurement on the terminal device. In addition, a problem that positioning measurement performed on the terminal device fails when positioning measurement performed on the terminal device conflicts with handover performed on the terminal device is also avoided.

In a possible implementation, receiving the second handover request includes receiving the second handover request sent by the first access network device; receiving the second handover request sent by the first mobility management network element; or receiving the second handover request sent by a second mobility management network element, where the first mobility management network element is a source mobility management network element, and the second mobility management network element is a target mobility management network element.

It can be learned that in the foregoing technical solution, the second handover request is obtained in a plurality of manners, to prepare for determining that positioning measurement performed on the terminal device conflicts with handover performed on the terminal device.

In a possible implementation, sending the positioning measurement assistance information corresponding to the terminal device includes sending, to the first mobility management network element, the positioning measurement assistance information corresponding to the terminal device; or sending, to the second mobility management network element, the positioning measurement assistance information corresponding to the terminal device.

It can be learned that in the foregoing technical solution, the positioning measurement assistance information corresponding to the terminal device is sent to the first mobility management network element or the second mobility management network element, to prepare for subsequently sending, by the first mobility management network element or the second mobility management network element, the positioning measurement assistance information corresponding to the terminal device to a location management network element.

According to a fifth aspect, a positioning method is provided, where the method is applied to a first access network device, and the method includes receiving a positioning instruction and a location service routing identifier from a first mobility management network element, where the positioning instruction is used to obtain positioning measurement assistance information, and the location service routing identifier is an identifier used to identify a current positioning measurement task that is of a positioned terminal device and that is performed between the first mobility management network element and the first access network device; and sending a second handover request when learning that the terminal device needs to be handed over from the first access network device to a second access network device, where the second handover request includes the positioning instruction and the location service routing identifier.

It can be learned that in the foregoing technical solution, the positioning instruction and the location service routing identifier are received from the first mobility management network element, and it is learned that the terminal device prepares to be handed over from the first access network device to the second access network device, to determine that positioning measurement performed on the terminal device conflicts with handover performed on the terminal device. Further, the second handover request is sent, to prepare for subsequently obtaining the positioning measurement assistance information corresponding to the terminal device and continuing to perform positioning measurement on the terminal device. In addition, a problem that positioning measurement performed on the terminal device fails when positioning measurement performed on the terminal device conflicts with handover performed on the terminal device is also avoided.

In a possible implementation, sending the second handover request includes sending the second handover request to the second access network device; or sending the second handover request via the first mobility management network element.

It can be learned that the second handover request is sent in a plurality of manners, to prepare for subsequently obtaining the positioning measurement assistance information corresponding to the terminal device and continuing to perform positioning measurement on the terminal device.

According to a sixth aspect, a positioning method is provided, where the method is applied to a mobility management network element, and the method includes receiving a positioning instruction and a location service routing identifier from a first access network device, where the positioning instruction is used to obtain positioning measurement assistance information, and the location service routing identifier is an identifier used to identify a current positioning measurement task that is of a positioned terminal device and that is performed between a first mobility management network element and the first access network device; and sending a second handover request to a second access network device, where the second handover request includes the positioning instruction and the location service routing identifier.

It can be learned that in the foregoing technical solution, the positioning instruction and the location service routing identifier are received from the first access network device, and the second handover request is sent to the second access network device, to prepare for subsequent obtaining of the positioning measurement assistance information corresponding to the terminal device, and continuing to perform positioning measurement on the terminal device.

In a possible implementation, if the mobility management network element is the first mobility management network element, the first mobility management network element is a source mobility management network element, and the second handover request includes an identifier of the second access network device, the method further includes: selecting, by the first mobility management network element, a second mobility management network element based on the identifier of the second access network device, where the second mobility management network element is a target mobility management network element; and sending, by the first mobility management network element, the positioning instruction, the location service routing identifier, and a second positioning context to the second mobility management network element, where the second positioning context is determined after the first mobility management network element receives a positioning message from a gateway mobile location center.

It can be learned that in the foregoing technical solution, when determining that there is no connection to the second access network device, the first mobility management network element selects a new mobility management network element, and sends positioning related information to the new mobility management network element. Therefore, the new mobility management network element may send the second handover request to the second access network device based on the positioning related information, to send the second handover request to the second access network device when the mobility management network element changes, and prepare for subsequently obtaining of the positioning measurement assistance information corresponding to the terminal device and continuing to perform positioning measurement on the terminal device.

In a possible implementation, the second positioning context includes at least one of a location service correlation identifier, address information of a location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, and a supported geographical area description shape.

It can be learned that in the foregoing technical solution, the positioning related information is sent to the new mobility management network element, so that the new mobility management network element may send the second handover request to the second access network device based on the positioning related information. In this way, the second handover request is sent to the second access network device when the mobility management network element changes, to prepare for subsequently obtaining of the positioning measurement assistance information corresponding to the terminal device and continuing to perform positioning measurement on the terminal device.

In a possible implementation, if the mobility management network element is the second mobility management network element and the second mobility management network element is a target mobility management network element, the method further includes sending, by the second mobility management network element, the location service correlation identifier and the location service routing identifier to the location management network element, so that the location management network element learns that the second mobility management network element is an authorized network element that provides a service for the terminal device or that the terminal device has been handed over from the first mobility management network element to the second mobility management network element.

It can be learned that in the foregoing technical solution, when the mobility management network element changes, the location management network element learns that the new mobility management network element is the authorized network element, to avoid a problem that the location management network element does not process information from the new mobility management network element. In addition, the location management network element instantly learns that the mobile network element that provides the service for the terminal device has changed.

According to a seventh aspect, a mobility management network element is provided. The mobility management network element includes a processing module and a transceiver module, where the processing module is configured to learn that a terminal device needs to be handed over from a first access network device to a second access network device, and learn that the terminal device has been handed over to the second access network device; and the transceiver module is configured to send a first message to a location management network element, where the first message indicates to suspend positioning measurement on the terminal device; and send a second message to the location management network element such that the location management network element sends a first positioning request, and the first positioning request requests to perform positioning measurement on the terminal device.

In a possible implementation, if the mobility management network element is a first mobility management network element, before sending the first message to the location management network element, the transceiver module is further configured to receive a second positioning request, where the second positioning request requests to perform positioning measurement on the terminal device; and receive a first handover request.

In a possible implementation, when receiving the first handover request, the transceiver module is configured to receive the first handover request sent by the first access network device, or receive a path switch request sent by the second access network device.

In a possible implementation, the first handover request includes an identifier of the second access network device, the processing module is further configured to select a second mobility management network element based on the identifier of the second access network device, where the first mobility management network element is a source mobility management network element, and the second mobility management network element is a target mobility management network element; and the transceiver module is further configured to send a first positioning context to the second mobility management network element, where the first positioning context is determined after the first mobility management network element receives a positioning message from a gateway mobile location center.

In a possible implementation, the first positioning context includes at least one of a location service correlation identifier, a location service routing identifier, address information of the location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, and a supported geographical area description shape.

In a possible implementation, the first positioning context further includes a location service suspension identifier, and when the second mobility management network element sends the first message to the location management network element based on the first positioning context of the terminal device, the transceiver module is configured to send the first message to the location management network element based on the location service suspension identifier.

In a possible implementation, the processing module is configured to learn that the terminal device needs to be handed over from the first access network device to the second access network device; and the transceiver module is configured to send a third message to the gateway mobile location center, where the third message enables the gateway mobile location center to stop a timer for waiting for a location response message, enables the gateway mobile location center to send a message requesting a location service client to defer returning location information, and enables the gateway mobile location center to enter a state of asynchronously waiting for the location information.

According to an eighth aspect, a location management network element is provided. The location management network element includes a transceiver module and a processing module, where the transceiver module is configured to send a second positioning request to a first mobility management network element, where the second positioning request requests to perform positioning measurement on a terminal device; receive a first message when the terminal device needs to be handed over from a first access network device to a second access network device; the processing module is configured to suspend positioning measurement on the terminal device based on the first message; and the transceiver module is configured to: when the terminal device has been handed over to the second access network device, receive a second message, and send a first positioning request based on the second message, where the first positioning request requests to perform positioning measurement on the terminal device.

In a possible implementation, when receiving the first message, the transceiver module is configured to receive the first message sent by the first mobility management network element; or receive the first message sent by a second mobility management network element, where the first mobility management network element is a source mobility management network element, and the second mobility management network element is a target mobility management network element.

In a possible implementation, when receiving the second message, the transceiver module is configured to receive the second message sent by the first mobility management network element; or receive the second message sent by the second mobility management network element, where the first mobility management network element is a source mobility management network element, and the second mobility management network element is a target mobility management network element.

In a possible implementation, when sending the first positioning request based on the second message, the transceiver module is configured to send the first positioning request to the first mobility management network element based on the second message; or send the first positioning request to the second mobility management network element based on the second message.

In a possible implementation, the transceiver module is further configured to receive a location service correlation identifier and a location service routing identifier that are sent by the second mobility management network element; and the processing module is further configured to learn, based on the location service correlation identifier and the location service routing identifier, that the second mobility management network element is an authorized network element that provides a service for the terminal device or that the terminal device has been handed over from the first mobility management network element to the second mobility management network element.

According to a ninth aspect, a second access network device is provided. The second access network device includes a transceiver module and a processing module, where the transceiver module is configured to receive a second handover request when a terminal device needs to be handed over from a first access network device to the second access network device, where the second handover request includes a positioning instruction and a location service routing identifier, the positioning instruction is used to obtain positioning measurement assistance information, and the location service routing identifier is an identifier used to identify a current positioning measurement task that is of the positioned terminal device and that is performed between a first mobility management network element and the first access network device; the processing module is configured to obtain, based on the positioning instruction and the location service routing identifier, the positioning measurement assistance information corresponding to the terminal device when learning that the terminal device has been handed over to the second access network device; and the transceiver module is configured to send the positioning measurement assistance information corresponding to the terminal device.

In a possible implementation, when receiving the second handover request, the transceiver module is configured to receive the second handover request sent by the first access network device; receive the second handover request sent by the first mobility management network element; or receive the second handover request sent by a second mobility management network element, where the first mobility management network element is a source mobility management network element, and the second mobility management network element is a target mobility management network element.

In a possible implementation, when sending the positioning measurement assistance information corresponding to the terminal device, the transceiver module is configured to send, to the first mobility management network element, the positioning measurement assistance information corresponding to the terminal device; or send, to the second mobility management network element, the positioning measurement assistance information corresponding to the terminal device.

According to a tenth aspect, a first access network device is provided. The first access network device includes a transceiver module and a processing module, where the transceiver module is configured to receive a positioning instruction and a location service routing identifier from a first mobility management network element, where the positioning instruction is used to obtain positioning measurement assistance information, and the location service routing identifier is an identifier used to identify a current positioning measurement task that is of a positioned terminal device and that is performed between the first mobility management network element and the first access network device; the processing module is configured to learn that the terminal device needs to be handed over from the first access network device to a second access network device; and the transceiver module is configured to send a second handover request, where the second handover request includes the positioning instruction and the location service routing identifier.

In a possible implementation, when sending the second handover request, the transceiver module is configured to send the second handover request to the second access network device; or send the second handover request via the first mobility management network element.

According to an eleventh aspect, a mobility management network element is provided. The mobility management network element includes a transceiver module, where the transceiver module is configured to receive a positioning instruction and a location service routing identifier from a first access network device, where the positioning instruction is used to obtain positioning measurement assistance information, and the location service routing identifier is an identifier used to identify a current positioning measurement task that is of a positioned terminal device and that is performed between a first mobility management network element and the first access network device; and send a second handover request to a second access network device, where the second handover request includes the positioning instruction and the location service routing identifier.

In a possible implementation, the mobility management network element further includes a processing module, and if the mobility management network element is the first mobility management network element, the first mobility management network element is a source mobility management network element, and the second handover request includes an identifier of the second access network device, the processing module is further configured to select a second mobility management network element based on the identifier of the second access network device, where the second mobility management network element is a target mobility management network element; and the transceiver module is further configured to send the positioning instruction, the location service routing identifier, and a second positioning context to the second mobility management network element, where the second positioning context is determined after the first mobility management network element receives a positioning message from a gateway mobile location center.

In a possible implementation, the second positioning context includes at least one of a location service correlation identifier, address information of a location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, and a supported geographical area description shape.

In a possible implementation, if the mobility management network element is the second mobility management network element and the second mobility management network element is a target mobility management network element, the transceiver module is further configured to send the location service correlation identifier and the location service routing identifier to the location management network element such that the location management network element learns that the second mobility management network element is an authorized network element that provides a service for the terminal device or that the terminal device has been handed over from the first mobility management network element to the second mobility management network element.

According to a twelfth aspect, a mobility management network element is provided, and includes a processor, a memory, an input interface, and an output interface. The input interface is configured to receive information from another communication apparatus other than the mobility management network element. The output interface is configured to output information to the other communication apparatus other than the mobility management network element. The processor invokes a computer program stored in the memory to implement the method according to any one of the possible implementations of the first aspect or the fifth aspect.

In a possible design, the mobility management network element may be a chip that implements the method in the first aspect or the fifth aspect or a device that includes the chip.

According to a thirteenth aspect, a location management network element is provided, and includes a processor, a memory, an input interface, and an output interface. The input interface is configured to receive information from another communication apparatus other than the location management network element. The output interface is configured to output information to the other communication apparatus other than the location management network element. The processor invokes a computer program stored in the memory to implement the method according to any one of the possible implementations of the second aspect.

In a possible design, the location management network element may be a chip that implements the method in the second aspect or a device that includes the chip.

According to a fourteenth aspect, a second access network device is provided, and includes a processor, a memory, an input interface, and an output interface. The input interface is configured to receive information from another communication apparatus other than the second access network device. The output interface is configured to output information to the other communication apparatus other than the second access network device. The processor invokes a computer program stored in the memory to implement the method according to any one of the possible implementations of the third aspect.

In a possible design, the second access network device may be a chip that implements the method in the third aspect or a device that includes the chip.

According to a fifteenth aspect, a first access network device is provided, and includes a processor, a memory, an input interface, and an output interface. The input interface is configured to receive information from another communication apparatus other than the first access network device. The output interface is configured to output information to the other communication apparatus other than the first access network device. The processor invokes a computer program stored in the memory to implement the method according to any one of the possible implementations of the fourth aspect.

In a possible design, the first access network device may be a chip that implements the method in the fourth aspect or a device that includes the chip.

According to a sixteenth aspect, a computer-readable storage medium is provided, and stores a computer program. When the computer program is run, the method according to any one of the possible implementations of the first aspect is implemented, the method according to any one of the possible implementations of the second aspect is implemented, the method according to any one of the possible implementations of the third aspect is implemented, the method according to any one of the possible implementations of the fourth aspect is implemented, or the method according to any one of the possible implementations of the fifth aspect is implemented.

According to a seventeenth aspect, an embodiment of this application provides a computer program product. When a computer reads and executes the computer program product, the computer is enabled to perform the method according to any one of the possible implementations of the first aspect, implement the method according to any one of the possible implementations of the second aspect, implement the method according to any one of the possible implementations of the third aspect, implement the method according to any one of the possible implementations of the fourth aspect, or implement the method according to any one of the possible implementations of the fifth aspect.

According to an eighteenth aspect, a communication system is provided, and includes any one of the foregoing mobility management network elements, and/or any location management network element, and/or any first access network device, and/or any second access network device.

BRIEF DESCRIPTION OF DRAWINGS

The following briefly describes the accompanying drawings used in descriptions of embodiments or the conventional technology.

FIG. 8A and FIG. 8B are a schematic diagram of still another positioning method according to an embodiment of this application;

FIG. 11A and FIG. 11B are a schematic diagram of a further positioning method according to an embodiment of this application;

FIG. 12A and FIG. 12B are a schematic diagram of a still further positioning method according to an embodiment of this application;

DESCRIPTION OF EMBODIMENTS

Figure 1:
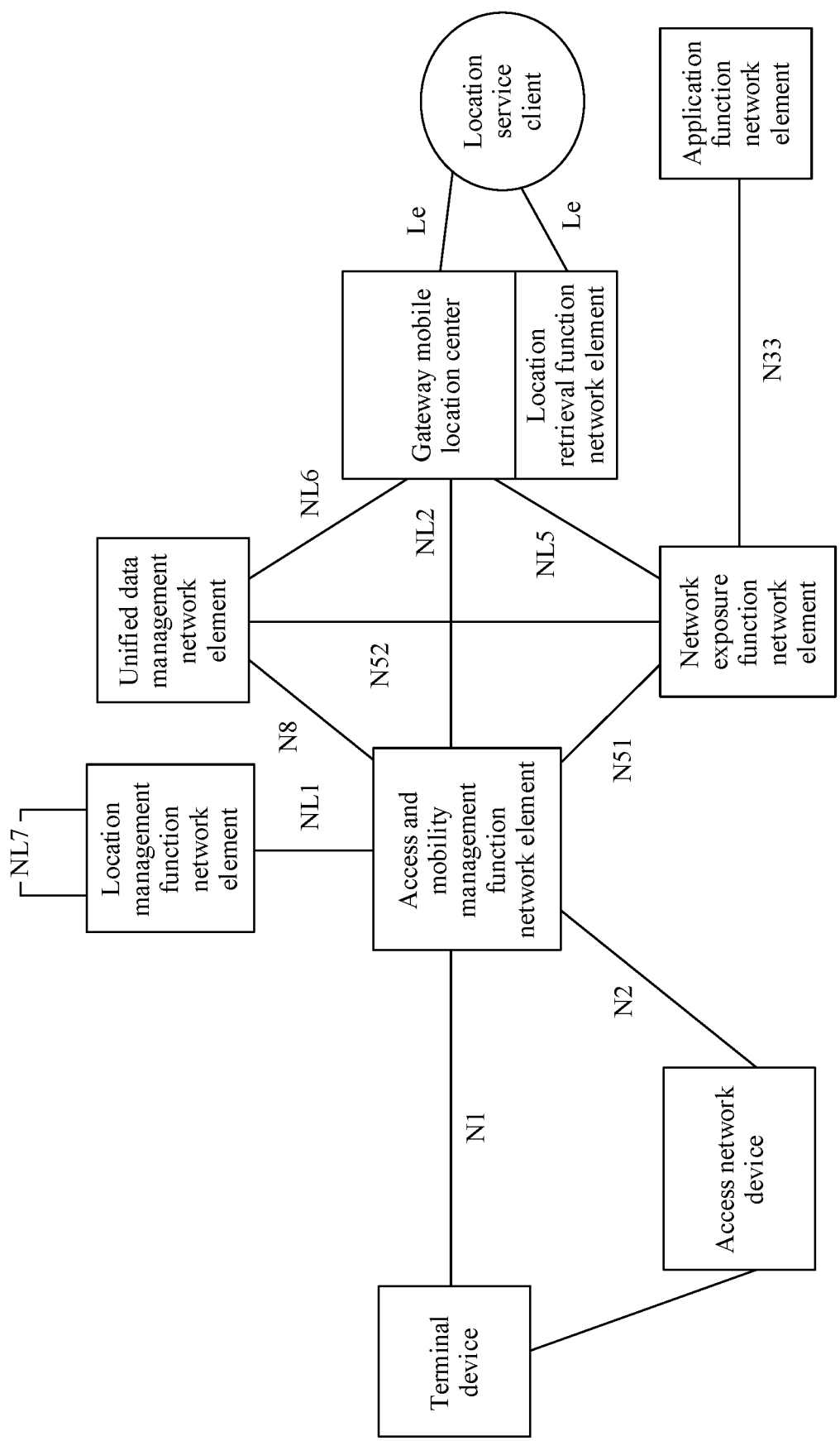
FIG. 1 is a diagram of a location service architecture of a fifth-generation (5G) network in a non-roaming scenario according to an embodiment of this application.

The following describes technical solutions in embodiments of this application with reference to the accompanying drawings in embodiments of this application.

It should be understood that the terms "system" and "network" may be used interchangeably in embodiments of this application. "At least one" means one or more, and "a plurality of" means two or more. A term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one item (piece) of the following" or a similar expression thereof means any combination of these items, including a singular item (piece) or any combination of plural items (pieces). For example, at least one of a, b, or c may indicate: a; b; c; a and b; a and c; b and c; or a, b, and c; where a, b, and c may be singular or plural. The singular expression forms "one", "a", "the", "the foregoing", "this", and "the one" are also intended to include an expression form such as "one or more", unless the opposite is explicitly indicated in the context thereof. In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first positioning request and a second positioning request are merely used to distinguish between different positioning request information, but do not indicate different priorities, importance degrees, or the like of these two types of positioning requests.

Reference to "an embodiment", "some embodiments", or the like described in embodiments of this application means that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

It should be understood that the technical solutions in embodiments of this application may be applied to a 5G mobile communication technology, and may also be applied to another future communication system, for example, a sixth-generation (6G) communication system. In the future communication system, functions may remain the same, but their name may change.

For ease of understanding this application, related technical knowledge included in embodiments of this application is described herein.

In embodiments of this application, a positioning request or a positioning instruction is information used to request a positioning measurement task for a specific terminal. The positioning measurement service may be an immediate request (location immediate request (LIR)) service or a location deferred request (LDR) service. Through the positioning measurement service, a mobile communication network may notify location information of a terminal or a location-related positioning event to a requester, namely, a positioning requester, of the positioning measurement service. A positioning server or a location management network element may be configured to manage a positioning request for the specific terminal. Specifically, managing the positioning request means that the positioning server or the location management network element may be configured to: based on the positioning request sent by the positioning requester, feed back the location information of the terminal to the positioning requester or indicate, to the positioning requester, a positioning event that the terminal appears in a positioning request indication.

The immediate request service is a positioning service for "an immediate request and an immediate response", and a positioning request may include an LIR. In embodiments of this application, the positioning requester sends the LIR to a network element such as a mobility management network element or a gateway mobile location center in a core network in which the terminal is located, and the mobility management network element or the gateway mobile location center forwards the LIR to the positioning server or another network element such as a location management network element in the core network, so that the positioning server or the location management network element immediately feeds back the location information of the terminal to the positioning requester based on the LIR.

The location deferred request service is deferrable. This means that the positioning requester subscribes to a positioning report of the terminal from the terminal, a network element in the core network in which the terminal is located, or another related network element, and the report may be triggered after a specific positioning event is met. For example, the positioning event is that the terminal moves out of or moves to an area, that a moving distance of the terminal reaches a threshold distance, or that a preset reporting periodicity is met. The report may carry the location information of the terminal, and/or the report may indicate that the location event is met. For example, the report indicates that the terminal moves out of or moves to an area.

The location information of the terminal may be obtained, through calculation and based on the positioning measurement task, by a network element such as the location management network element or the positioning server in the core network in which the terminal is located. Specifically, for example, the location management network element or the positioning server may obtain, through calculation, the location information of the terminal based on positioning request information sent by the positioning requester and positioning measurement data reported by the terminal, and feed back the location information of the terminal to the positioning requester. Specifically, the location management network element or the positioning server may generate the foregoing positioning event report based on the location information. The location information of the terminal may be geographical location coordinates in a location system (for example, a Global Positioning System (GPS) or a BeiDou navigation satellite system).

In embodiments of this application, the terminal is an object of the positioning measurement task requested by the positioning requester. For example, in a 3rd Generation Partnership Project (3GPP) specification, a secure user plane location enabled terminal (SET) is a client of a location service. In other words, an object, for example, an Android smartphone, of the positioning measurement task requested by the positioning requester is the terminal defined in the 3GPP. A network element such as a location management function (LMF) network element or the positioning server in the core network in which the terminal is located may provide, based on the positioning request of the positioning requester, the location information of the terminal for the positioning requester, or notify the positioning requester that the terminal has met a positioning event indicated by the positioning request.

In embodiments of this application, the positioning requester is a communication device that provides the positioning measurement task for the terminal to a network element such as the location management network element or the positioning server in the core network. The positioning requester may be a terminal, or may be an external client having a positioning requirement, for example, a server, a network element in a wireless communication network, or another carrier having a requirement for positioning a location of the terminal. For example, a secure user plane location (SUPL) agent is an application program, namely, a location service client defined in the 3GPP, that needs to obtain location information. The SUPL agent may run in the SET, or may run in a SUPL network. If the SUPL agent runs in the SET, the positioning requester is the terminal. If the SUPL agent runs in the SUPL network, the positioning requester is the external client having a positioning requirement.

In embodiments of this application, the positioning server is deployed in a multi-access edge computing (MEC) manner, and may be a MEC platform or a server. A specific deployment form of the positioning server is not limited in this application. Further, the positioning server may be deployed on a cloud, or may be an independent computer device, a chip, or the like. The positioning server may directly exchange data with a terminal via a user plane. For example, the SUPL is a positioning protocol defined by an operation, administration, and maintenance (OAM) organization. The positioning server may interact with the terminal via the user plane based on the SUPL protocol. To be specific, the terminal may transmit an SUPL packet via the user plane. The SUPL packet may encapsulate information such as the positioning request and the positioning measurement data that are reported by the terminal and a positioning request or a positioning instruction delivered by the positioning server to the terminal.

Further, in a non-roaming scenario, a location service architecture of a 5G network may include a terminal device, an access network device, a LCS client, an access and mobility management function (AMF) network element, a LMF network element, a unified data management (UDM) network element, a gateway mobile location center (GMLC) network element, a location retrieval function (LRF) network element, a network exposure function (NEF) network element, and an application function (AF) network element. The Gateway Mobile Location Centre (GMLC) network element and the LRF network element may be deployed in a converged manner, or may be deployed independently. Further, when the LMF network element is not deployed, the AMF network element and the GMLC network element may be used to implement positioning.

Further, FIG. 1 is a diagram of a location service architecture of a 5G network in a non-roaming scenario according to an embodiment of this application. As shown in FIG. 1, it can be learned that a terminal device may be connected to an AMF network element, and an access network device may also be connected to the AMF network element. The AMF network element may be connected to a UDM network element, an LMF network element, a NEF network element, and a GMLC network element. The UDM network element may be connected to the NEF network element and the GMLC network element. The NEF network element may be connected to an AF network element and the GMLC network element. An LCS client may be connected to the GMLC network element and an LRF network element. Further, an N1 interface is a reference point between the terminal device and the AMF network element. An N2 interface is a reference point between the access network device and the AMF network element, and is configured to send a non-access stratum (NAS) message, a next generation application protocol (NGAP) message, and the like. An NL1 interface is a reference point between the AMF network element and the LMF network element. An N8 interface is a reference point between the AMF network element and the UDM network element. An NL2 interface is a reference point between the AMF network element and the GMLC network element. An N51 interface is a reference point between the AMF network element and the NEF network element. An NL7 interface is a reference point between the LMF network element and another LMF network element. An N52 interface is a reference point between the UDM network element and the NEF network element. An NL6 interface is a reference point between the UDM network element and the GMLC network element. An NL5 interface is a reference point between the NEF network element and the GMLC network element. An N33 interface is a reference point between the NEF network element and the AF network element. A Le interface may be a reference point between the LCS client and the GMLC network element, or may be a reference point between the LCS client and the LRF network element.

Figure 2:
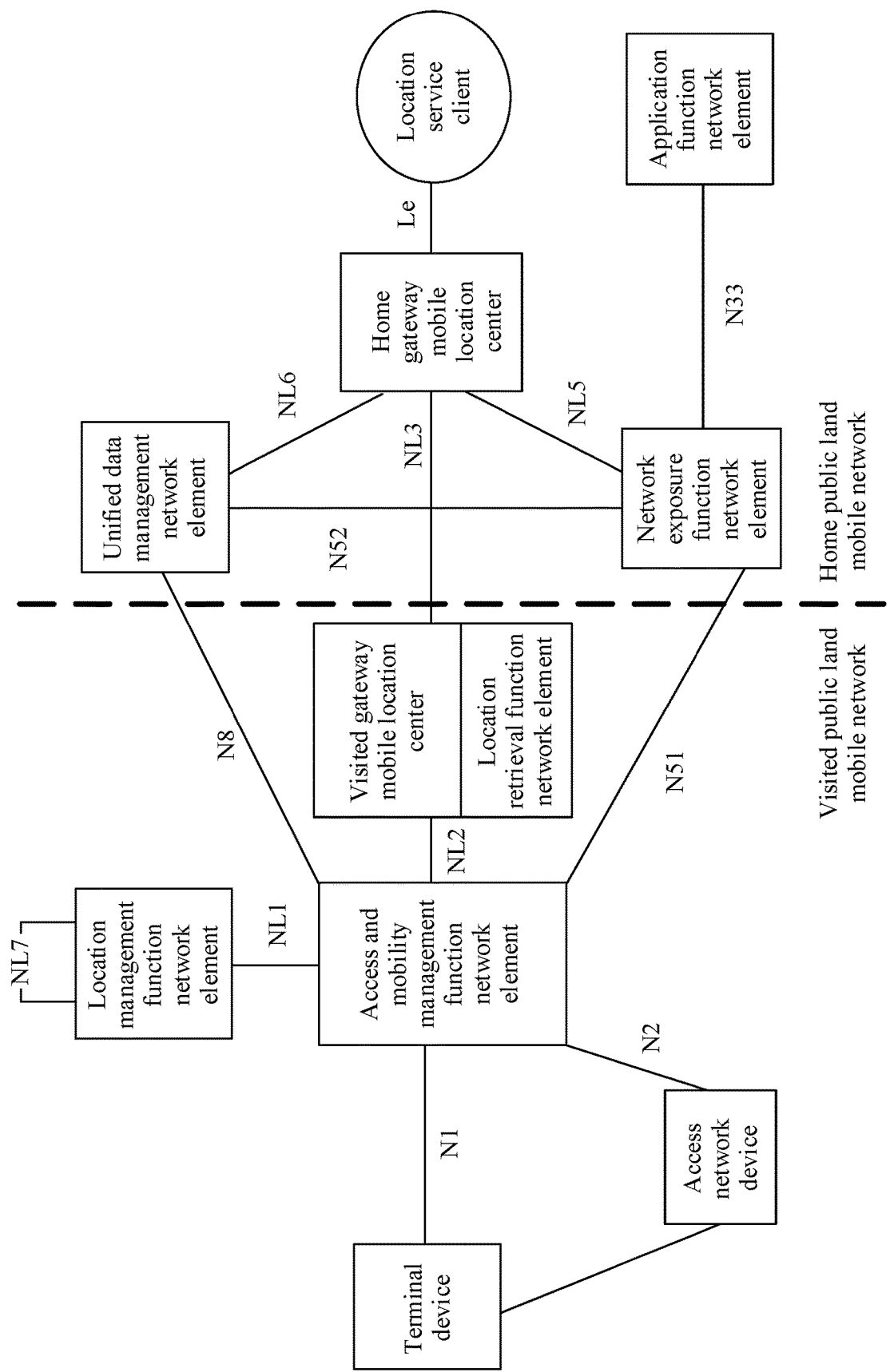
FIG. 2 is a diagram of a location service architecture of a 5G network in a roaming scenario according to an embodiment of this application.

In a roaming scenario, a location service architecture of a 5G network involves a visited public land mobile network (PLMN) and a home PLMN. The visited PLMN relates to a terminal device, an access network device, an AMF network element, an LMF network element, a visited GMLC network element, and an LRF network element. The home PLMN relates to a UDM network element, a NEF network element, an AF network element, and an LCS client. Specifically, FIG. 2 is a diagram of a location service architecture of a 5G network in a roaming scenario according to an embodiment of this application. As shown in FIG. 2, it can be learned that a terminal device may be connected to an AMF network element, and an access network device may also be connected to the AMF network element. The AMF network element may be connected to a UDM network element, an LMF network element, a NEF network element, and a visited GMLC network element. The UDM network element may be connected to the NEF network element and a home GMLC network element. The NEF network element may be connected to an AF network element and the home GMLC network element. An LCS client may be connected to the home GMLC network element. Further, an N1 interface is a reference point between the terminal device and the AMF network element. An N2 interface is a reference point between the access network device and the AMF network element. An NL1 interface is a reference point between the AMF network element and the LMF network element. An N8 interface is a reference point between the AMF network element and the UDM network element. An NL2 interface is a reference point between the AMF network element and the visited GMLC network element. An NL3 interface is a reference point between the visited GMLC network element and the home GMLC network element. An N51 interface is a reference point between the AMF network element and the NEF network element. An NL7 interface is a reference point between the LMF network element and another LMF network element. An N52 interface is a reference point between the UDM network element and the NEF network element. An NL6 interface is a reference point between the UDM network element and the home GMLC network element. An NL5 interface is a reference point between the NEF network element and the home GMLC network element. An N33 interface is a reference point between the NEF network element and the AF network element. A Le interface may be a reference point between the LCS client and the home GMLC network element.

With reference to the system architectures described above, currently, based on different positioning request initiators, protocol standard positioning services may be classified into three types: a mobile originating location request (MO-LR), a mobile terminating location request (MT-LR), and a network induced location request (NI-LR). The MO-LR is a positioning request initiated by the terminal device. The MT-LR is a positioning request sent from the LCS client to an LCS server. The NI-LR is a positioning request initiated within a PLMN that is providing a service for the terminal device.

Further, during positioning, the positioning may be implemented by using a user equipment (UE)-assisted positioning procedure, the positioning may be implemented by using a UE-based positioning procedure, or the positioning may be implemented by using a network-assisted positioning procedure.

Further, the LMF network element may determine, based on an LCS capability and a local configuration that are of the terminal device, to send a Long-Term Evolution (LTE) positioning protocol (LPP) message or a new radio (NR) positioning protocol a (NRPPa) message to the AMF network element. The LPP message indicates the terminal device to feed back positioning measurement data or location information of the terminal device. It may be understood that if the LPP message indicates the terminal device to feed back the positioning measurement data, the positioning is implemented by using the UE-assisted positioning procedure. If the LPP message indicates the terminal device to feed back the location information of the terminal device, the positioning is implemented by using the UE-based positioning procedure.

Figure 3:
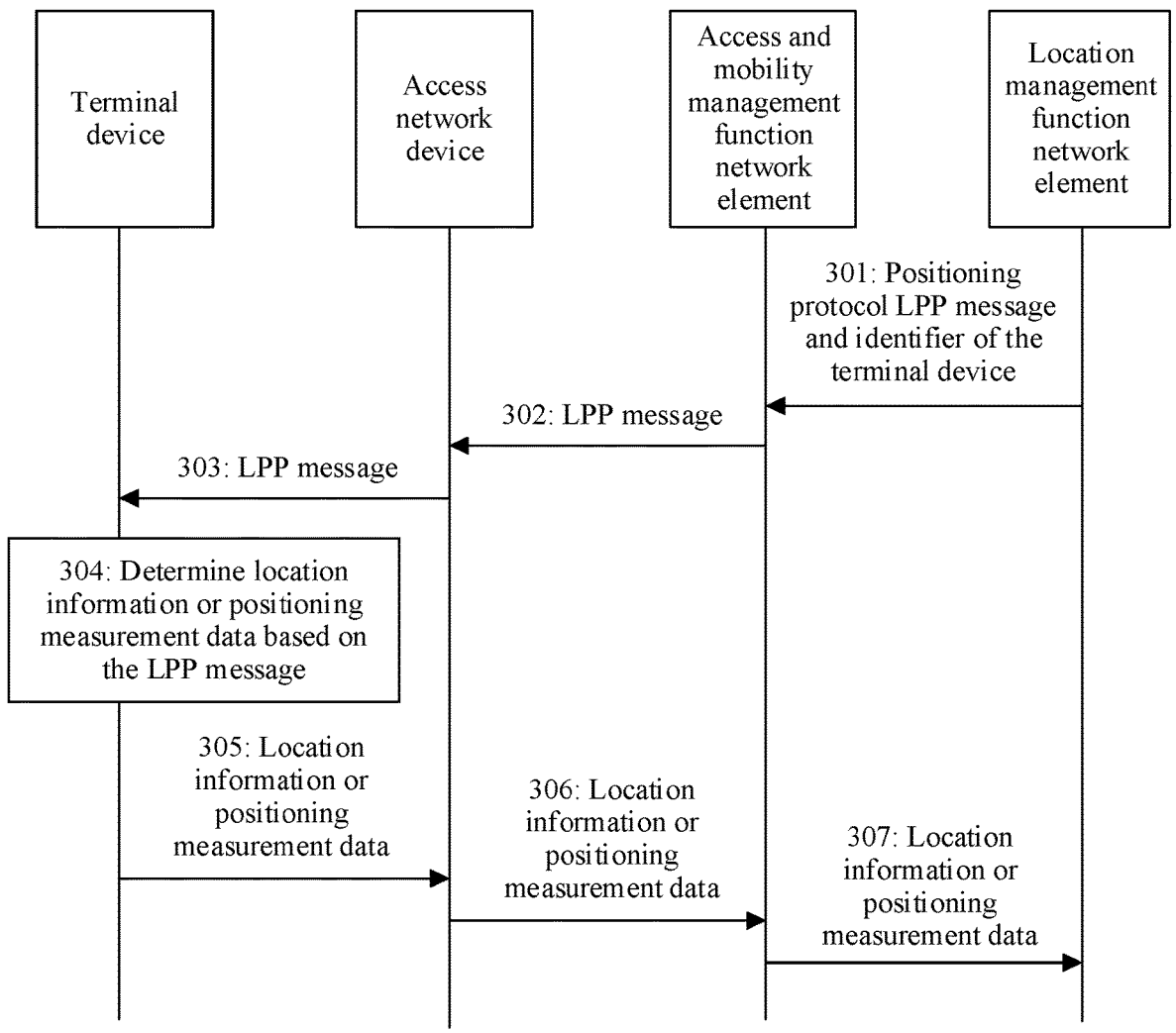
FIG. 3 is a schematic diagram of a positioning procedure.

Further, for the UE-assisted positioning procedure and the UE-based positioning procedure, refer to FIG. 3. FIG. 3 is a schematic diagram of a positioning procedure. As shown in FIG. 3, the schematic diagram of the positioning procedure includes the following steps.

301: An LMF network element sends an LPP message and an identifier of a terminal device to an AMF network element.

The LMF network element may send Namf_communication_N1N2messagetransfer to the AMF network element, where Namf_communication_N1N2messagetransfer carries the LPP message and the identifier of the terminal device.

It should be noted that in this application, Namf_communication is a service provided by the AMF network element, and a network function (NF) entity in a 5G core network may interact with another communication device by using Namf_communication through N1 and N2 interfaces. The other communication device herein may be, for example, the terminal device, the LMF network element, or a radio access network (RAN).

302: The AMF network element sends the LPP message to the access network device.

That the AMF network element sends the LPP message to the access network device includes: The AMF network element determines, based on the identifier of the terminal device, the access network device that provides a service for the terminal device; and the AMF network element sends the LPP message to the access network device.

Further, the AMF network element may send a downlink NAS transport message to the access network device, where the downlink non-access stratum transport message carries the LPP message.

303: The access network device sends the LPP message to the terminal device.

The access network device may send the LPP message to the terminal device via a radio resource control (RRC) message.

304: The terminal device determines positioning measurement data or location information of the terminal device based on the LPP message.

305: The terminal device sends the positioning measurement data or the location information of the terminal device to the access network device.

Alternatively, the terminal device may send the positioning measurement data or the location information of the terminal device to the access network device via the RRC message.

306: The access network device sends the positioning measurement data or the location information of the terminal device to the AMF network element.

The access network device may send an uplink NAS transport message to the AMF network element, where the uplink non-access stratum transport message carries the positioning measurement data or the location information of the terminal device.

307: The AMF network element sends the positioning measurement data or the location information of the terminal device to the LMF network element.

The AMF network element may send an Namf_communication_N2infonotify message to the LMF network element, where the Namf_communication_N2infonotify message carries the positioning measurement data or the location information of the terminal device.

It may be understood that if the LMF network element receives the positioning measurement data, the LMF network element needs to determine the location information of the terminal device based on the positioning measurement data. Further, the LMF network element may send the location information of the terminal device to the AMF network element. It may be understood that the LMF network element may send an Namf_location_determinelocation response message to the AMF network element.

The Namf_location_determinelocation response message includes the location information of the terminal device.

Further, the AMF network element may send the location information of the terminal device to a GMLC network element. The AMF network element may send an Namf_location_providepositioninginfo response message or a location response message to the GMLC network element.

The Namf_location_providepositioninginfo response message or the location response message includes the location information of the terminal device.

Figure 4A:
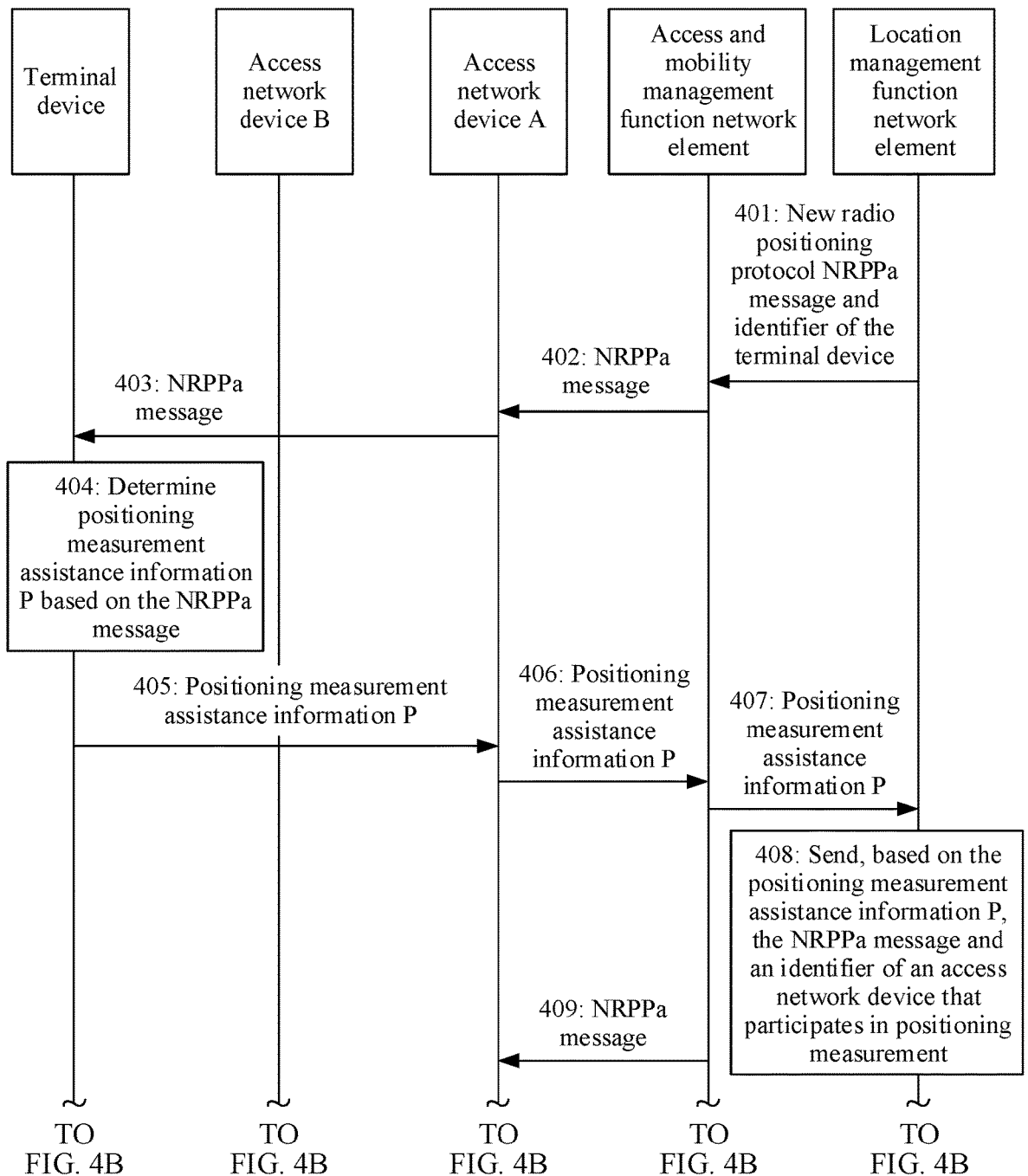
FIG. 4A and FIG. 4B are a schematic diagram of another positioning procedure.
Figure 4B:
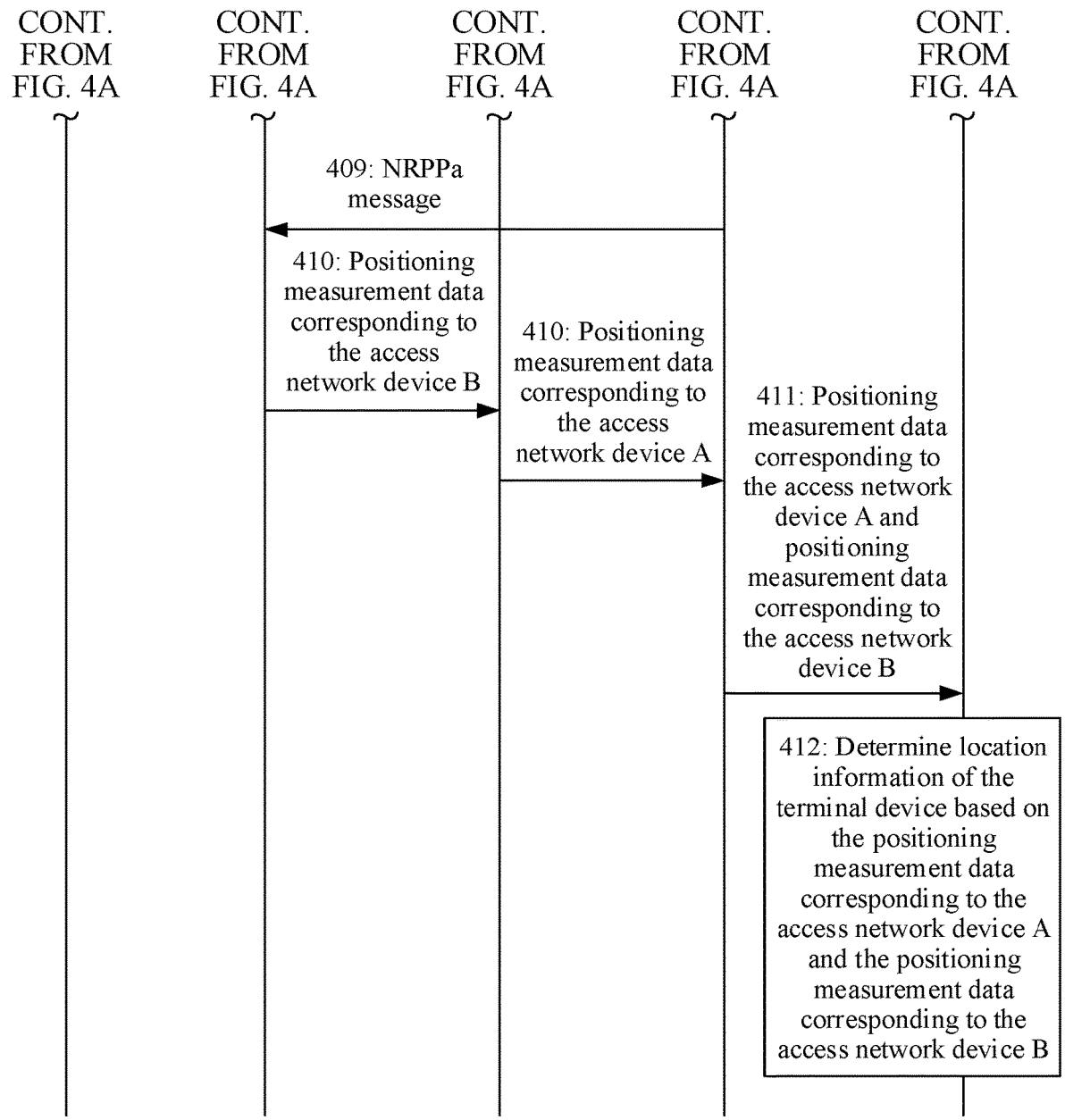

In addition, the network-assisted positioning procedure relates to an access network device A and an access network device B. The access network device A is a device that provides a service for a terminal device, and the access network device B is a device in a neighboring cell of a cell in which the terminal device is located. Specifically, FIG. 4A and FIG. 4B are a schematic diagram of another positioning procedure. As shown in FIG. 4A and FIG. 4B, the schematic diagram of the positioning procedure includes the following steps.

401: An LMF network element sends an NRPPa message and an identifier of a terminal device to an AMF network element.

The LMF network element may send an Namf_communication_N1N2messagetransfer message to the AMF network element, where the Namf_communication_N1N2messagetransfer message carries the NRPPa message and the identifier of the terminal device. The NRPPa message requests an access network device A to obtain positioning measurement assistance information P.

It should be noted that the positioning measurement assistance information P may include a sounding reference signal (SRS) Q and an identifier of an access network device B. The access network device B may be at least one access network device. This is not limited herein.

402: The AMF network element sends the NRPPa message to the access network device A.

That the AMF network element sends the NRPPa message to the access network device A includes: The AMF network element determines, based on the identifier of the terminal device, the access network device A that provides a service for the terminal device; and the AMF network element sends the NRPPa message to the access network device A.

Further, the AMF network element may send a downlink UE associated NRPPa transport message to the access network device, where the downlink UE associated NRPPa transport message carries the NRPPa message.

403: The access network device A sends the NRPPa message to the terminal device.

404: The terminal device determines the positioning measurement assistance information P based on the NRPPa message.

405: The terminal device sends the positioning measurement assistance information P to the access network device A.

406: The access network device A sends the positioning measurement assistance information P to the AMF network element.

That the access network device A sends the positioning measurement assistance information P to the AMF network element includes: The access network device A sends an uplink UE associated NRPPa transport message to the AMF network element, where the uplink UE associated NRPPa transport message carries the NRPPa message, and the NRPPa message carries the positioning measurement assistance information P.

407: The AMF network element sends the positioning measurement assistance information P to the LMF network element.

That the AMF network element sends the positioning measurement assistance information P to the LMF network element includes: The AMF network element sends an Namf_communication_N2infonotify message to the LMF network element, where the Namf_communication_N2infonotify message carries the NRPPa message, and the NRPPa message carries the positioning measurement assistance information P.

408: The LMF network element sends the identifier of the access network device A, the identifier of the access network device B, and the NRPPa message to the AMF network element based on the positioning measurement assistance information P.

That the LMF network element sends the NRPPa message to the AMF network element based on the positioning measurement assistance information P includes that the LMF network element sends an Namf_communication_nonUEN2message transfer message to the AMF network element based on the positioning measurement assistance information P, where the Namf_communication_nonUEN2messagetransfer message carries the NRPPa message and identifiers of access network devices participating in positioning measurement, and the NRPPa message includes the sounding reference signal Q. It may be understood that the access network devices participating in positioning measurement include the access network device A and the access network device B.

409: The AMF network element sends the NRPPa message to the access network device A and the access network device B.

That the AMF network element sends the NRPPa message to the access network device A and the access network device B includes that the AMF network element sends, based on the identifiers of the access network devices participating in positioning measurement, a downlink non UE associated NRPPa transport message carrying the NRPPa message to the access network device A and the access network device B, where the NRPPa message includes the sounding reference signal Q.

410: The access network device A sends positioning measurement data corresponding to the access network device A to the AMF network element, and the access network device B sends positioning measurement data corresponding to the access network device B to the AMF network element.

It should be noted that, before the access network device A sends the positioning measurement data corresponding to the access network device A to the AMF network element, the access network device A may determine, based on the sounding reference signal Q, the positioning measurement data corresponding to the access network device A. Further, that the access network device A sends positioning measurement data corresponding to the access network device A to the AMF network element includes: The access network device A sends an uplink non UE associated NRPPa transport message to the AMF network element, where the uplink non UE associated NRPPa transport message carries the positioning measurement data corresponding to the access network device A.

In addition, before the access network device B sends the positioning measurement data corresponding to the access network device B to the AMF network element, the access network device B may determine, based on the sounding reference signal Q, the positioning measurement data corresponding to the access network device B. Further, that the access network device B sends positioning measurement data corresponding to the access network device B to the AMF network element includes that the access network device B sends an uplink non UE associated NRPPa transport message to the AMF network element, where the uplink non UE associated NRPPa transport message carries the positioning measurement data corresponding to the access network device B.

It may be understood that, before the access network device B sends the positioning measurement data corresponding to the access network device B to the AMF network element, the access network device A may first send the positioning measurement data corresponding to the access network device A to the AMF network element. Alternatively, after the access network device B sends the positioning measurement data corresponding to the access network device B to the AMF network element, the access network device A may send the positioning measurement data corresponding to the access network device A to the AMF network element. A time at which the access network device A sends the positioning measurement data corresponding to the access network device A to the AMF network element may be the same as a time at which the access network device B sends the positioning measurement data corresponding to the access network device B to the AMF network element. This is not limited herein.

411: The AMF network element sends the positioning measurement data corresponding to the access network device A and the positioning measurement data corresponding to the access network device B to the LMF network element.

The AMF network element may send Namf_communication_nonUEN2infonotify to the LMF network element, where Namf_communication_nonUEN2infonotify carries the positioning measurement data corresponding to the access network device A and the positioning measurement data corresponding to the access network device B.

412: The LMF network element determines location information of the terminal device based on the positioning measurement data corresponding to the access network device A and the positioning measurement data corresponding to the access network device B.

The LMF network element may send the location information of the terminal device to the AMF network element.

It may be understood that the LMF network element may send an Namf_location_determinelocationresponse message to the AMF network element.

The Namf_location_determinelocation response message includes the location information of the terminal device.

Further, the AMF network element may send the location information of the terminal device to a GMLC network element. The AMF network element may send an Namf_location_providepositioninginfo response message or a location response message to the GMLC network element.

The Namf_location_providepositioninginfo response message or the location response message includes the location information of the terminal device.

In conclusion, it can be learned that the terminal device is positioned in a plurality of manners. However, in an actual application process, a case in which the terminal device moves across base stations is very likely to occur. Effective coverage of a base station usually ranges from several hundred meters to several thousand meters. For example, in an urban area, a penetration capability of radio signals is greatly attenuated because there are many buildings. As a result, the effective coverage of the base station is small. Therefore, the terminal device often moves across base stations in a communication process. Further, with reference to FIG. 3 or FIG. 4A and FIG. 4B, it can be learned that in the foregoing positioning solutions, the base station needs to assist the LMF network element in completing positioning measurement on the terminal device. In this case, if the terminal device moves across base stations, the positioning measurement on the terminal device cannot be completed. Therefore, how to complete positioning measurement on the terminal device when a positioning process of the terminal device conflicts with a handover process needs to be resolved urgently.

Based on this, an embodiment of this application provides a positioning method to resolve the problem. The following describes embodiments of this application in detail.

Figure 5:
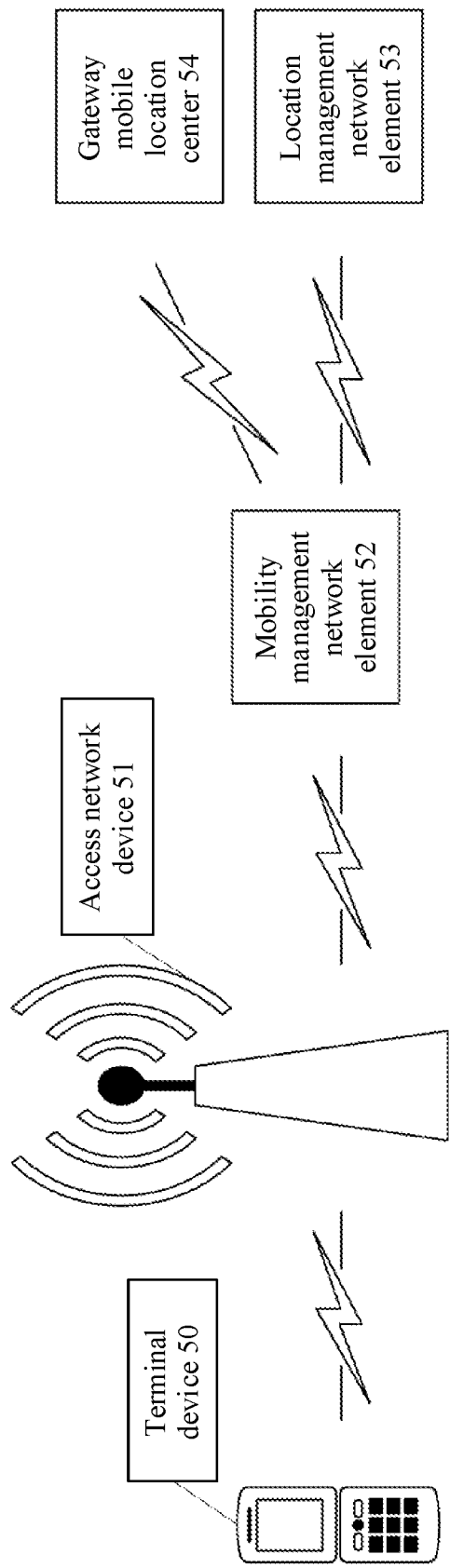
FIG. 5 shows a basic architecture of a communication system according to an embodiment of this application.

FIG. 5 shows a basic architecture of a communication system according to an embodiment of this application. As shown in FIG. 5, the communication system may include a terminal device 50, an access network device 51, a mobility management network element 52, a location management network element 53, and a gateway mobile location center 54. The terminal device 50 may communicate with the access network device 51, the access network device 51 may communicate with the mobility management network element 52, and the mobility management network element 52 may communicate with the location management network element 53 and the gateway mobile location center 54.

Further, the terminal device 50 may be a chip, or may be user equipment including the chip. Further, the terminal device 50 is a user-side entity that is configured to receive a signal, send a signal, or receive a signal and send a signal. The terminal device 50 is configured to provide one or more of a voice service and a data connectivity service for a user. It may be understood that when the terminal device 50 is the chip, the chip may include a processor and an interface. When the terminal device 50 is the user equipment including the chip, the terminal device 50 may be a device that has a wireless transceiver function and may cooperate with the access network device to provide a communication service for the user. Further, the terminal device 50 may be UE, an access terminal, a subscriber unit, a subscriber station, a mobile station, a remote station, a remote terminal, a mobile device, a terminal, a wireless communication device, a user agent, or a user apparatus. The terminal device 50 may alternatively be an unmanned aerial vehicle, an internet of things (IoT) device, a station (ST) in a wireless local area network (WLAN), a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device or another processing device connected to a wireless modem, a vehicle-mounted device, a wearable device (which may also be referred to as a wearable intelligent device), a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. Alternatively, the terminal device 50 may be a device-to-device (D2D) device, for example, an electricity meter or a water meter. Alternatively, the terminal device 50 may be a terminal in a 5G system, or may be a terminal in a next generation communication system. This is not limited in this embodiment of this application.

The access network device 51 may be a chip configured to communicate with the terminal device 50, or may be a device that includes the chip and that is configured to communicate with the terminal device 50. The access network device 51 is a network-side entity that is configured to send a signal, receive a signal, or send a signal and receive a signal. It may be understood that when the access network device 51 is the chip, the chip may include a processor and an interface. When the access network device 51 is the device including the chip, the access network device 51 may be an apparatus that is deployed in a radio access network (RAN) and that provides a wireless communication function for the terminal device 50, for example, may be a transmission reception point (TRP), a base station, or control nodes in various forms. The control node is, for example, a network controller, a radio controller, or a radio controller in a cloud radio access network (CRAN) scenario. Further, the access network device may be macro base stations in various forms, a micro base station (also referred to as a small cell), a relay station, an AP, a RNC, a NodeB (NB), a base station controller (BSC), a base transceiver station (BTS), a home base station (for example, home evolved NodeB, or home NodeB, HNB), a baseband unit (BBU), a transmission reception point (TRP), a transmission point (TP), a mobile switching center, or the like, or may be an antenna panel of a base station. The control node may be connected to a plurality of base stations, and configure resources for a plurality of terminals covered by the plurality of base stations. In systems using different radio access technologies, names of devices having functions of the base station may vary. For example, the device may be an evolved NodeB (eNB or eNodeB) in an LTE system, may be the radio controller in the CRAN scenario, or may be a new radio NodeB (gNB) in 5G. Alternatively, the access network device 51 may be a relay station, an access point, a vehicle-mounted device, a wearable device, a network-side device in a network that is after 5G, or a network device in a future evolved PLMN network. A specific name of the base station is not limited in this application.

The mobility management network element 52 may be a chip, or may be a device including the chip. The mobility management network element 52 is mainly used for registration, mobility management, and a tracking area update procedure for the terminal device in a mobile network. The mobility management network element 52 terminates a NAS message, completes registration management, connection management, reachability management, tracking area (TA) list allocation, mobility management, and the like, and transparently routes a session management (SM) message to a session management network element. In 5G communication, the mobility management network element 52 may be an AMF network element in a core network. In future communication such as 6G communication, the mobility management network element 52 may still be an AMF network element or have another name. This is not limited in this application.

The location management network element 53 may be a chip, or may be a device including the chip. The location management network element 53 is configured to select a corresponding positioning method and a corresponding communication protocol based on a positioning precision requirement, a delay requirement, and the like, to complete interaction of information required for positioning. The location management network element 53 is further configured to provide other required information or a positioning policy for the location service. In 5G communication, the location management network element 53 may be an LMF network element in the core network. In future communication such as 6G communication, the location management network element 53 may still be an LMF network element or have another name. This is not limited in this application.

The gateway mobile location center 54 may be a chip, or may be a device including the chip. The gateway mobile location center 54 may receive a request for obtaining a location of the terminal device from an external network function or application, and after verifying that the request is an allowed request, requests the location management network element 53 to obtain the location information of the terminal device. In addition, the gateway mobile location center 54 provides the obtained location information of the terminal device for the external network function or application.

It may be understood that the foregoing network elements or functions may be network elements in a hardware device, software functions running on dedicated hardware, or virtualized functions instantiated on a platform (for example, a cloud platform). One or more services may be obtained through division into the network elements or the functions. Further, services that exist independently of network functions may occur. In this application, instances of the functions, instances of services included in the functions, or instances of the services that exist independently of network functions may be referred to as service instances. It should be noted that in this application, the mobility management network element may be a first mobility management network element. If a mobility management network element handover scenario is involved, the mobility management network element may be a first mobility management network element or a second mobility management network element. The first mobility management network element is a source mobility management network element, and the source mobility management network element is a mobility management network element that provides a service for the terminal device before the terminal device is handed over. The second mobility management network element is a target mobility management network element, and the target mobility management network element is a mobility management network element that provides a service for the terminal device after the terminal device is handed over.

Figure 6:
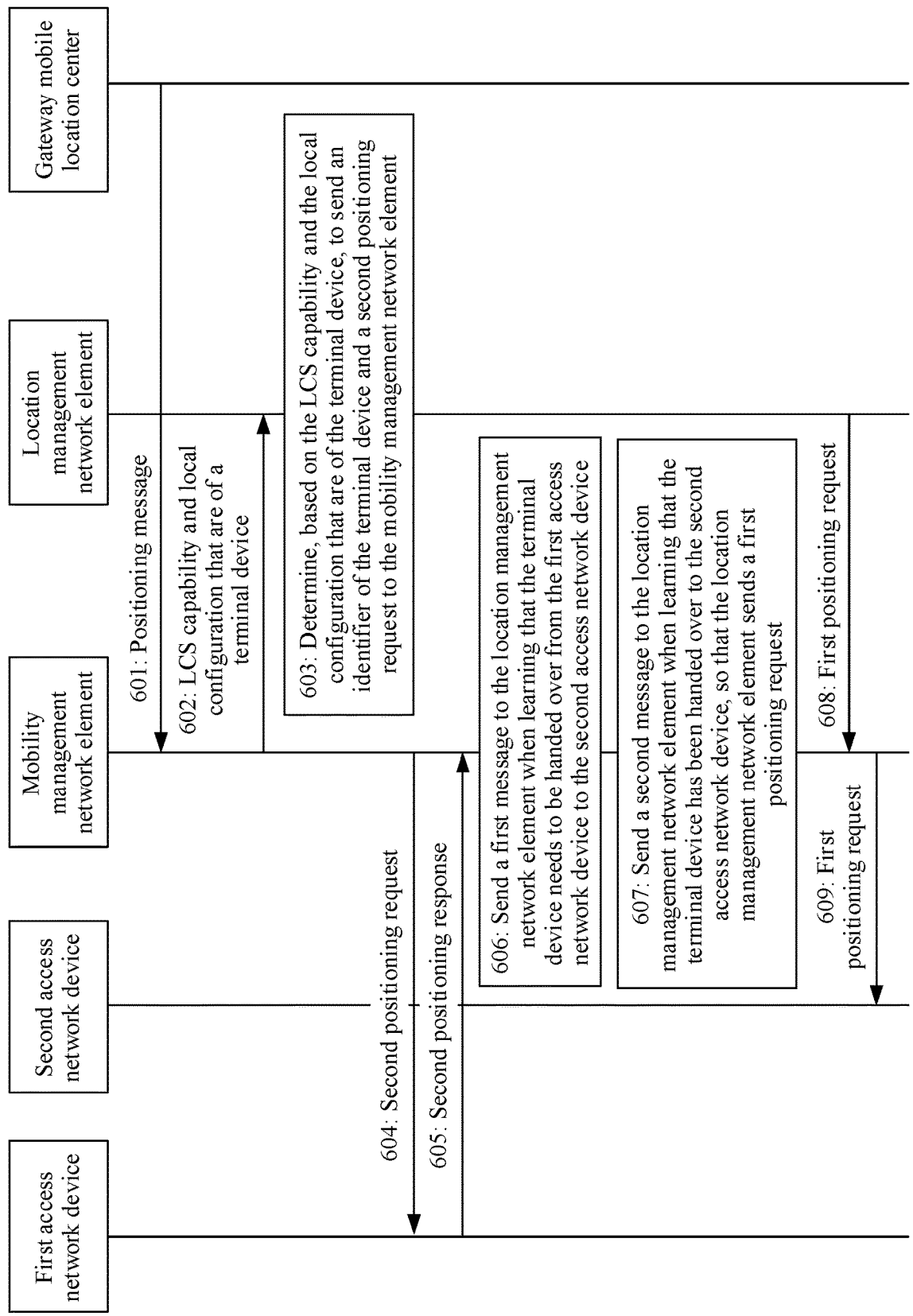
FIG. 6 is a schematic diagram of a positioning method according to an embodiment of this application.

With reference to FIG. 5, the following describes a specific implementation of performing positioning measurement on a terminal device by using a mobility management network element. Further, FIG. 6 is a schematic diagram of a positioning method according to an embodiment of this application. A gateway mobile location center in FIG. 6 is the gateway mobile location center 54 in FIG. 5, a mobility management network element in FIG. 6 is the mobility management network element 52 in FIG. 5, a location management network element in FIG. 6 is the location management network element 53 in FIG. 5, and a first access network device or a second access network device in FIG. 6 is the access network device 51 in FIG. 5. As shown in FIG. 6, the method includes but is not limited to the following steps.

601: The gateway mobile location center sends a positioning message to the mobility management network element. Correspondingly, the mobility management network element receives the positioning message sent by the gateway mobile location center.

Optionally, that the gateway mobile location center sends a positioning message to the mobility management network element includes: The gateway mobile location center sends an Namf_location_providepositioninginforequest message to the mobility management network element.

The Namf_location_providepositioninginforequest message includes the positioning message.

The positioning message includes positioning precision, a positioning type, an identifier of a terminal device, address information of the gateway mobile location center, a callback address of location information of the terminal device, an identifier of the gateway mobile location center, and the like. It may be understood that the address information of the gateway mobile location center may be an IP address of the gateway mobile location center, or may be the IP address and a port number of the gateway mobile location center. This is not limited herein. The callback address of the location information of the terminal device may be a GMLC notify callback uniform resource identifier (URI).

Optionally, the positioning message enables the mobility management network element to request the location management network element to perform positioning on the terminal device corresponding to the identifier of the terminal device.

602: The mobility management network element sends an LCS capability and a local configuration that are of the terminal device to the location management network element. Correspondingly, the location management network element receives the LCS capability and the local configuration that are of the terminal device and that are sent by the mobility management network element.

Before step 602, the mobility management network element determines address information of the location management network element and an identifier of the location management network element by communicating with a network repository function network element. A specific determining manner is the same as that in an existing solution, and details are not described herein.

The network repository function network element is configured to provide a service discovery function, a function of maintaining NF description information of a valid NF network element in a core network, and a function of maintaining a service supported by the valid NF network element in the core network. The service discovery function means that a discovery request message is received from an NF network element in any core network, and information about a target NF network element requested to be discovered is provided for the NF network element. In 5G, the network repository function network element may be a network function repository function (NRF) network element. It may be understood that in future communication, a network element responsible for network function registration and discovery functions may still be the NRF network element or may have another name. This is not limited in this application.

The address information of the location management network element may be an internet protocol address of the location management network element, or may be the IP address and a port number of the location management network element. This is not limited herein.

Optionally, that the mobility management network element sends an LCS capability and a local configuration that are of the terminal device to the location management network element includes that the mobility management network element sends Namf_location_determinelocation-request to the location management network element. Namf_location_determinelocationrequest includes the LCS capability and the local configuration that are of the terminal device.

603: The location management network element determines, based on the LCS capability and the local configuration that are of the terminal device, to send the identifier of the terminal device and a second positioning request to the mobility management network element. Correspondingly, the mobility management network element receives the identifier of the terminal device and the second positioning request that are sent by the location management network element.

Optionally, the second positioning request requests to perform positioning measurement on the terminal device. To be specific, the second positioning request requests to perform positioning measurement on the terminal device corresponding to the identifier of the terminal device.

Optionally, the second positioning request is a second LPP message or a second NRPPa message. The second LPP message indicates the terminal device to feed back positioning measurement data or location information of the terminal device when the terminal device is located in a first cell, and the second NRPPa message is used to obtain first positioning measurement assistance information.

The first positioning measurement assistance information includes a first sounding reference signal and an identifier of a device (for example, a third access network device) in a neighboring cell of the first cell. It may be understood that the first cell is a cell of the first access network device, and the third access network device may be at least one access network device. This is not limited herein.

604: The mobility management network element sends the second positioning request to the first access network device based on the identifier of the terminal device. Correspondingly, the first access network device receives the second positioning request sent by the mobility management network element.

Optionally, that the mobility management network element sends the second positioning request to the first access network device based on the identifier of the terminal device includes that the mobility management network element sends a downlink NAS transport message to the first access network device based on the identifier of the terminal device. The downlink non-access stratum transport message includes the second positioning request.

Optionally, after the first access network device receives the second positioning request sent by the mobility management network element, the first access network device sends the second positioning request to the terminal device. Correspondingly, the terminal device receives the second positioning request sent by the first access network device.

If the second positioning request is the second LPP message, the terminal device obtains, based on the second positioning request, the positioning measurement data or the location information of the terminal device when the terminal device is located in the first cell. Alternatively, if the second positioning request is the second NRPPa message, the terminal device obtains the first positioning measurement assistance information based on the second positioning request. Then, the terminal device sends a second positioning response to the first access network device. If the second positioning request is the second LPP message, the second positioning response is the positioning measurement data or the location information of the terminal device when the terminal device is located in the first cell. Alternatively, if the second positioning request is the second NRPPa message, the second positioning response is the first positioning measurement assistance information.

605: The first access network device sends the second positioning response to the mobility management network element. Correspondingly, the mobility management network element receives the second positioning response sent by the first access network device.

It should be noted that, when the terminal device does not need to be handed over from the first access network device to the second access network device, in other words, when positioning measurement performed on the terminal device does not conflict with handover performed on the terminal device, subsequent steps are performed based on an existing solution. For details, refer to step 307 in FIG. 3 or steps 407 to 412 in FIG. 4A and FIG. 4B. Details are not described herein again. When the mobility management network element learns that the terminal device needs to be handed over from the first access network device to the second access network device, the subsequent steps are steps 606 to 609.

Optionally, step 606 may be performed after step 603 and before step 604, or may be performed after step 604 and before step 605. This is not limited herein. Further, if step 606 is performed after step 603 and before step 604, steps 604 and 605 are not subsequently performed, and the subsequent steps are steps 606 to 609. If step 606 is performed after step 604 and before step 605, when the mobility management network element receives the second positioning response sent by the first access network device, specific processing performed by the mobility management network element on the second positioning response is not limited herein.

606: If learning that the terminal device needs to be handed over from the first access network device to the second access network device, the mobility management network element sends a first message to the location management network element. Correspondingly, the location management network element receives the first message.

Optionally, in this application, the first access network device is an access network device that provides a service for the terminal device before the terminal device is handed over, and the second access network device is an access network device that provides a service for the terminal device after the terminal device is handed over.

Optionally, the first message is used to notify the location management network element that a location of the terminal device needs to change, indicate to suspend the positioning measurement on the terminal device, or indicate that positioning measurement performed on the terminal device conflicts with handover performed on the terminal device.

Optionally, the location of the terminal device includes at least one of the following: a cell in which the terminal device is located, an access network device in which the terminal device is located, and a tracking area in which the terminal device is located.

Optionally, the first message includes first information. The first information is used to notify the location management network element that the location of the terminal device changes, indicate to suspend the positioning measurement on the terminal device, or indicate that positioning measurement performed on the terminal device conflicts with handover performed on the terminal device. The first information may be a newly added information element in the first message. This is not limited herein.

Optionally, the first information includes at least one of a subscription permanent identifier (SUPI), a permanent equipment identifier (PEI), a generic public subscription identifier (GPSI), first cause indication information, a first handover status, an identifier of a second cell, an identifier of a second access network device, a tracking area identifier, and a LCS correlation identifier (ID).

Optionally, the first cause indication information is an Xn handover conflict.

Optionally, the first handover status includes one of the following: a handover preparation phase and a handover execution phase.

Optionally, the location service correlation identifier may be configured by the first mobility management network element, and the location service correlation identifier is an identifier used to identify a current positioning measurement task that is of the positioned terminal device and that is performed between the first mobility management network element and the location management network element. Further, the location service correlation identifier is an identifier used to identify a location service in the first access network device, and in particular, the location service correlation identifier is unique in location services simultaneously performed by the first mobility management network element. The location service correlation identifier is configured by the first mobility management network element. When a plurality of location service request processes is ongoing for UE with the same LMF, the location service correlation identifier can be associated with a location response and a location request (The identifier of a location session in NG-RAN. It should be unique for all concurrently active location sessions in a particular AMF. The Correlation ID is assigned by the AMF and enables association of the location response with the location request when more than one location service request procedure is ongoing for the UE with the same LMF).

It may be understood that when the terminal device needs to be handed over from the first access network device to the second access network device, the location management network element receives the first message, and suspends the positioning measurement on the terminal device based on the first message.

Optionally, that the location management network element suspends the positioning measurement on the terminal device based on the first message includes that the location management network element stops a timer for waiting for the second positioning response. Optionally, step 606 may or may not be performed. This is not limited herein.

Optionally, when learning that the terminal device needs to be handed over from the first access network device to the second access network device, or when receiving the first handover request, the mobility management network element sends a third message to the gateway mobile location center. Correspondingly, the gateway mobile location center receives the third message sent by the mobility management network element.

Optionally, the third message indicates to suspend the positioning measurement on the terminal device, the third message indicates that positioning measurement performed on the terminal device conflicts with handover performed on the terminal device, or the third message enables the gateway mobile location center to stop a timer for waiting for a location response message, enables the gateway mobile location center to send a message requesting a location service client to defer returning location information, and enables the gateway mobile location center to enter a state of asynchronously waiting for the location information.

The location response message includes the location information of the terminal device in the first cell. The third message enables the gateway mobile location center to send a message used to request the location service client to defer returning the location information. To be specific, the third message enables the gateway mobile location center to send a message used to request the location service client to defer returning the location information of terminal device in the first cell. Further, an interaction process in the location response message is the same as that in the existing solution. For details, refer to step 307 in FIG. 3 or step 412 in FIG. 4A and FIG. 4B. Details are not described herein again.

The third message enables the gateway mobile location center to enter the state of asynchronously waiting for the location information, where the location information is location information of the terminal device in the second cell.

Optionally, the third message is a provisional response message, and the provisional response message includes an identifier of a deferred location response.

607: The mobility management network element sends a second message to the location management network element when learning that the terminal device has been handed over to the second access network device, so that the location management network element sends a first positioning request. Correspondingly, the location management network element receives the second message sent by the mobility management network element.

Optionally, the second message is used to notify the location management network element that a location of the terminal device has changed; used to enable the location management network element to send the first positioning request; or used to enable the location management network element to send a Namf_communication_N1N2messagetransfer message.

Optionally, the second message includes second information. The second information is used to notify the location management network element that the location of the terminal device has changed, used to enable the location management network element to send the first positioning request; or used to enable the location management network element to send the Namf_communication_N1N2messagetransfer message. The second information may be a newly added information element in the second message. This is not limited herein.

Optionally, the second information includes at least one of the SUPI, the PEI, the GPSI, second cause indication information, a second handover status, the tracking area identifier, and the LCS Correlation ID.

Optionally, the second cause indication information is Xn handover completion and/or N2 handover completion.

Optionally, the second handover status includes a handover completion phase.

The Namf_communication_N1N2messagetransfer message may include the first positioning request.

Optionally, when there is an Xn interface between the first access network device and the second access network device, the second cause indication information is the Xn handover completion. Optionally, in a scenario in which handover is performed between mobility management network elements, the second cause indication information is the Xn handover completion and the N2 handover completion, or the N2 handover completion. Optionally, the first message and the second message may be carried in a same message or two different messages. Optionally, the first positioning request requests to perform positioning measurement on the terminal device. It may be understood that the first positioning request is a first LPP message or a first NRPPa message. The first LPP message indicates the terminal device to feed back positioning measurement data or location information of the terminal device when the terminal device is located in the second cell, and the first NRPPa message is used to obtain second positioning measurement assistance information. The second positioning measurement assistance information includes a second sounding reference signal and an identifier of a device (for example, a fourth access network device) in a neighboring cell of the second cell. It may be understood that the second cell is a cell of the second access network device, and the fourth access network device may be at least one access network device. This is not limited herein.

Optionally, before the location management network element receives the second message sent by the mobility management network element, the method includes that the location management network element starts a timer for waiting for the second message when stopping the timer for waiting for the second positioning response.

Optionally, that the location management network element receives the second message sent by the mobility management network element includes that the location management network element receives the second message sent by the mobility management network element when the terminal device has been handed over to the second access network device.

608: The location management network element sends the first positioning request to the mobility management network element. Correspondingly, the mobility management network element receives the first positioning request sent by the location management network element.

Optionally, that the location management network element sends the first positioning request to the mobility management network element includes that before the timer for waiting for the second message expires, if receiving the second message, the location management network element sends the first positioning request to the mobility management network element based on the second message.

Optionally, before the timer for waiting for the second message expires, if not receiving the second message, the location management network element sends a positioning failure message to the mobility management network element.

609: The mobility management network element sends the first positioning request to the second access network device. Correspondingly, the second access network device receives the first positioning request sent by the mobility management network element.

Optionally, after the second access network device receives the first positioning request sent by the mobility management network element, the second access network device sends the first positioning request to the terminal device. Correspondingly, the terminal device receives the first positioning request sent by the second access network device. If the first positioning request is the first LPP message, the terminal device obtains, based on the first positioning request, the positioning measurement data or the location information of the terminal device when the terminal device is located in the second cell. Alternatively, if the first positioning request is the first NRPPa message, the terminal device obtains the first positioning measurement assistance information based on the first positioning request. Then, the terminal device sends a first positioning response to the second access network device. If the first positioning request is the first LPP message, the first positioning response is the positioning measurement data or the location information of the terminal device when the terminal device is located in the second cell. Alternatively, if the first positioning request is the first NRPPa message, the first positioning response is the first positioning measurement assistance information. After step 609, the second access network device sends the first positioning response to the mobility management network element. Correspondingly, the mobility management network element receives the first positioning response sent by the second access network device. Further, the mobility management network element sends the first positioning response to the location management network element. Correspondingly, the location management network element receives the first positioning response sent by the mobility management network element.

Optionally, if the first positioning response is the positioning measurement data of the terminal device in the second cell, the location management network element determines, based on the positioning measurement data of the terminal device in the second cell, the location information of the terminal device when the terminal device is located in the second cell. Further, the location management network element sends, to the mobility management network element, the location information of the terminal device located in the second cell. Correspondingly, the mobility management network element receives the location information that is sent by the location management network element and that is of the terminal device located in the second cell. Then, the mobility management network element sends the location information of the terminal device located in the second cell to the gateway mobile location center. Correspondingly, the gateway mobile location center receives the location information that is sent by the mobility management network element and that is of the terminal device located in the second cell.

Optionally, if the first positioning response is the first positioning measurement assistance information, subsequent steps are the same as those in the existing solution. For details, refer to steps 408 to 412 in FIG. 4A and FIG. 4B. Details are not described herein again.

It can be learned that in the foregoing technical solution, when it is learned that the terminal device needs to be handed over from the first access network device to the second access network device, the first message is sent to the location management network element such that the positioning measurement on the terminal device is suspended. This avoids a problem that positioning measurement performed on the terminal device fails when positioning measurement performed on the terminal device conflicts with handover performed on the terminal device. Further, when it is learned that the terminal device has been handed over to the second access network device, the second message is sent to the location management network element, so that positioning measurement continues to be performed on the terminal device when the handover is completed.

Figure 7:
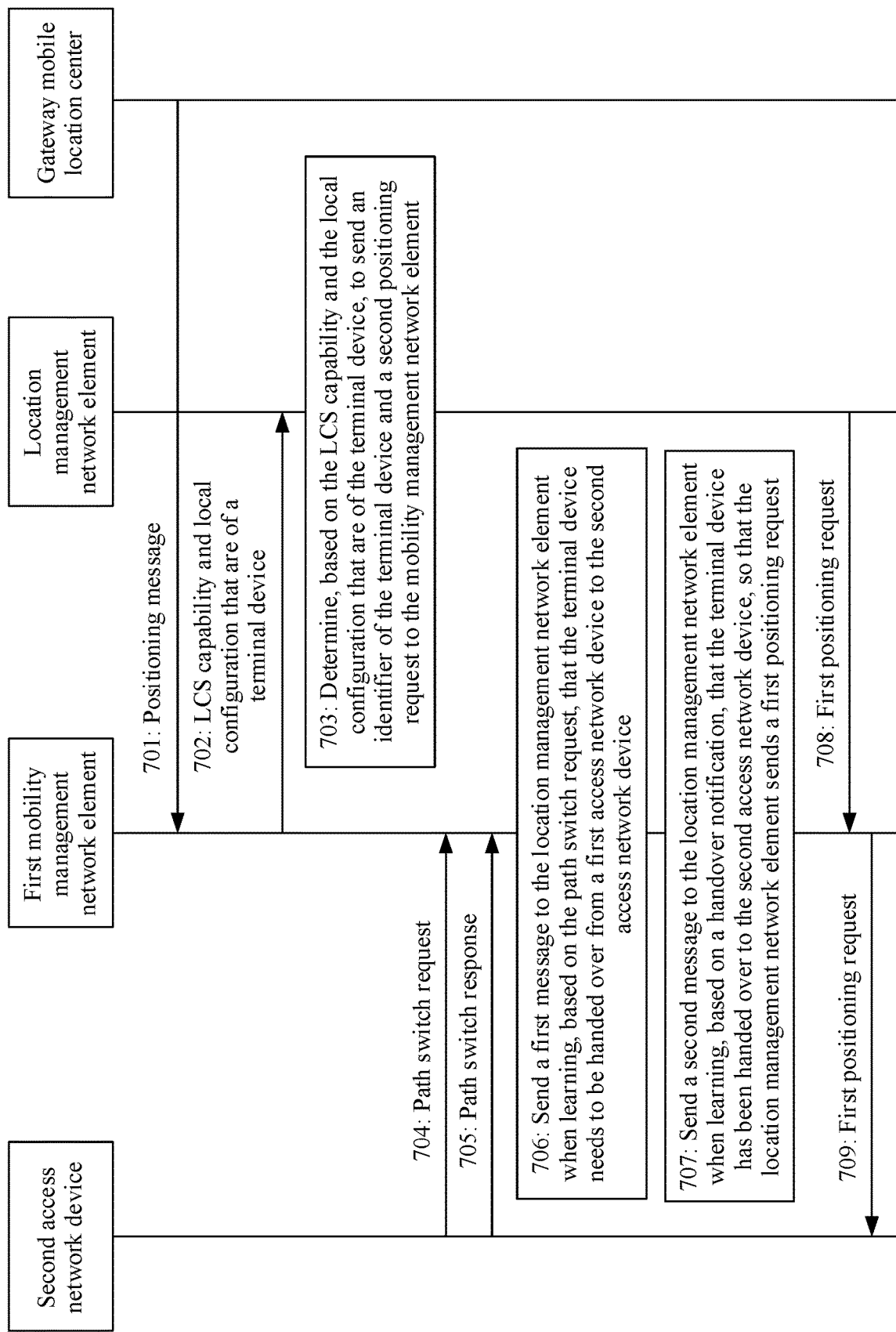
FIG. 7 is a schematic diagram of another positioning method according to an embodiment of this application.

With reference to FIG. 5, the following describes a specific implementation of performing positioning measurement on a terminal device by using a mobility management network element when there is an Xn interface between a first access network device and a second access network device. The Xn interface is a name, and the Xn interface may be a communication interface between the first access network device and the second access network device. The Xn interface may change in different communication systems, but functions and functions thereof are similar. Therefore, the name is used as a description example in this application, and the name is not limited. Specifically, FIG. 7 is a schematic diagram of another positioning method according to an embodiment of this application. A gateway mobile location center in FIG. 7 is the gateway mobile location center 54 in FIG. 5, a second access network device in FIG. 7 may be the access network device 51 in FIG. 5, a mobility management network element in FIG. 7 is the mobility management network element 52 in FIG. 5, and a location management network element in FIG. 7 is the location management network element 53 in FIG. 5. As shown in FIG. 7, the method includes but is not limited to the following steps:

701 to 703 are similar to steps 601 to 603 in FIG. 6. For related descriptions, refer to steps 601 to 603 in FIG. 6. Details are not described herein again. It should be noted that for steps 701 to 703, with reference to steps 601 to 603, the mobility management network element in steps 601 to 603 is a first mobility management network element in steps 701 to 703.

Optionally, after step 703, the first mobility management network element sends a second positioning request to the first access network device based on an identifier of the terminal device. Correspondingly, the first access network device receives the second positioning request sent by the first mobility management network element. For the second positioning request, refer to related descriptions in step 604 in FIG. 6. Details are not described herein again. Then, the first access network device sends a second positioning response to the first mobility management network element. Correspondingly, the first mobility management network element receives the second positioning response sent by the first access network device. For the second positioning response, refer to related descriptions in step 604 in FIG. 6. Details are not described herein again.

704: The second access network device sends a path switch request to the first mobility management network element. Correspondingly, the first mobility management network element receives the path switch request sent by the second access network device.

The first mobility management network element learns, based on the path switch request, that the terminal device needs to be handed over from the first access network device to the second access network device.

The path switch request includes the identifier of the terminal device. Further, the path switch request indicates that a device that provides a service for the terminal device corresponding to the identifier of the terminal device is the second access network device.

It should be noted that there is no necessary execution sequence between step 703 and step 704 in this embodiment of this application. Step 703 may be performed before step 704. Alternatively, step 703 may be performed before step 704. Alternatively, step 703 and step 704 may be performed at the same time. This is not limited herein.

705: The first mobility management network element sends a path switch response (path switch request ack) to the second access network device. Correspondingly, the second access network device receives the path switch response sent by the first mobility management network element.

Optionally, the path handover response indicates the second access network device to perform Xn handover.

The Xn handover may mean that an access network device that provides a service for the terminal device is handed over by performing handover between interfaces of two access network devices.

706: If learning, based on the path switch request, that the terminal device needs to be handed over from the first access network device to the second access network device, the first mobility management network element sends a first message to the location management network element. Correspondingly, the location management network element receives the first message.

It should be noted that there is no necessary execution sequence between step 705 and step 706 in this embodiment of this application. Step 705 may be performed before step 706. Alternatively, step 706 may be performed before step 705. Alternatively, step 705 and step 706 may be performed at the same time. This is not limited herein.

Because the first mobility management network element learns, based on the received second positioning request and the path switch request, that positioning conflicts with handover, positioning measurement on the terminal device cannot be completed, the first mobility management network element sends the first message to the location management network element. For the first message, refer to the descriptions of the first message in step 606 in FIG. 6. Details are not described herein again.

It should be noted that step 706 is similar to step 606. For related descriptions, refer to step 606. Details are not described herein again. It should be noted that for step 706, with reference to step 606, the mobility management network element in step 606 is the first mobility management network element in step 706.

707: The first mobility management network element sends a second message to the location management network element when learning, based on a handover notification, that the terminal device has been handed over to the second access network device, so that the location management network element sends a first positioning request. Correspondingly, the location management network element receives the second message sent by the mobility management network element.

It should be noted that step 707 is similar to step 607. For related descriptions, refer to step 607. Details are not described herein again. It should be noted that for step 707, with reference to step 607, the mobility management network element in step 607 is the first mobility management network element in step 707.

It should be noted that the first mobility management network element may learn, by receiving the handover notification sent by the second access network device, that the terminal device has been handed over to the second access network device. The handover notification indicates that the terminal device has been handed over to the second access network device.

708 and 709 are similar to steps 608 and 609 in FIG. 6. For related descriptions, refer to steps 608 and 609 in FIG. 6. Details are not described herein again. It should be noted that for steps 708 and 709, with reference to steps 608 and 609, the mobility management network element in steps 608 and 609 is the first mobility management network element in steps 708 and 709.

It can be learned that in the foregoing technical solution, the second positioning request and the path switch request are received, to determine positioning measurement performed on the terminal device conflicts with handover performed on the terminal device. Therefore, the first message is sent to the location management network element, so that the positioning measurement on the terminal device is suspended. This avoid a problem that positioning measurement performed on the terminal device fails when positioning measurement performed on the terminal device conflicts with handover performed on the terminal device. Further, when it is learned that the terminal device has been handed over to the second access network device, the second message is sent to the location management network element, so that positioning measurement continues to be performed on the terminal device when the handover is completed.

Further, with reference to FIG. 5, the following describes a specific implementation of performing positioning measurement on a terminal device by using a mobility management network element when there is no Xn interface between a first access network device and a second access network device. Further, FIG. 8A and FIG. 8B are a schematic diagram of still another positioning method according to an embodiment of this application. A terminal device in FIG. 8A and FIG. 8B is the terminal device 50 in FIG. 5, a first access network device and a second access network device in FIG. 8A and FIG. 8B may be access network devices 51 in FIG. 5, a first mobility management network element and a second mobility management network element in FIG. 8A and FIG. 8B are mobility management network elements 52 in FIG. 5, and a location management network element in FIG. 8A and FIG. 8B is the location management network element 53 in FIG. 5. As shown in FIG. 8A and FIG. 8B, the method includes but is not limited to the following steps.

801 to 803 are similar to steps 701 to 703 in FIG. 7. For related descriptions, refer to steps 701 to 703 in FIG. 7. Details are not described herein again.

804: The first access network device sends a first handover request to the first mobility management network element. Correspondingly, the first mobility management network element receives the first handover request sent by the first access network device.

The first handover request (handover required) includes an identifier of the second access network device. The second access network device is a neighboring access network device whose signal quality is highest after the first access network device performs signal measurement.

It may be understood that the first mobility management network element may determine, based on the identifier of the second access network device, whether being connected to the second access network device. If the first mobility management network element is not connected to the second access network device, steps 805 to 815 are performed. If the first mobility management network element is connected to the second access network device, the first mobility management network element learns, based on the first handover request, that the terminal device needs to be handed over from the first access network device to the second access network device, and sends a first message to the location management network element. For subsequent steps, refer to steps 707 to 709 in FIG. 7. Details are not described herein again.

It should be noted that there is no necessary execution sequence between step 803 and step 804 in this embodiment of this application. Step 803 may be performed before step 804. Alternatively, step 803 may be performed before step 804. Alternatively, step 803 and step 804 may be performed at the same time. This is not limited herein.

805: The first mobility management network element selects the second mobility management network element based on the identifier of the second access network device.

806: The first mobility management network element sends a first positioning context to the second mobility management network element. Correspondingly, the second mobility management network element receives the first positioning context sent by the first mobility management network element.

The first positioning context is determined after the first mobility management network element receives a positioning message from a gateway mobile location center, and the first positioning context enables the second mobility management network element to send the first message to the location management network element. For the positioning message, refer to the descriptions of the positioning message in step 601 in FIG. 6. Details are not described herein again.

The first positioning context includes at least one of LCS correlation ID, a LCS routing ID, address information of the location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, and a supported geographical area description shape. It may be understood that the first positioning context may include one or any combination of the location service correlation identifier, the location service routing identifier, the address information of the location management network element, the identifier of the location management network element, the address information of the gateway mobile location center, the callback address of location information of the terminal device, the N1N2 notify subscription identifier, the N2 notify subscription identifier, the location service client type, the location service type, the location service priority, the location quality of service, and the supported geographical area description shape. This is not limited herein.

The N1N2 notify subscription identifier, the N2 notify subscription identifier, the location service client type, the location service type, the location service priority, the location quality of service, and the supported geographical area description shape are all defined in the standard 29.518. Specifically, a function of the N1N2 notify subscription identifier is defined in Section 6.1.6.2.13 of the protocol, a function of the N2 notify subscription identifier is defined in Section 6.1.6.2.11 of the protocol, and functions of the location service client type, the location service type, the location service priority, the location quality of service, and the supported geographical area description shape are defined in Section 6.4.6.3.3 of this protocol. Details are not described herein.

Further, for the location service correlation identifier, refer to related descriptions in FIG. 6. Details are not described herein again. The location service routing identifier may be configured by the first mobility management network element.

It should be noted that the location service routing identifier is an identifier used to identify a current positioning measurement task that is of the positioned terminal device and that is performed between the first mobility management network element and the first access network device.

Further, the location service routing identifier is used to identify an LMF (This IE is used to identify an LMF within the 5GC) in a 5G core network.

For the address information of the location management network element, refer to the address information of the location management network element in step 602 in FIG. 6. Details are not described herein again. For the address information of the gateway mobile location center, refer to the address information of the gateway mobile location center in step 601 in FIG. 6. Details are not described herein again.

In addition, that the first mobility management network element sends a first positioning context to the second mobility management network element includes that the first mobility management network element sends a first forward relocation request to the second mobility management network element, where the first forward relocation request includes the first positioning context.

807: The second mobility management network element sends the first message to the location management network element based on the first positioning context.

The first positioning context may further include a location service suspension identifier, and the location service suspension identifier is used to indicate that the first mobility management network element does not send the first message to the location management network element. It may be understood that the second mobility management network element sends the first message to the location management network element based on the first positioning context includes: The second mobility management network element sends the first message to the location management network element based on the location service suspension identifier. Further, the second mobility management network element may send the first message to the location management network element based on the location service suspension identifier and the address information of the location management network element.

For the first message, refer to the descriptions of the first message in step 606 in FIG. 6. Details are not described herein again.

Optionally, step 807 may or may not be performed. This is not limited herein.

Optionally, step 807 may be replaced by that the first mobility management network element sends the first message to the location management network element. If the first mobility management network element has sent the first message to the location management network element, the second mobility management network element may not send the first message to the location management network element.

Optionally, if step 606 is not performed and step 807 is not performed, that the second mobility management network element sends a second message to the location management network element includes that the second mobility management network element sends the second message to the location management network element based on the first positioning context. Optionally, if the second mobility management network element sends the first message to the location management network element based on the first positioning context, the first message includes the location service correlation identifier and the location service routing identifier.

808: The second mobility management network element sends a handover request 1 to the second access network device. Correspondingly, the second access network device receives the handover request 1 sent by the second mobility management network element.

Optionally, the handover request 1 requests the second access network device to allocate a resource to the terminal device.

When the second access network device receives the handover request 1 sent by the second mobility management network element, the second access network device allocates the resource to the terminal device based on the handover request 1.

809: The second access network device sends a handover response 1 to the second mobility management network element. Correspondingly, the second mobility management network element receives the handover response 1 sent by the second access network device.

Optionally, the handover response 1 indicates that resource allocation is completed.

810: The second mobility management network element sends a first forward relocation response to the first mobility management network element. Correspondingly, the first mobility management network element receives the first forward relocation response sent by the second mobility management network element.

The first forward relocation response indicates that the mobility management network element serving the terminal device has been handed over to the second mobility management network element.

811: The first mobility management network element sends a first handover response (handover request ack) to the first access network device. Correspondingly, the first access network device receives the first handover response sent by the first mobility management network element.

The first handover response enables the first access network device to perform handover.

812: The first access network device sends a handover request 2 to the terminal device. Correspondingly, the terminal device receives the handover request 2 sent by the first access network device.

Optionally, the handover request 2 is used to notify the terminal device that the terminal device needs to be handed over to the second access network device. After receiving the handover request 2 sent by the first access network device, the terminal device performs handover based on the handover request 2. After the handover is completed, the terminal device sends a handover notification to the second access network device. The handover notification indicates that the terminal device has been handed over to the second access network device.

It should be noted that in this application, an interaction process (for example, steps 812 and 813) between the terminal device and access network devices (including the first access network device and the second network access device) may be implemented by using RRC signaling. This is not limited herein.

813: The terminal device sends the handover notification to the second access network device. Correspondingly, the second access network device receives the handover notification sent by the terminal device.

814: The second access network device sends the handover notification to the second mobility management network element. Correspondingly, the second mobility management network element receives the handover notification sent by the second access network device.

815: The second mobility management network element sends the second message to the location management network element when learning, based on the handover notification, that the terminal device has been handed over to the second access network device such that the location management network element sends a first positioning request. Correspondingly, the location management network element receives the second message sent by the mobility management network element.

Further, that the second mobility management network element sends the second message to the location management network element when learning, based on the handover notification, that the terminal device has been handed over to the second access network device includes that the second mobility management network element learns, based on the handover notification, that the terminal device has been handed over to the second access network device, and sends the second message to the location management network element if the terminal device has been handed over to the second mobility management network element.

It should be noted that in this application, there is no necessary execution sequence between step 810 and step 815 in this embodiment of this application. Step 810 may be performed before step 815. Alternatively, step 810 may be performed before step 815. Alternatively, step 810 and step 815 may be performed at the same time. This is not limited herein.

Optionally, before the location management network element receives the second message sent by the second mobility management network element, the method includes that the location management network element starts a timer for waiting for the second message when stopping a timer for waiting for a second positioning response.

Optionally, that the location management network element receives the second message sent by the second mobility management network element includes that the location management network element receives the second message sent by the second mobility management network element when the terminal device has been handed over to the second access network device.

816: The location management network element sends the first positioning request to the second mobility management network element. Correspondingly, the second mobility management network element receives the first positioning request sent by the location management network element.

Optionally, that the location management network element sends the first positioning request to the second mobility management network element includes that before the timer for waiting for the second message expires, if receiving the second message, the location management network element sends the first positioning request to the second mobility management network element based on the second message.

Optionally, before the timer for waiting for the second message expires, if not receiving the second message, the location management network element sends a positioning failure message to the second mobility management network element.

817: The second mobility management network element sends the first positioning request to the second access network device. Correspondingly, the second access network device receives the first positioning request sent by the second mobility management network element.

Optionally, step 817 is similar to step 609 in FIG. 6. For related descriptions, refer to step 609 in FIG. 6. Details are not described herein again. It should be noted that for step 817, with reference to step 609, the mobility management network element in step 609 is the second mobility management network element in step 817.

It can be learned that in the foregoing technical solution, the second positioning request and the first handover request are received, to determine that positioning measurement performed on the terminal device conflicts with handover performed on the terminal device. When it is learned that the first mobility management network element has no connection relationship with the second access network device, the second mobility management network element is selected, and a positioning context is transmitted to the second mobility management network element, to prepare for subsequent sending of the first message based on the positioning context. In addition, the first message is sent to the location management network element, to suspend the positioning measurement on the terminal device. This avoids a problem that positioning measurement performed on the terminal device fails when positioning measurement performed on the terminal device conflicts with handover performed on the terminal device. Further, when it is learned that the terminal device has been handed over to the second access network device, the second message is sent to the location management network element, so that positioning measurement continues to be performed on the terminal device.

In a possible implementation, the method further includes that the second mobility management network element sends the location service correlation identifier and the location service routing identifier to the location management network element such that the location management network element learns that the second mobility management network element is an authorized network element that provides a service for the terminal device or that the terminal device has been handed over from the first mobility management network element to the second mobility management network element.

Optionally, that the second mobility management network element sends the location service correlation identifier and the location service routing identifier to the location management network element includes: The second mobility management network element sends the location service correlation identifier and the location service routing identifier to the location management network element based on the address information of the location management network element.

Optionally, that the second mobility management network element sends the location service correlation identifier and the location service routing identifier to the location management network element includes that the second mobility management network element sends an Nlmf_location_updatelocation request to the location management network element based on the address information of the location management network element, where the Nlmf_location_updatelocation request includes the location service correlation identifier and the location service routing identifier.

For the location service correlation identifier, refer to the descriptions of the location service correlation identifier in step 806 in FIG. 8A and FIG. 8B. Details are not described herein again. For the location service routing identifier, refer to the descriptions of the location service routing identifier in step 806 in FIG. 8A and FIG. 8B. Details are not described herein again.

It should be noted that in this application, Nlmf_location is a service provided by the location management network element, and the location management network element in the 5G core network may interact with the mobility management network element by using Nlmf_location.

Further, after the location management network element receives the location service correlation identifier and the location service routing identifier, the location management network element sends a Nlmf_location_updatelocation response to the second mobility management network element. Correspondingly, the second mobility management network element receives the Nlmf_location_updatelocation response sent by the location management network element. The second mobility management network element may determine, based on the Nlmf_location_updatelocation response, that the location management network element has acknowledged and accepted that the second mobility management network element is an authorized network element that provides a service for the terminal device or that the terminal device has been handed over from the first mobility management network element to the second mobility management network element.

It can be learned that in the foregoing technical solution, when the mobility management network element changes, the location management network element learns that the new mobility management network element is the authorized network element, to avoid a problem that the location management network element does not process information from the new mobility management network element. In addition, the location management network element instantly learns that the mobile network element that provides the service for the terminal device has changed.

Figure 9:
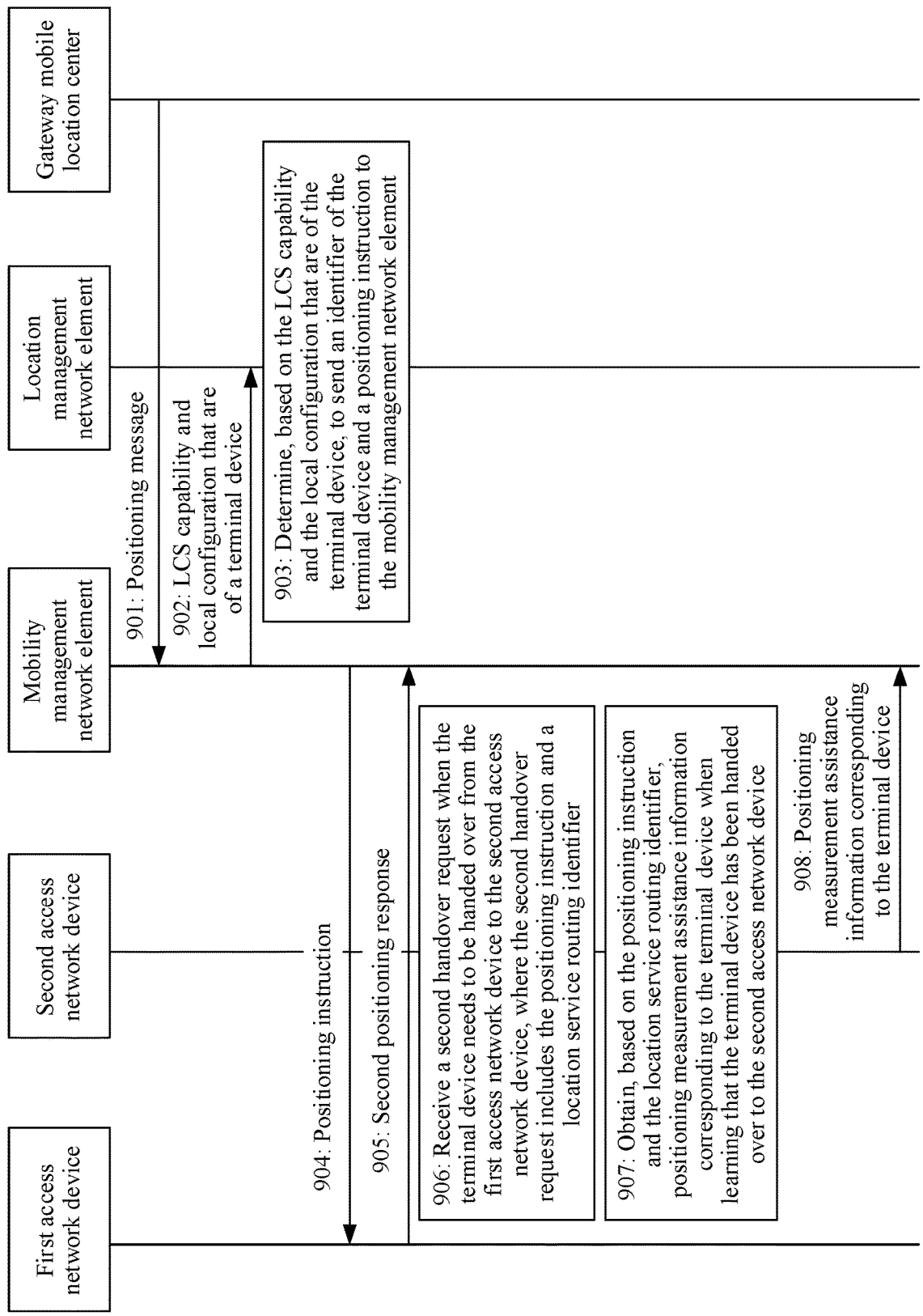
FIG. 9 is a schematic diagram of yet another positioning method according to an embodiment of this application.

Further, with reference to FIG. 5, the following describes a specific implementation of performing positioning measurement on a terminal device by using a second access network device. Specifically, FIG. 9 is a schematic diagram of yet another positioning method according to an embodiment of this application. A terminal device in FIG. 9 is the terminal device 50 in FIG. 5, and a first access network device and the second access network device in FIG. 9 may be access network devices 51 in FIG. 5. As shown in FIG. 9, the method includes but is not limited to the following steps.

901 and 902 are similar to steps 601 and 602 in FIG. 6. For related descriptions, refer to steps 601 and 602 in FIG. 6. Details are not described herein again.

903: A location management network element determines, based on an LCS capability and a local configuration that are of the terminal device, to send an identifier of the terminal device and a positioning instruction to a mobility management network element. Correspondingly, the mobility management network element receives the identifier of the terminal device and the positioning instruction that are sent by the location management network element.

The positioning instruction is sent by the location management network element to the first access network device for the first time.

Optionally, the positioning instruction is used to obtain positioning measurement assistance information. It may be understood that the positioning instruction may be an NRPPa message.

It should be noted that if the terminal device is located in a first cell or beam coverage of the first access network device, in other words, before the terminal device is handed over to the second access network device, the positioning instruction is the same as a second positioning request. In this case, the positioning instruction enables the terminal device to obtain the second positioning measurement assistance information. For the second positioning measurement assistance information, refer to the descriptions of the second positioning measurement assistance information in step 603 in FIG. 6. Details are not described herein again. If the terminal device is located in a second cell or beam coverage of the second access network device, in other words, the terminal device has been handed over to the second access network device, the positioning instruction is the same as a first positioning request. In this case, the positioning instruction enables the terminal device to obtain the first positioning measurement assistance information. For the first positioning measurement assistance information, refer to the descriptions of the first positioning measurement assistance information in step 602 in FIG. 6. Details are not described herein again.

904: The mobility management network element sends the positioning instruction and a location service routing identifier to the first access network device based on the identifier of the terminal device. Correspondingly, the access network device receives the positioning instruction and the location service routing identifier that are sent by the mobility management network element.

That the mobility management network element sends the positioning instruction and a location service routing identifier to the first access network device based on the identifier of the terminal device includes that the first mobility management network element sends a downlink N2 transport message to the first access network device, where the downlink N2 transport message includes the positioning instruction and the location service routing identifier.

Optionally, after the first access network device receives the positioning instruction and the location service routing identifier that are sent by the mobility management network element, the first access network device sends the positioning instruction to the terminal device. Correspondingly, the terminal device receives the positioning instruction sent by the first access network device. The terminal device obtains the second positioning measurement assistance information according to the positioning instruction. Then, the terminal device sends a second positioning response to the first access network device, where the second positioning response is the second positioning measurement assistance information.

905: The first access network device sends the second positioning response to the mobility management network element. Correspondingly, the mobility management network element receives the second positioning response sent by the first access network device.

It should be noted that, when the terminal device does not need to be handed over from the first access network device to the second access network device, in other words, when positioning measurement performed on the terminal device does not conflict with handover performed on the terminal device, subsequent steps are performed based on an existing solution. For details, refer to steps 407 to 412 in FIG. 4A and FIG. 4B. Details are not described herein again. When the terminal device needs to be handed over from the first access network device to the second access network device, the subsequent steps are steps 906 to 908.

Optionally, step 906 may be performed after step 903 and before step 904, or may be performed after step 904 and before step 905. This is not limited herein. Further, if step 906 is performed after step 903 and before step 904, steps 904 and 905 are not subsequently performed, and the subsequent steps are steps 906 to 908. If step 906 is performed after step 904 and before step 905, when the terminal device needs to be handed over from the first access network device to the second access network device, specific processing performed by the mobility management network element on the second positioning response is not limited herein.

906: The second access network device receives a second handover request when the terminal device needs to be handed over from the first access network device to the second access network device, where the second handover request includes the positioning instruction and the location service routing identifier.

For the location service routing identifier, refer to the descriptions of the location service routing identifier in step 806 in FIG. 8A and FIG. 8B. Details are not described herein again.

Optionally, that the second access network device receives a second handover request includes: The second access network device receives the second handover request sent by the first access network device, the first mobility management network element, or a second mobility management network element.

Optionally, the first access network device sends the second handover request to the second access network device when learning that the terminal device needs to be handed over from the first access network device to the second access network device. Correspondingly, the second access network device receives the second handover request sent by the first access network device.

Optionally, the first access network device sends the second handover request to the first mobility management network element when learning that the terminal device needs to be handed over from the first access network device to the second access network device. Correspondingly, the first mobility management network element receives the second handover request sent by the first access network device. Then, the first mobility management network element sends the second handover request to the second access network device based on an identifier of the second access network device. Correspondingly, the second access network device receives the second handover request sent by the first mobility management network element.

Optionally, the first access network device sends the second handover request to the first mobility management network element when learning that the terminal device needs to be handed over from the first access network device to the second access network device. Correspondingly, the first mobility management network element receives the second handover request sent by the first access network device. Next, the first mobility management network element selects the second mobility management network element based on the identifier of the second access network device. Then, the first mobility management network element sends the identifier of the second access network device, the positioning instruction, and the location service routing identifier to the second mobility management network element. Correspondingly, the second mobility management network element receives the identifier of the second access network device, the positioning instruction, and the location service routing identifier that are sent by the first mobility management network element. Finally, the second mobility management network element sends the second handover request to the second access network device based on the identifier of the second access network device. Correspondingly, the second access network device receives the second handover request sent by the second mobility management network element.

907: The second access network device obtains, based on the positioning instruction and the location service routing identifier, positioning measurement assistance information corresponding to the terminal device when learning that the terminal device has been handed over to the second access network device.

It may be understood that the second access network device learns that the terminal device has been handed over to the second access network device, and the terminal device is located in the second cell or the beam coverage of the second access network device. In this case, the positioning measurement assistance information corresponding to the terminal device is the second positioning measurement assistance information.

Further, the second access device may obtain the positioning measurement assistance information corresponding to the terminal device by performing signaling interaction with the terminal device. A specific signaling interaction manner is not limited in this application.

908: The second access network device sends, to the mobility management network element, the positioning measurement assistance information corresponding to the terminal device. Correspondingly, the mobility management network element receives the positioning measurement assistance information that is corresponding to the terminal device and that is sent by the second access network device.

It should be noted that subsequent steps after step 908 are the same as those in the existing solution. For details, refer to steps 408 to 412 in FIG. 4A and FIG. 4B. Details are not described herein again.

It can be learned that in the foregoing technical solution, when the terminal device needs to be handed over from the first access network device to the second access network device, the second handover request is received, where the second handover request includes the positioning instruction and the location service routing identifier, so that it is determined that positioning measurement performed on the terminal device conflicts with handover performed on the terminal device. Further, when it is learned that the handover is completed, the positioning measurement assistance information corresponding to the terminal device is obtained based on the positioning instruction and the location service routing identifier, to prepare for subsequently continuing to perform positioning measurement on the terminal device. In addition, a problem that positioning measurement performed on the terminal device fails when positioning measurement performed on the terminal device conflicts with handover performed on the terminal device is also avoided.

Figure 10:
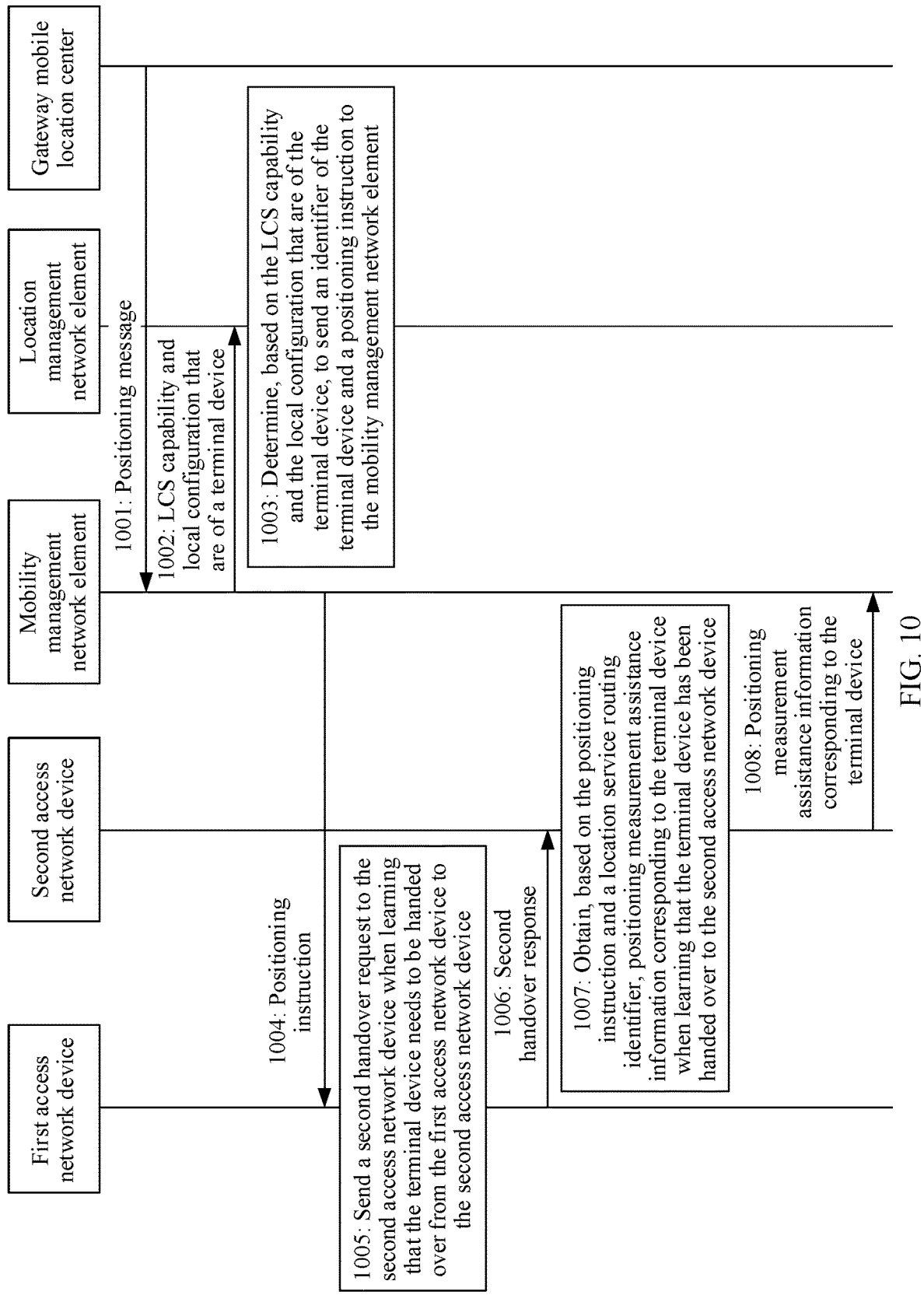
FIG. 10 is a schematic diagram of still yet another positioning method according to an embodiment of this application.

Further, with reference to FIG. 5, the following describes a specific implementation of performing positioning measurement on a terminal device by using a second access network device when there is an Xn interface between a first access network device and a second access network device. Specifically, FIG. 10 is a schematic diagram of still yet another positioning method according to an embodiment of this application. A first access network device and a second access network device in FIG. 10 may be access network devices 51 in FIG. 5, a first mobility management network element in FIG. 10 is a mobility management network element 52 in FIG. 5, and a location management network element in FIG. 10 is a location management network element 53 in FIG. 5. As shown in FIG. 10, the method includes but is not limited to the following steps.

1001 to 1004 are similar to steps 901 to 904 in FIG. 9. For related descriptions, refer to steps 901 to 904 in FIG. 9. Details are not described herein again.

It should be noted that for steps 1001 to 1004, with reference to steps 901 to 904, the mobility management network element in steps 901 to 904 is the first mobility management network element in steps 1001 to 1004.

Optionally, after 1004, the first access network device sends a second positioning response to the mobility management network element. Correspondingly, the mobility management network element receives the second positioning response sent by the first access network device. When the terminal device needs to be handed over from the first access network device to the second access network device, specific processing performed by the mobility management network element on the second positioning response is not limited herein.

1005: The first access network device sends a second handover request to the second access network device when learning that the terminal device needs to be handed over from the first access network device to the second access network device. Correspondingly, the second access network device receives the second handover request sent by the first access network device.

Optionally, the second handover request includes a positioning instruction and a location service routing identifier.

For the positioning instruction, refer to the descriptions of the positioning instruction in step 903 in FIG. 9. Details are not described herein again. For the location service routing identifier, refer to the descriptions of the location service routing identifier in step 906 in FIG. 9. Details are not described herein again.

It should be noted that there is no necessary execution sequence between step 1004 and step 1005 in this embodiment of this application. Step 1004 may be performed before step 1005. Alternatively, step 1004 may be performed before step 1005. Alternatively, step 1004 and step 1005 may be performed at the same time. This is not limited herein.

1006: The second access network device sends a second handover response (handover request ack) to the first access network device. Correspondingly, the first access network device receives the second handover response sent by the second access network device.

Optionally, the second handover response indicates the first access network device to perform handover.

1007: The second access network device obtains, based on the positioning instruction and the location service routing identifier, positioning measurement assistance information corresponding to the terminal device when learning that the terminal device has been handed over to the second access network device.

For the positioning measurement assistance information corresponding to the terminal device, refer to the descriptions of the positioning measurement assistance information corresponding to the terminal device in step 907 in FIG. 9. Details are not described herein again.

It should be noted that there is no necessary execution sequence between step 1006 and step 1007 in this embodiment of this application. Step 1006 may be performed before step 1007. Alternatively, step 1006 may be performed before step 1007. Alternatively, step 1006 and step 1007 may be performed at the same time. This is not limited herein.

1008: The second access network device sends, to the first mobility management network element, the positioning measurement assistance information corresponding to the terminal device. Correspondingly, the first mobility management network element receives the positioning measurement assistance information that is corresponding to the terminal device and that is sent by the second access network device.

The positioning measurement assistance information corresponding to the terminal device is first positioning measurement assistance information. For the first positioning measurement assistance information, refer to the descriptions of the first positioning measurement assistance information in step 602 in FIG. 6. Details are not described herein again.

In addition, for subsequent steps after step 1008, refer to step 407 to step 412 in FIG. 4A and FIG. 4B. Details are not described herein again.

It can be learned that in the foregoing technical solution, the second handover request sent by the first access network device is received, where the second handover request includes the positioning instruction and the location service routing identifier such that it is determined that positioning measurement performed on the terminal device conflicts with handover performed on the terminal device. Further, when it is learned that the handover is completed, the positioning measurement assistance information corresponding to the terminal device is obtained based on the positioning instruction and the location service routing identifier, to prepare for subsequently continuing to perform positioning measurement on the terminal device. In addition, a problem that positioning measurement performed on the terminal device fails when positioning measurement performed on the terminal device conflicts with handover performed on the terminal device is also avoided.

In a possible implementation, the method further includes that the second access network device sends a path switch request to the first mobility management network element. For the path switch request, refer to the descriptions of the path switch request in step 704 in FIG. 7. Details are not described herein again.

In a possible implementation, the method further includes that the first mobility management network element sends a path switch response to the second access network device. Correspondingly, the second access network device receives the path switch response sent by the first mobility management network element. For the path switch response, refer to the descriptions of the path switch response in step 705 in FIG. 7. Details are not described herein again.

It can be learned that in the foregoing technical solution, the first mobility management network element is notified that a device that provides a service for the terminal device has become the second access network device.

Figure 11A:
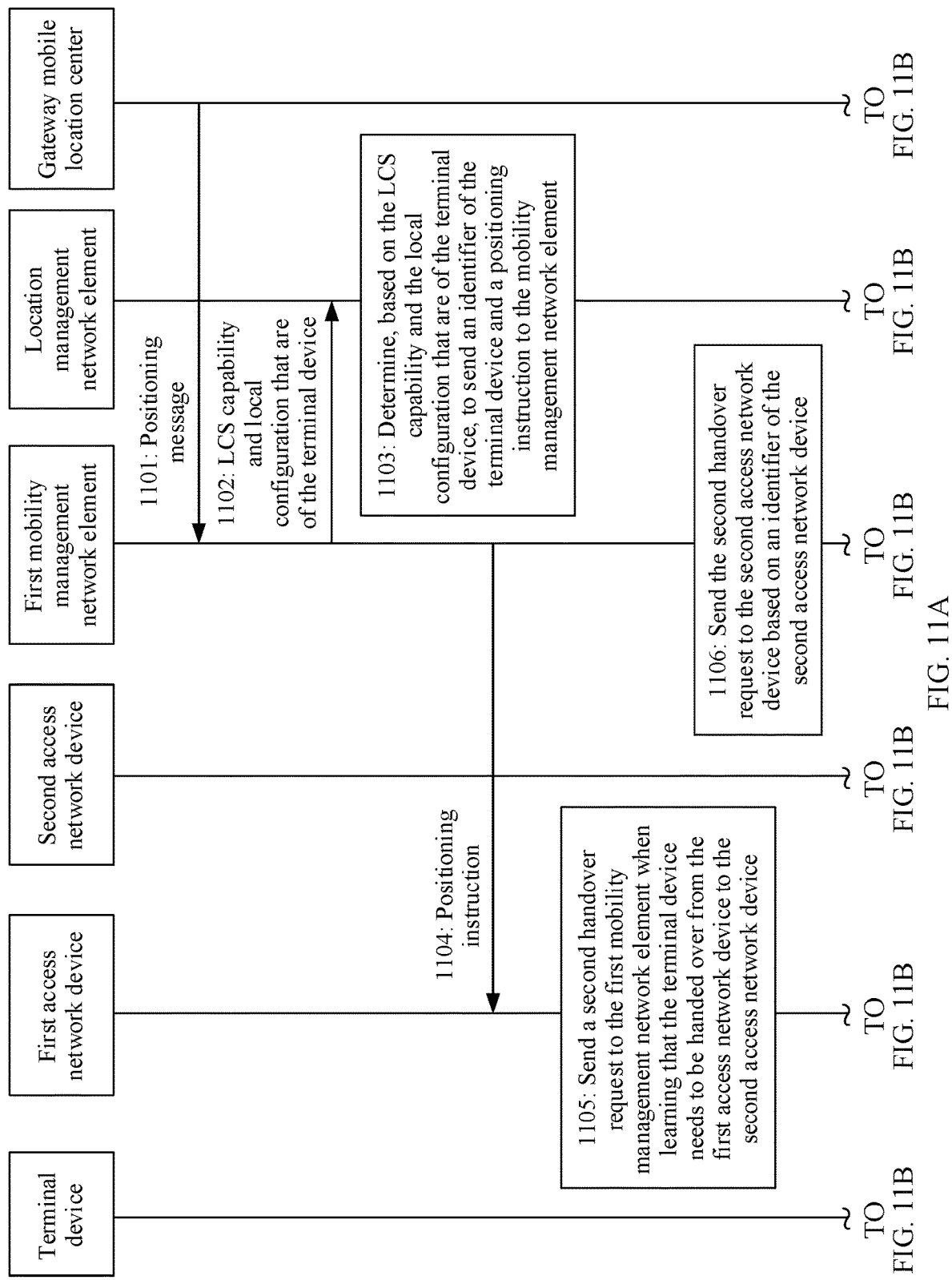

Further, with reference to FIG. 5, the following describes a specific implementation of performing positioning measurement on a terminal device through interaction between a second access network device and a first mobility management network element when there is no Xn interface between a first access network device and the second access network device. Specifically, FIG. 11A and FIG. 11B are a schematic diagram of a further positioning method according to an embodiment of this application. A first access network device and a second access network device in FIG. 11A and FIG. 11B may be access network devices 51 in FIG. 5, a first mobility management network element in FIG. 11A and FIG. 11B is a mobility management network element 52 in FIG. 5, and a location management network element in FIG. 11A and FIG. 11B is a location management network element 53 in FIG. 5. As shown in FIG. 11A and FIG. 11B, the method includes but is not limited to the following steps.

1101 to 1104 are similar to steps 901 to 904 in FIG. 9. For related descriptions, refer to steps 901 to 904 in FIG. 9. Details are not described herein again.

It should be noted that for steps 1101 to 1104, with reference to steps 901 to 904, the mobility management network element in steps 901 to 904 is the first mobility management network element in steps 1101 to 1104.

Optionally, after 1104, the first access network device sends a second positioning response to the mobility management network element. Correspondingly, the mobility management network element receives the second positioning response sent by the first access network device. When the terminal device needs to be handed over from the first access network device to the second access network device, specific processing performed by the mobility management network element on the second positioning response is not limited herein.

1105: The first access network device sends a second handover request to the first mobility management network element when learning that the terminal device needs to be handed over from the first access network device to the second access network device. Correspondingly, the first mobility management network element receives the second handover request sent by the first access network device.

The second handover request includes a positioning instruction and a location service routing identifier. The positioning instruction and the location service routing identifier may be newly added information elements in the second handover request, or may be newly added sub-elements in a source to target transport container information element in the second handover request. This is not limited herein.

For the positioning instruction, refer to the descriptions of the positioning instruction in step 903 in FIG. 9. Details are not described herein again. For the location service routing identifier, refer to the descriptions of the location service routing identifier in step 906 in FIG. 9. Details are not described herein again.

It should be noted that there is no necessary execution sequence between step 1104 and step 1105 in this embodiment of this application. Step 1104 may be performed before step 1105. Alternatively, step 1104 may be performed before step 1105. Alternatively, step 1104 and step 1105 may be performed at the same time. This is not limited herein.

It may be understood that if the first access network device sends the second handover request to the first mobility management network element, the second handover request may further include an identifier of the second access network device. The second access network device is a neighboring access network device whose signal quality is highest after the first access network device performs signal measurement.

1106: The first mobility management network element sends the second handover request to the second access network device based on the identifier of the second access network device. Correspondingly, the second access network device receives the second handover request sent by the first mobility management network element.

Optionally, the first mobility management network element sends the second handover request to the second access network device based on the identifier of the second access network device, where the second handover request requests the second access network device to allocate a resource to the terminal device.

When the second access network device receives the second handover request sent by the first mobility management network element, the second access network device allocates the resource to the terminal device based on the second handover request.

1107: The second access network device sends a second handover response to the first mobility management network element. Correspondingly, the first mobility management network element receives the second handover response sent by the second access network device.

The second handover response indicates that resource allocation is completed.

1108: The first mobility management network element sends a handover request 3 to the first access network device. Correspondingly, the first access network device receives the handover request 3 sent by the first mobility management network element.

The handover request 3 enables the first access network device to perform handover.

Optionally, the handover request 3 is used to notify the terminal device that the terminal device needs to be handed over to the second access network device. After receiving the handover request 3 sent by the first access network device, the terminal device performs handover based on the handover request 3. After the handover is completed, the terminal device sends a handover notification to the second access network device. The handover notification indicates that the terminal device has been handed over to the second access network device.

1109: The first access network device sends the handover request 3 to the terminal device. Correspondingly, the terminal device receives the handover request 3 sent by the first access network device.

1110 is similar to step 814 in FIG. 8A and FIG. 8B. For related descriptions, refer to step 814 in FIG. 8A and FIG. 8B. Details are not described herein again.

1111: The second access network device obtains, based on the positioning instruction and the location service routing identifier, positioning measurement assistance information corresponding to the terminal device when learning, based on the handover notification, that the terminal device has been handed over to the second access network device.

The positioning measurement assistance information corresponding to the terminal device is first positioning measurement assistance information. For the first positioning measurement assistance information, refer to the descriptions of the first positioning measurement assistance information in step 602 in FIG. 6. Details are not described herein again.

1112: The second access network device sends, to the first mobility management network element, the positioning measurement assistance information corresponding to the terminal device. Correspondingly, the first mobility management network element receives the positioning measurement assistance information that is corresponding to the terminal device and that is sent by the second access network device.

In addition, steps after step 1112 are the same as those in an existing solution. For details, refer to steps 408 to 412 in FIG. 4A and FIG. 4B. Details are not described herein again.

It can be learned that in the foregoing technical solution, the second handover request sent by the first mobility management network element is received, where the second handover request includes the positioning instruction and the location service routing identifier, so that it is determined that positioning measurement performed on the terminal device conflicts with handover performed on the terminal device. Further, when it is learned that the terminal device has been handed over to the second access network device, the positioning measurement assistance information corresponding to the terminal device is obtained based on the positioning instruction and the location service routing identifier, to prepare for subsequently continuing to perform positioning measurement on the terminal device. In addition, a problem that positioning measurement performed on the terminal device fails when positioning measurement performed on the terminal device conflicts with handover performed on the terminal device is also avoided.

Figure 12A:
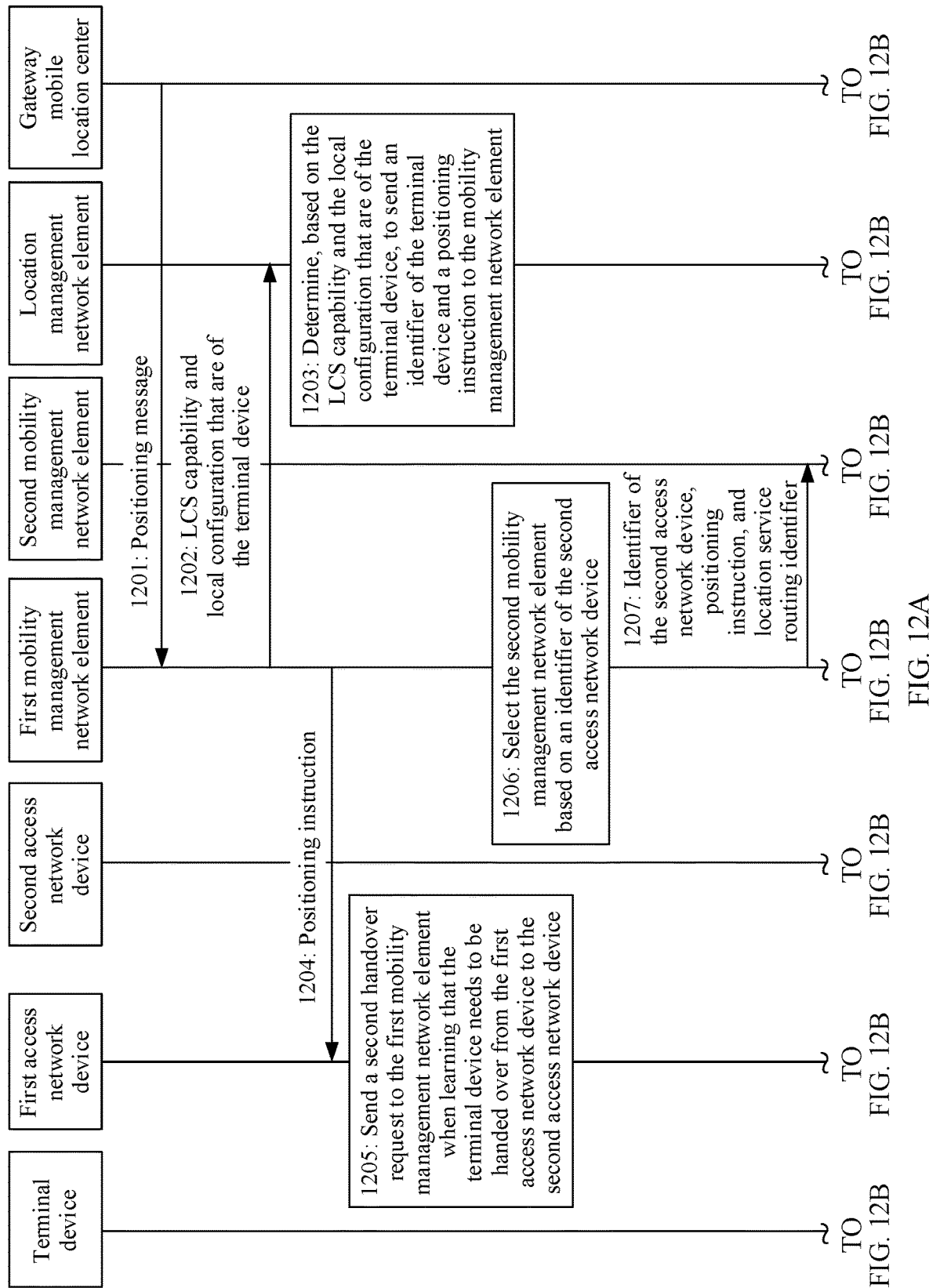

Further, with reference to FIG. 5, the following describes a specific implementation of performing positioning measurement on a terminal device through interaction between a second access network device and a second mobility management network element when there is no Xn interface between a first access network device and the second access network device. Further, FIG. 12A and FIG. 12B are a schematic diagram of a still further positioning method according to an embodiment of this application. A first access network device and a second access network device in FIG. 12A and FIG. 12B may be access network devices 51 in FIG. 5, and a first mobility management network element and a second mobility management network element in FIG. 12A and FIG. 12B are mobility management network elements 52 in FIG. 5. As shown in FIG. 12A and FIG. 12B, the method includes but is not limited to the following steps.

1201 to 1205 are similar to steps 1101 to 1105 in FIG. 11A and FIG. 11B. For related descriptions, refer to steps 1101 to 1105 in FIG. 11A and FIG. 11B. Details are not described herein again.

Optionally, after 1204, the first access network device sends a second positioning response to the mobility management network elements. Correspondingly, the mobility management network elements receive the second positioning response sent by the first access network device. When the terminal device needs to be handed over from the first access network device to the second access network device, specific processing performed by the mobility management network element on the second positioning response is not limited herein.

It may be understood that the first mobility management network element may determine, based on an identifier of the second access network device, whether being connected to the second access network device. If the first mobility management network element is not connected to the second access network device, steps 1206 to 1215 are performed; or if the first mobility management network element is connected to the second access network device, refer to steps 1106 to 1112 in FIG. 11A and FIG. 11B. Details are not described herein again.

1206: The first mobility management network element selects the second mobility management network element based on the identifier of the second access network device.

1207: The first mobility management network element sends the identifier of the second access network device, a positioning instruction, and a location service routing identifier to the second mobility management network element. Correspondingly, the second mobility management network element receives the identifier of the second access network device, the positioning instruction, and the location service routing identifier that are sent by the first mobility management network element.

The first mobility management network element may further send a second positioning context to the second mobility management network element. Correspondingly, the second mobility management network element receives the second positioning context sent by the first mobility management network element.

The second positioning context is determined after the first mobility management network element receives a positioning message from a gateway mobile location center, and the positioning second context enables the second mobility management network element to send the positioning instruction and the location service routing identifier to the second access network device. For the positioning message, refer to the descriptions of the positioning message in step 601 in FIG. 6. Details are not described herein again.

The second positioning context includes at least one of a location service correlation identifier, address information of a location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, and a supported geographical area description shape. It may be understood that the second positioning context may include one or any combination of the location service correlation identifier, the address information of the location management network element, the identifier of the location management network element, the address information of the gateway mobile location center, the callback address of location information of the terminal device, the N1N2 notify subscription identifier, the N2 notify subscription identifier, the location service client type, the location service type, the location service priority, the location quality of service, and the supported geographical area description shape. This is not limited herein.

Further, for the location service correlation identifier, refer to the descriptions of the location service correlation identifier in step 806 in FIG. 8A and FIG. 8B. Details are not described herein again. For the location service routing identifier, refer to the descriptions of the location service routing identifier in step 806 in FIG. 8A and FIG. 8B. Details are not described herein again. For the address information of the location management network element, refer to the address information of the location management network element in step 602 in FIG. 6. Details are not described herein again. For the address information of the gateway mobile location center, refer to the address information of the gateway mobile location center in step 602 in FIG. 6. Details are not described herein again. For the N1N2 notify subscription identifier, the N2 notify subscription identifier, the location service client type, the location service type, the location service priority, the location quality of service, and the supported geographical area description shape, refer to the descriptions of the N1N2 notify subscription identifier, the N2 notify subscription identifier, the location service client type, the location service type, the location service priority, the location quality of service, and the supported geographical area description shape in step 806 in FIG. 8A and FIG. 8B. Details are not described herein again.

It should be noted that the second positioning context does not include a location service suspension identifier.

Optionally, the first mobility management network element may send a second forward relocation request to the second mobility management network element, where the second forward relocation request includes the second positioning context, the location service routing identifier, the positioning instruction, and the identifier of the second access network device. Further, the location service routing identifier and the positioning instruction are newly added information elements in the second forward relocation request, or may be newly added sub-elements in a source to target transport container information element in the second forward relocation request. This is not limited herein.

1208: The second mobility management network element sends a second handover request to the second access network device based on the identifier of the second access network device. Correspondingly, the second access network device receives the second handover request sent by the second mobility management network element.

The second handover request includes the positioning instruction and the location service routing identifier. The positioning instruction and the location service routing identifier may be newly added information elements in the second handover request, or may be newly added sub-elements in a source to target transport container information element in the second handover request. This is not limited herein.

Optionally, the second mobility management network element sends the second handover request to the second access network device based on the identifier of the second access network device, where the second handover request requests the second access network device to allocate a resource to the terminal device.

When the second access network device receives the second handover request sent by the second mobility management network element, the second access network device allocates the resource to the terminal device based on the second handover request.

1209: The second access network device sends a second handover response to the second mobility management network element. Correspondingly, the second mobility management network element receives the second handover response sent by the second access network device.

The second handover response indicates that resource allocation is completed.

1210: The second mobility management network element sends a second forward relocation response to the first mobility management network element. Correspondingly, the first mobility management network element receives the first forward relocation response sent by the second mobility management network element.

The second forward relocation response indicates that a mobility management network element serving the terminal device has been handed over to the second mobility management network element.

1211 to 1213 are similar to steps 811 to 813 in FIG. 8A and FIG. 8B. For related descriptions, refer to steps 811 to 813 in FIG. 8A and FIG. 8B. Details are not described herein again.

Optionally, after step 1213, the second access network device sends a handover notification to the second mobility management network element. Correspondingly, the second mobility management network element receives the handover notification sent by the second access network device.

The handover notification indicates that the terminal device has been handed over to the second access network device.

1214: The second access network device obtains, based on the positioning instruction and the location service routing identifier, positioning measurement assistance information corresponding to the terminal device when learning, based on the handover notification, that the terminal device has been handed over to the second access network device.

The positioning measurement assistance information corresponding to the terminal device is first positioning measurement assistance information. For the first positioning measurement assistance information, refer to the descriptions of the first positioning measurement assistance information in step 602 in FIG. 6. Details are not described herein again.

It should be noted that in this application, there is no necessary execution sequence between step 1210 and step 1214 in this embodiment of this application. Step 1210 may be performed before step 1214. Alternatively, step 1210 may be performed before step 1214. Alternatively, step 1210 and step 1214 may be performed at the same time. This is not limited herein.

Optionally, after step 1214 and before step 1215, the second mobility management network element sends the location service correlation identifier and the location service routing identifier to the location management network element such that the location management network element learns that the second mobility management network element is an authorized network element that provides a service for the terminal device or that the terminal device has been handed over from the first mobility management network element to the second mobility management network element.

Optionally, that the second mobility management network element sends the location service correlation identifier and the location service routing identifier to the location management network element includes: The second mobility management network element sends the location service correlation identifier and the location service routing identifier to the location management network element based on the address information of the location management network element.

Optionally, that the second mobility management network element sends the location service correlation identifier and the location service routing identifier to the location management network element includes: The second mobility management network element sends an Nlmf_location_updatelocation request to the location management network element based on the address information of the location management network element, where the Nlmf_location_updatelocation request includes the location service correlation identifier and the location service routing identifier.

For the location service correlation identifier, refer to the descriptions of the location service correlation identifier in step 806 in FIG. 8A and FIG. 8B. Details are not described herein again. For the location service routing identifier, refer to the descriptions of the location service routing identifier in step 806 in FIG. 8A and FIG. 8B. Details are not described herein again.

1215: The second access network device sends, to the second mobility management network element, the positioning measurement assistance information corresponding to the terminal device. Correspondingly, the second mobility management network element receives the positioning measurement assistance information that is corresponding to the terminal device and that is sent by the second access network device.

In addition, steps after step 1215 are the same as those in an existing solution. For details, refer to steps 408 to 412 in FIG. 4A and FIG. 4B. Details are not described herein again.

It can be learned that in the foregoing technical solution, the positioning instruction and the location service routing identifier that are sent by the second mobility management network element are received, so that it is determined that positioning measurement performed on the terminal device conflicts with handover performed on the terminal device. Further, when it is learned that the handover is completed, the positioning measurement assistance information corresponding to the terminal device is obtained based on the positioning instruction and the location service routing identifier, to prepare for subsequently continuing to perform positioning measurement on the terminal device. In addition, a problem that positioning measurement performed on the terminal device fails when positioning measurement performed on the terminal device conflicts with handover performed on the terminal device is also avoided.

In addition, in a possible implementation, after steps 601 to 603 in FIG. 6 are performed, the first mobility management network element learns that the terminal device needs to be handed over from the first access network device to the second access network device, and sends a second positioning request to the second access network device after learning that the terminal device has been handed over to the second access network device.

For the second positioning request, refer to the descriptions of the second positioning request in step 603 in FIG. 6. Details are not described herein again.

Optionally, for that the first mobility management network element learns that the terminal device needs to be handed over from the first access network device to the second access network device, refer to related descriptions in FIG. 6 to FIG. 8A and FIG. 8B. Details are not described herein again. For that the first mobility management network element learns that the terminal device has been handed over to the second access network device, refer to related descriptions in FIG. 6 to FIG. 8A and FIG. 8B. Details are not described herein again.

It can be learned that in the foregoing technical solution, sending of the second positioning request to the second access network device is suspended when positioning measurement performed on the terminal device conflicts with handover performed on the terminal device, to avoid a problem that positioning measurement performed on the terminal device fails when positioning measurement performed on the terminal device conflicts with handover performed on the terminal device. In addition, when it is learned that the terminal device has been handed over to the second access network device, the second positioning request is sent to the second access network device such that positioning measurement continues to be performed on the terminal device.

The foregoing mainly describes the solutions provided in this application from a perspective of interaction between the network elements. It may be understood that, to implement the foregoing functions, each network element includes a corresponding hardware structure and/or software module for executing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the mobility management network element, the location management network element, the first access network device, a second access network device, or another network device may be divided into functional modules based on the foregoing method examples. For example, the functional modules may be divided based on functions, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 13:
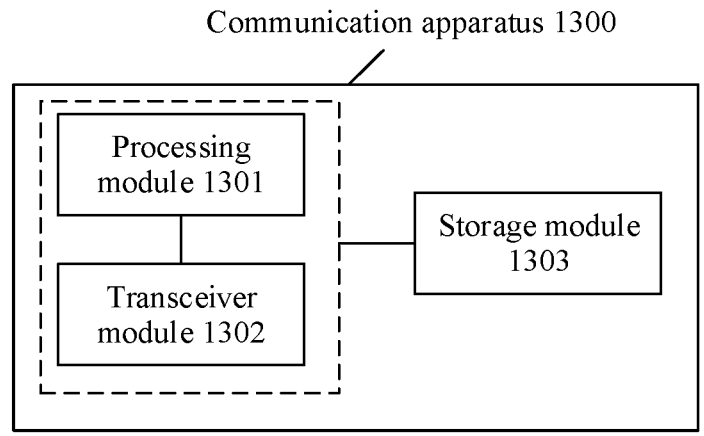
FIG. 13 is a schematic diagram of a structure of a communication apparatus according to an embodiment of this application.

When an integrated unit is used, FIG. 13 is a schematic diagram of a structure of a communication apparatus according to an embodiment of this application. The communication apparatus 1300 may be applied to the methods shown in FIG. 6 to FIG. 8A and FIG. 8B. As shown in FIG. 13, the communication apparatus 1300 includes a processing module 1301 and a transceiver module 1302. The processing module 1301 may be one or more processors, and the transceiver module 1302 may be a transceiver or a communication interface. The communication apparatus may be configured to implement the mobility management network element, the location management network element, the first access network device, or the second access network device in any one of the foregoing method embodiments, or configured to implement a function of a network element in any one of the foregoing method embodiments. For example, the communication apparatus may be an AMF network element or an LMF network element in a core network, or may be a first access network device or a second access network device. The network element or function may be a network element in a hardware device, a software function running on dedicated hardware, or a virtualized function instantiated on a platform (for example, a cloud platform). Optionally, the communication apparatus 1300 may further include a storage module 1303, configured to store program code and data that are of the communication apparatus 1300.

In an example, when the communication apparatus is used as a mobility management network element or a chip used in the mobility management network element, steps performed by the mobility management network element in the foregoing method embodiments are performed. The transceiver module 1302 is configured to support communication with a location management network element, a first access network device, a second access network device, a gateway mobile location center, and the like, and specifically perform sending and/or receiving actions performed by the mobility management network element in FIG. 6 to FIG. 12A and FIG. 12B, for example, support the mobility management network element in performing one or more of step 602, step 705, and step 806, and/or is configured to perform another process of the technology described in this specification. The processing module 1301 may be configured to support the communication apparatus 1300 in performing a processing action in the foregoing method embodiments, for example, support the mobility management network element in performing step 805, and/or is configured to perform another process of the technology described in this specification.

In a possible implementation, details are as follows. The processing module 1301 is configured to learn that a terminal device needs to be handed over from the first access network device to the second access network device, and learn that the terminal device has been handed over to the second access network device; and the transceiver module 1302 is configured to send a first message to a location management network element, where the first message indicates to suspend positioning measurement on the terminal device; and send a second message to the location management network element such that the location management network element sends a first positioning request, and the first positioning request requests to perform positioning measurement on the terminal device.

For the first message, refer to the descriptions of the first message in FIG. 6 to FIG. 8A and FIG. 8B. Details are not described herein again.

For the second message, refer to the descriptions of the second message in FIG. 6 to FIG. 8A and FIG. 8B. Details are not described herein again.

For the first positioning request, refer to the descriptions of the first positioning request in FIG. 6 to FIG. 8A and FIG. 8B. Details are not described herein again.

It can be learned that in the foregoing technical solution, when it is learned that the terminal device needs to be handed over from the first access network device to the second access network device, the first message is sent to the location management network element, so that the positioning measurement on the terminal device is suspended. This avoids a problem that positioning measurement performed on the terminal device fails when positioning measurement performed on the terminal device conflicts with handover performed on the terminal device. Further, when it is learned that the terminal device has been handed over to the second access network device, the second message is sent to the location management network element, so that positioning measurement continues to be performed on the terminal device when the handover is completed.

In a possible implementation, if the mobility management network element is a first mobility management network element, before sending the first message to the location management network element, the transceiver module 1302 is further configured to receive a second positioning request, where the second positioning request requests to perform positioning measurement on the terminal device; and receive a first handover request.

For the second positioning request, refer to the descriptions of the second positioning request in FIG. 6. Details are not described herein again.

For the first handover request, refer to the descriptions of the first handover request in FIG. 7 or FIG. 8A and FIG. 8B. Details are not described herein again.

It can be learned that in the foregoing technical solution, the second positioning request and the first handover request are received, to determine that positioning measurement performed on the terminal device conflicts with handover performed on the terminal device such as to prepare for subsequent suspension of the positioning measurement on the terminal device.

In a possible implementation, when receiving the first handover request, the transceiver module 1302 is configured to receive the first handover request sent by the first access network device, or receive a path switch request sent by the second access network device.

For the first handover request, refer to the descriptions of the first handover request in FIG. 7 or FIG. 8A and FIG. 8B. Details are not described herein again.

For the path switch request, refer to the descriptions of the path switch request in FIG. 7. Details are not described herein again.

It can be learned that in the foregoing technical solution, the handover request is obtained in a plurality of manners, to prepare for subsequently determining that positioning measurement performed on the terminal device conflicts with handover performed on the terminal device.

In a possible implementation, the first handover request includes an identifier of the second access network device, the processing module 1301 is further configured to select a second mobility management network element based on the identifier of the second access network device, where the first mobility management network element is a source mobility management network element, and the second mobility management network element is a target mobility management network element; and the transceiver module 1302 is further configured to send a first positioning context to the second mobility management network element, where the first positioning context is determined after the first mobility management network element receives a positioning message from the gateway mobile location center.

For the first positioning context, refer to the descriptions of the first positioning context in FIG. 8A and FIG. 8B. Details are not described herein again.

It can be learned that in the foregoing technical solution, when determining that there is no connection to the second access network device, the first mobility management network element selects a new mobility management network element, and sends positioning related information to the new mobility management network element. Therefore, the new mobility management network element may implement the positioning measurement on the terminal device based on the positioning related information, to implement the positioning measurement on the terminal device when the mobility management network element changes.

In a possible implementation, the first positioning context includes at least one of the following: a location service correlation identifier, a location service routing identifier, address information of the location management network element, an identifier of the location management network element, address information of the gateway mobile location center, and a callback address of location information of the terminal device.

For the location service correlation identifier, refer to the descriptions of the location service correlation identifier in FIG. 8A and FIG. 8B. Details are not described herein again. For the location service routing identifier, refer to the descriptions of the location service routing identifier in FIG. 8A and FIG. 8B. Details are not described herein again. For the address information of the location management network element, refer to the address information of the location management network element in FIG. 6. Details are not described herein again. For the address information of the gateway mobile location center, refer to the address information of the gateway mobile location center in FIG. 6. Details are not described herein again.

It can be learned that in the foregoing technical solution, the positioning related information is sent to the new mobility management network element, so that the new mobility management network element can implement the positioning measurement on the terminal device based on the positioning related information, to implement the positioning measurement on the terminal device when the mobility management network element changes.

In a possible implementation, the first positioning context further includes a location service suspension identifier, and when the second mobility management network element sends the first message to the location management network element based on the first positioning context of the terminal device, the transceiver module 1302 is configured to send the first message to the location management network element based on the location service suspension identifier.

For the location service suspension identifier, refer to the descriptions of the location service suspension identifier in FIG. 8A and FIG. 8B. Details are not described herein again. For the first message, refer to the descriptions of the first message in FIG. 8A and FIG. 8B. Details are not described herein again.

It can be learned that in the foregoing technical solution, after the mobility management network element changes, the new mobility management network element may send the first message to the location management network element, to suspend the positioning measurement on the terminal device. This avoids a problem that positioning measurement performed on the terminal device fails when positioning measurement performed on the terminal device conflicts with handover performed on the terminal device.

In a possible implementation, the processing module 1301 is configured to learn that the terminal device needs to be handed over from the first access network device to the second access network device; and the transceiver module

1302 is configured to send a third message to the gateway mobile location center, where the third message enables the gateway mobile location center to stop a timer for waiting for a location response message, enables the gateway mobile location center to send a message requesting a location service client to defer returning location information, and enables the gateway mobile location center to enter a state of asynchronously waiting for the location information.

It can be learned that in the foregoing technical solution, when positioning measurement performed on the terminal device conflicts with handover performed on the terminal device, the timer for waiting for a location response message is stopped, to avoid a problem that the positioning measurement fails because the timer expires. In addition, the gateway mobile location center also enters the state of asynchronously waiting for the location information.

In an example, when the communication apparatus is used as a location management network element or a chip used in the location management network element, steps performed by the location management network element in the foregoing method embodiments are performed. The transceiver module 1302 is configured to support communication with a mobility management network element, and specifically perform sending and/or receiving actions performed by the location management network element in FIG. 6 to FIG. 12A and FIG. 12B, for example, support the location management network element in performing one or more of step 608 and step 903, and/or is configured to perform another process of the technology described in this specification. The processing module 1301 may be configured to support the communication apparatus 1300 in performing a processing action in the foregoing method embodiments, for example, support the mobility management network element in performing step 603, and/or is configured to perform another process of the technology described in this specification.

In a possible implementation, details are as follows: the transceiver module 1302 is configured to send a second positioning request to a first mobility management network element, where the second positioning request requests to perform positioning measurement on a terminal device; receive a first message when the terminal device needs to be handed over from a first access network device to a second access network device; the processing module 1301 is configured to suspend positioning measurement on the terminal device based on the first message; and the transceiver module 1302 is configured to: when the terminal device has been handed over to the second access network device, receive a second message, and send a first positioning request based on the second message, where the first positioning request requests to perform positioning measurement on the terminal device.

For the second positioning request, refer to the descriptions of the second positioning request in FIG. 6. Details are not described herein again.

For the first message, refer to the descriptions of the first message in FIG. 6 to FIG. 8A and FIG. 8B. Details are not described herein again.

For the second message, refer to the descriptions of the second message in FIG. 6 to FIG. 8A and FIG. 8B. Details are not described herein again.

For the first positioning request, refer to the descriptions of the first positioning request in FIG. 6. Details are not described herein again.

It can be learned that in the foregoing technical solution, when the terminal device needs to be handed over from the first access network device to the second access network device, the first message received, and the positioning measurement on the terminal device is suspended based on the first message, to avoid a problem that positioning measurement performed on the terminal device fails when positioning measurement performed on the terminal device conflicts with handover performed on the terminal device. In addition, when the terminal device has been handed over to the second access network device, the second message is received, and the first positioning request is sent based on the second message, so that positioning measurement continues to be performed on the terminal device when the handover is completed.

In a possible implementation, when receiving the first message, the transceiver module 1302 is configured to receive the first message sent by the first mobility management network element; or receive the first message sent by a second mobility management network element, where the first mobility management network element is a source mobility management network element, and the second mobility management network element is a target mobility management network element.

For the first message, refer to the descriptions of the first message in FIG. 6 to FIG. 8A and FIG. 8B. Details are not described herein again.

It can be learned that in the foregoing technical solution, the first message is obtained in a plurality of manners, to prepare for subsequently suspending the positioning measurement on the terminal device based on the first message.

In a possible implementation, when receiving the second message, the transceiver module is configured to receive the second message sent by the first mobility management network element; or receive the second message sent by the second mobility management network element, where the first mobility management network element is a source mobility management network element, and the second mobility management network element is a target mobility management network element.

For the second message, refer to the descriptions of the second message in FIG. 6 to FIG. 8A and FIG. 8B. Details are not described herein again.

It can be learned that in the foregoing technical solution, the first message is obtained in a plurality of manners, to prepare for subsequently suspending the positioning measurement on the terminal device based on the first message.

In a possible implementation, when sending the first positioning request based on the second message, the transceiver module is configured to: send the first positioning request to the first mobility management network element based on the second message; or send the first positioning request to the second mobility management network element based on the second message.

For the second message, refer to the descriptions of the second message in FIG. 6 to FIG. 8A and FIG. 8B. Details are not described herein again.

For the first positioning request, refer to the descriptions of the first positioning request in FIG. 6. Details are not described herein again.

It can be learned that in the foregoing technical solution, the second message is obtained in a plurality of manners, to prepare for subsequent sending of the first positioning request to continue to perform positioning measurement on the terminal device.

In a possible implementation, the transceiver module 1302 is further configured to receive a location service correlation identifier and a location service routing identifier that are sent by the second mobility management network element; and the processing module 1301 is further configured to learn, based on the location service correlation identifier and the location service routing identifier, that the second mobility management network element is an authorized network element that provides a service for the terminal device or that the terminal device has been handed over from the first mobility management network element to the second mobility management network element.

For the location service correlation identifier, refer to the descriptions of the location service correlation identifier in FIG. 8A and FIG. 8B. Details are not described herein again. For the location service routing identifier, refer to the descriptions of the location service routing identifier in FIG. 8A and FIG. 8B. Details are not described herein again.

It can be learned that in the foregoing technical solution, when the mobility management network element changes, the location management network element learns that the new mobility management network element is the authorized network element, to avoid a problem that the location management network element does not process information from the new mobility management network element. In addition, the location management network element instantly learns that the mobile network element that provides the service for the terminal device has changed.

In an example, when the communication apparatus is used as a second access network device or a chip used in the second access network device, steps performed by the second access network device in the foregoing method embodiments are performed. The transceiver module 1302 is configured to support communication with a mobility management network element, a first access network device, a terminal device, and the like, and specifically perform sending and/or receiving actions performed by the second access network device in FIG. 6 to FIG. 12A and FIG. 12B, for example, support the second access network device in performing one or more of step 704 and step 809, and/or is configured to perform another process of the technology described in this specification. The processing module 1301 may be configured to support the communication apparatus 1300 in performing a processing action in the foregoing method embodiments, for example, support the second access network device in performing step 1111, and/or is configured to perform another process of the technology described in this specification.

In a possible implementation, details are as follows: the transceiver module 1302 is configured to receive a second handover request when a terminal device needs to be handed over from the first access network device to the second access network device, where the second handover request includes a positioning instruction and a location service routing identifier, the positioning instruction is used to obtain positioning measurement assistance information, and the location service routing identifier is an identifier used to identify a current positioning measurement task that is of the positioned terminal device and that is performed between a first mobility management network element and the first access network device; the processing module 1301 is configured to obtain, based on the positioning instruction and the location service routing identifier, the positioning measurement assistance information corresponding to the terminal device when learning that the terminal device has been handed over to the second access network device; and the transceiver module 1302 is configured to send the positioning measurement assistance information corresponding to the terminal device.

For the positioning instruction, refer to the descriptions of the positioning instruction in FIG. 9. Details are not described herein again. For the location service routing identifier, refer to the descriptions of the location service routing identifier in FIG. 9. Details are not described herein again. For the positioning measurement assistance information corresponding to the terminal device, refer to the descriptions of the positioning measurement assistance information corresponding to the terminal device in FIG. 9. Details are not described herein again.

It can be learned that in the foregoing technical solution, when the terminal device needs to be handed over from the first access network device to the second access network device, the second handover request is received, where the second handover request includes the positioning instruction and the location service routing identifier such that it is determined that positioning measurement performed on the terminal device conflicts with handover performed on the terminal device. Further, when it is learned that the handover is completed, the positioning measurement assistance information corresponding to the terminal device is obtained based on the positioning instruction and the location service routing identifier, to prepare for subsequently continuing to perform positioning measurement on the terminal device. In addition, a problem that positioning measurement performed on the terminal device fails when positioning measurement performed on the terminal device conflicts with handover performed on the terminal device is also avoided.

In a possible implementation, when receiving the second handover request, the transceiver module 1302 is configured to receive the second handover request sent by the first access network device; receive the second handover request sent by the first mobility management network element; or receive the second handover request sent by a second mobility management network element, where the first mobility management network element is a source mobility management network element, and the second mobility management network element is a target mobility management network element.

For the second handover request, refer to the descriptions of the second handover request in FIG. 9 to FIG. 12A and FIG. 12B. Details are not described herein again.

It can be learned that in the foregoing technical solution, the second handover request is obtained in a plurality of manners, to prepare for determining that positioning measurement performed on the terminal device conflicts with handover performed on the terminal device.

In a possible implementation, when sending the positioning measurement assistance information corresponding to the terminal device, the transceiver module 1302 is configured to send, to the first mobility management network element, the positioning measurement assistance information corresponding to the terminal device; or send, to the second mobility management network element, the positioning measurement assistance information corresponding to the terminal device.

For the positioning measurement assistance information corresponding to the terminal device, refer to the descriptions of the positioning measurement assistance information corresponding to the terminal device in FIG. 9. Details are not described herein again.

It can be learned that in the foregoing technical solution, the positioning measurement assistance information corresponding to the terminal device is sent to the first mobility management network element or the second mobility management network element, to prepare for subsequently sending, by the first mobility management network element or the second mobility management network element, the positioning measurement assistance information corresponding to the terminal device to a location management network element.

In an example, when the communication apparatus is used as a first access network device or a chip used in the first access network device, steps performed by the first access network device in the foregoing method embodiments are performed. The transceiver module 1302 is configured to support communication with a mobility management network element, a second access network device, a terminal device, and the like, and specifically perform sending and/or receiving actions performed by the first access network device in FIG. 6 to FIG. 12A and FIG. 12B, for example, support the first access network device in performing one or more of step 604 and step 1109, and/or is configured to perform another process of the technology described in this specification. The processing module 1301 may be configured to support the communication apparatus 1300 in performing a processing action in the foregoing method embodiments, for example, support the first access network device in performing step 1005, and/or is configured to perform another process of the technology described in this specification.

In a possible implementation, details are as follows. The transceiver module 1302 is configured to receive a positioning instruction and a location service routing identifier from a first mobility management network element, where the positioning instruction is used to obtain positioning measurement assistance information, and the location service routing identifier is an identifier used to identify a current positioning measurement task that is of a positioned terminal device and that is performed between the first mobility management network element and the first access network device; the processing module 1301 is configured to learn that the terminal device needs to be handed over from the first access network device to the second access network device; and the transceiver module 1302 is configured to send a second handover request, where the second handover request includes the positioning instruction and the location service routing identifier.

For the positioning instruction, refer to the descriptions of the positioning instruction in FIG. 9. Details are not described herein again. For the location service routing identifier, refer to the descriptions of the location service routing identifier in FIG. 9. Details are not described herein again. For the positioning measurement assistance information corresponding to the terminal device, refer to the descriptions of the positioning measurement assistance information corresponding to the terminal device in FIG. 9. Details are not described herein again.

For the second handover request, refer to the descriptions of the second handover request in FIG. 9 to FIG. 12A and FIG. 12B. Details are not described herein again.

It can be learned that in the foregoing technical solution, the positioning instruction and the location service routing identifier are received from the first mobility management network element, and it is learned that the terminal device prepares to be handed over from the first access network device to the second access network device, to determine that positioning measurement performed on the terminal device conflicts with handover performed on the terminal device. Further, the second handover request is sent, to prepare for subsequently obtaining the positioning measurement assistance information corresponding to the terminal device and continuing to perform positioning measurement on the terminal device. In addition, a problem that positioning measurement performed on the terminal device fails when positioning measurement performed on the terminal device conflicts with handover performed on the terminal device is also avoided.

In a possible implementation, when sending the second handover request, the transceiver module 1302 is configured to: send the second handover request to the second access network device; or send the second handover request via the first mobility management network element.

For the second handover request, refer to the descriptions of the second handover request in FIG. 9 to FIG. 12A and FIG. 12B. Details are not described herein again.

It can be learned that the second handover request is sent in a plurality of manners, to prepare for subsequently obtaining the positioning measurement assistance information corresponding to the terminal device and continuing to perform positioning measurement on the terminal device.

In an example, when the communication apparatus is used as a mobility management network element or a chip used in the mobility management network element, steps performed by the mobility management network element in the foregoing method embodiments are performed. The transceiver module 1302 is configured to support communication with a location management network element, a first access network device, a second access network device, a gateway mobile location center, and the like, and specifically perform sending and/or receiving actions performed by the mobility management network element in FIG. 6 to FIG. 12A and FIG. 12B, for example, support the mobility management network element in performing one or more of step 1106, step 1108, and step 1208, and/or is configured to perform another process of the technology described in this specification. The processing module 1301 may be configured to support the communication apparatus 1300 in performing a processing action in the foregoing method embodiments, for example, support the mobility management network element in performing step 1206, and/or is configured to perform another process of the technology described in this specification.

In a possible implementation, details are as follows: the transceiver module 1302 is configured to receive a positioning instruction and a location service routing identifier from the first access network device, where the positioning instruction is used to obtain positioning measurement assistance information, and the location service routing identifier is an identifier used to identify a current positioning measurement task that is of a positioned terminal device and that is performed between a first mobility management network element and the first access network device; and send a second handover request to the second access network device, where the second handover request includes the positioning instruction and the location service routing identifier.

For the positioning instruction, refer to the descriptions of the positioning instruction in FIG. 9. Details are not described herein again. For the location service routing identifier, refer to the descriptions of the location service routing identifier in FIG. 9. Details are not described herein again. For the positioning measurement assistance information corresponding to the terminal device, refer to the descriptions of the positioning measurement assistance information corresponding to the terminal device in FIG. 9. Details are not described herein again.

For the second handover request, refer to the descriptions of the second handover request in FIG. 9 to FIG. 12A and FIG. 12B. Details are not described herein again.

It can be learned that in the foregoing technical solution, the positioning instruction and the location service routing identifier are received from the first access network device, and the second handover request is sent to the second access network device, to prepare for subsequent obtaining of the positioning measurement assistance information corresponding to the terminal device, and continuing to perform positioning measurement on the terminal device.

In a possible implementation, the mobility management network element further includes the processing module 1301, and if the mobility management network element is the first mobility management network element, the first mobility management network element is a source mobility management network element, and the second handover request includes an identifier of the second access network device, the processing module 1301 is further configured to select a second mobility management network element based on the identifier of the second access network device, where the second mobility management network element is a target mobility management network element; and the transceiver module 1302 is further configured to send the positioning instruction, the location service routing identifier, and a second positioning context to the second mobility management network element, where the second positioning context is determined after the first mobility management network element receives a positioning message from the gateway mobile location center.

For the positioning instruction, refer to the descriptions of the positioning instruction in FIG. 9. Details are not described herein again. For the location service routing identifier, refer to the descriptions of the location service routing identifier in FIG. 9. Details are not described herein again. For the second positioning context, refer to the descriptions of the second positioning context in FIG. 12A and FIG. 12B. Details are not described herein again.

It can be learned that in the foregoing technical solution, when determining that there is no connection to the second access network device, the first mobility management network element selects a new mobility management network element, and sends positioning related information to the new mobility management network element. Therefore, the new mobility management network element may send the second handover request to the second access network device based on the positioning related information, to send the second handover request to the second access network device when the mobility management network element changes, and prepare for subsequently obtaining of the positioning measurement assistance information corresponding to the terminal device and continuing to perform positioning measurement on the terminal device.

In a possible implementation, the second positioning context includes at least one of a location service correlation identifier, address information of the location management network element, an identifier of the location management network element, address information of the gateway mobile location center, and a callback address of location information of the terminal device.

Further, for the location service correlation identifier, refer to the descriptions of the location service correlation identifier in FIG. 8A and FIG. 8B. Details are not described herein again. For the location service routing identifier, refer to the descriptions of the location service routing identifier in FIG. 8A and FIG. 8B. Details are not described herein again. For the address information of the location management network element, refer to the address information of the location management network element in FIG. 6. Details are not described herein again. For the address information of the gateway mobile location center, refer to the address information of the gateway mobile location center in FIG. 6. Details are not described herein again.

It can be learned that in the foregoing technical solution, the positioning related information is sent to the new mobility management network element such that the new mobility management network element may send the second handover request to the second access network device based on the positioning related information. In this way, the second handover request is sent to the second access network device when the mobility management network element changes, to prepare for subsequently obtaining of the positioning measurement assistance information corresponding to the terminal device and continuing to perform positioning measurement on the terminal device.

In a possible implementation, if the mobility management network element is the second mobility management network element and the second mobility management network element is a target mobility management network element, the transceiver module 1302 is further configured to send the location service correlation identifier and the location service routing identifier to the location management network element such that the location management network element learns that the second mobility management network element is an authorized network element that provides a service for the terminal device or that the terminal device has been handed over from the first mobility management network element to the second mobility management network element.

For the location service correlation identifier, refer to the descriptions of the location service correlation identifier in FIG. 8A and FIG. 8B. Details are not described herein again. For the location service routing identifier, refer to the descriptions of the location service routing identifier in FIG. 8A and FIG. 8B. Details are not described herein again.

It can be learned that in the foregoing technical solution, when the mobility management network element changes, the location management network element learns that the new mobility management network element is the authorized network element, to avoid a problem that the location management network element does not process information from the new mobility learns that the mobile network element that provides the service for the terminal device has changed.

In a possible implementation, when a mobility management network element, a location management network element, a second access network device, or a first access network device is a chip, the transceiver module 1302 may be an interface, a pin, a circuit, or the like. The interface may be configured to input to-be-processed data to a processor, and may output a processing result of the processor to the outside. During specific implementation, the interface may be a general-purpose input/output (GPIO) interface, and may be connected to a plurality of peripheral devices (for example, a liquid-crystal display (LCD), a camera, a radio frequency (RF) module, and an antenna). The interface is connected to the processor through a bus.

The processing module 1301 may be a processor. The processor may execute computer-executable instructions stored in a storage module, so that the chip performs the methods according to the embodiments in FIG. 6 to FIG. 12A and FIG. 12B.

Further, the processor may include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor may be an application-specific integrated circuit (ASIC) architecture, a microprocessor without interlocked pipeline stages (MIPS) architecture, an advanced reduced instruction set computing (RISC) machines (ARM) architecture, a network processor (NP) architecture, or the like. The processor may be a single-core or multi-core processor.

The storage module may be a storage module inside the chip, for example, a register or a cache. Alternatively, the storage module may be a storage module located outside the chip, for example, a read-only memory (ROM), another type of static storage device that can store static information and instructions, or a random-access memory (RAM).

It should be noted that a function corresponding to each of the processor and the interface may be implemented by using a hardware design, may be implemented by using a software design, or may be implemented by a combination of software and hardware. This is not limited herein.

Figure 14:
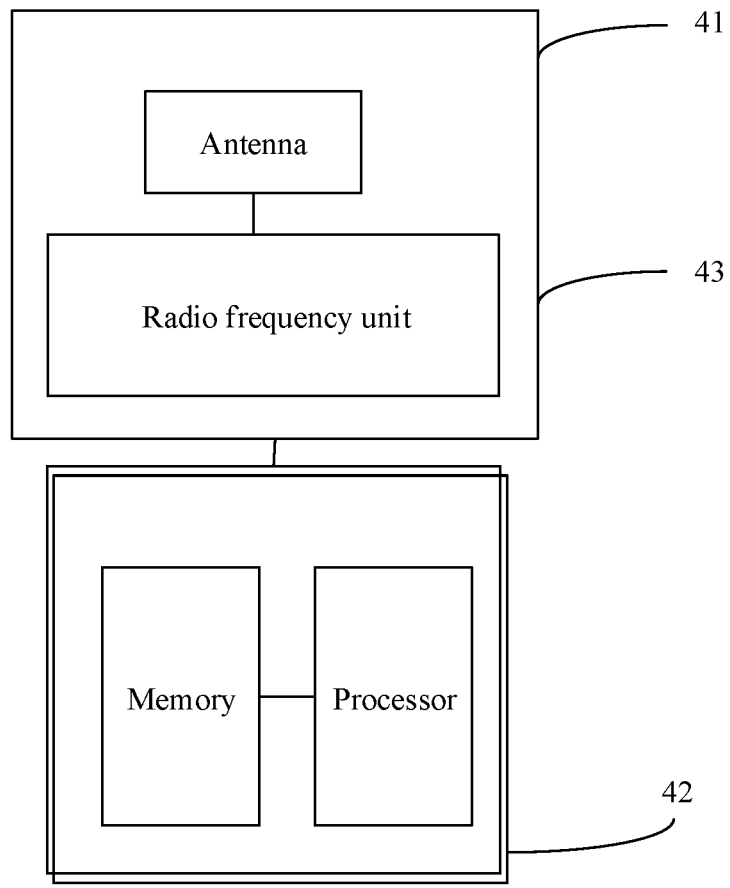
FIG. 14 is a schematic diagram of a simplified structure of a first access network device or a second access network device according to an embodiment of this application.

FIG. 14 is a schematic diagram of a simplified structure of a first access network device or a second access network device according to an embodiment of this application. The first access network device or the second access network device includes a part 42 and a part for radio frequency signal sending/receiving and conversion. The part for radio frequency signal sending/receiving and conversion further includes a receiving module 41 and a sending module 43 (which may also be collectively referred to as a transceiver module). The part for radio frequency signal sending/receiving and conversion is mainly configured to send/receive a radio frequency signal and perform conversion between the radio frequency signal and a baseband signal. The part 42 is mainly configured to perform baseband processing, control the access network device, and the like. The receiving module 41 may also be referred to as a receiver, a receiver circuit, or the like. The sending module 43 may also be referred to as a transmitter, a transmitter circuit, or the like. The part 42 is usually a control center of the access network device, may be usually referred to as a processing module, and is configured to control the first access network device or the second access network device to perform steps performed by the first access network device or the second access network device in FIG. 7 to FIG. 12A and FIG. 12B. For details, refer to the foregoing descriptions of the related parts.

The part 42 may include one or more boards. Each board may include one or more processors and one or more memories. The processor is configured to read and execute a program in the memory to implement a baseband processing function and control the access network device. If there are a plurality of boards, the boards may be interconnected to improve a processing capability. In an optional implementation, the plurality of boards may share one or more processors, the plurality of boards may share one or more memories, or the plurality of boards may share one or more processors at the same time.

For example, for the first access network device, the receiving module 41 is configured to perform a function of the access network device in step 1102 in the embodiment shown in FIG. 11A and FIG. 11B. For the second access network device, the receiving module 41 is configured to perform a function of the access network device in step 1206 in the embodiment shown in FIG. 12A and FIG. 12B.

An embodiment of this application further provides a mobility management network element, a location management network element, a second access network device, or a first access network device. The mobility management network element, the location management network element, the second access network device, or the first access network device is configured to perform the foregoing positioning method. All or a part of the foregoing communication may be implemented by using hardware or software.

Optionally, the mobility management network element, the location management network element, the second access network device, or the first access network device may be a chip or an integrated circuit during specific implementation.

Optionally, when a part or all of the positioning method in the foregoing embodiments is implemented by using software, the mobility management network element, the location management network element, the second access network device, or the first access network device includes at least one processor, configured to execute a program. When the program is executed, so that the mobility management network element, the location management network element, the second access network device, or the first access network device can implement the positioning method provided in the foregoing embodiments. The mobility management network element, the location management network element, the second access network device, or the first access network device may further include a memory, configured to store necessary programs. These related programs may be reloaded into the memory when the mobility management network element, the location management network element, the second access network device, or the first access network device is delivered from a factory, or may be reloaded into the memory when needed later.

Optionally, the memory may be a physically independent unit, or may be integrated with the processor.

Optionally, when a part or all of the positioning method in the foregoing embodiments is implemented by using software, the mobility management network element, the location management network element, the second access network device, or the first access network device may alternatively include only at least one processor. A memory configured to store a program is located outside the mobility management network element, the location management network element, the second access network device, or the first access network device. The processor is connected to the memory by using a circuit/wire, and is configured to read and execute the program stored in the memory.

Each processor may be a CPU, a NP, or a combination of the CPU and the NP.

Optionally, each processor may include a hardware chip. The hardware chip may be an ASIC, a PLD, or a combination thereof. The PLD may be a complex programmable logic device (CPLD), a field-programmable logic gate array (FPGA), generic array logic (GAL), or any combination thereof.

The memory may include a volatile memory, for example, a RAM. The memory may alternatively include a non-volatile memory, for example, a flash memory, a hard disk drive (HDD), or a solid-state drive (SSD). The memory may alternatively include a combination of the foregoing types of memories.

This application further provides a computer-readable storage medium. The computer-readable storage medium stores a computer program. When the computer program is run, the method according to any one of the possible implementations in FIG. 6 to FIG. 12A and FIG. 12B is implemented.

This application further provides a positioning system. The positioning system includes a mobility management network element, a first access network device, a second access network device, a location management network element, a gateway mobile location center, and a terminal device. The mobility management network element is configured to implement a function of the mobility management network element in any one of the possible implementations in FIG. 6 to FIG. 12A and FIG. 12B, the first access network device is configured to implement a function of the first access network device in any one of the possible implementations in FIG. 6 to FIG. 12A and FIG. 12B, the second access network device is configured to implement a function of the second access network device in any one of the possible implementations in FIG. 6 to FIG. 12A and FIG. 12B, the location management network element is configured to implement a function of the location management network element in any one of the possible implementations in FIG. 6 to FIG. 12A and FIG. 12B, the gateway mobile location center is configured to implement a function of the gateway mobile location center in any one of the possible implementations in FIG. 6 to FIG. 12A and FIG. 12B, and the terminal device is configured to implement a function of the terminal device in any one of the possible implementations in FIG. 6 to FIG. 12A and FIG. 12B. Details are not described herein again.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A first mobility management network element, comprising:
   a memory configured to store instructions;
   a processor coupled to the memory and configured to:
      make a first determination that a terminal device needs to be handed over from a first access network device to a second access network device, and
      make a second determination that the terminal device has been handed over to the second access network device; and
   a transceiver coupled to the processor and configured to:
      send, in response to the first determination, a first message to a location management network element, wherein the first message indicates to suspend a first positioning measurement on the terminal device; and
      send, in response to the second determination, a second message to the location management network element,
      wherein the second message prompts the location management network element to send a first positioning request to perform a second positioning measurement on the terminal device.

2. The first mobility management network element of claim 1, wherein the transceiver is further configured to:
   receive a second positioning request to perform a third positioning measurement on the terminal device; and
   receive a first handover request.

3. The first mobility management network element of claim 2, wherein the transceiver is further configured to receive the first handover request from the first access network device.

4. The first mobility management network element of claim 2, wherein the transceiver is further configured to receive a path switch request sent from the second access network device, wherein the path switch request comprises the first handover request.

5. The first mobility management network element of claim 2, wherein the first handover request comprises an identifier of the second access network device, wherein the transceiver is further configured to receive a positioning message from a gateway mobile location center, and wherein the processor is further configured to:
   select a second mobility management network element based on the identifier, wherein the first mobility management network element is a source mobility management network element, and wherein the second mobility management network element is a target mobility management network element; and
   determine, based on the positioning message, a first positioning context, and
   wherein the transceiver is further configured to send the first positioning context to the second mobility management network element.

6. The first mobility management network element of claim 5, wherein the first positioning context comprises at least one of a location service correlation identifier, a location service routing identifier, address information of the location management network element, an identifier of the location management network element, address information of the gateway mobile location center, a callback address of location information of the terminal device, an N1N2 notify subscription identifier, an N2 notify subscription identifier, a location service client type, a location service type, a location service priority, a location quality of service, or a supported geographical area description shape.

7. The first mobility management network element of claim 6, wherein the first positioning context further comprises a location service suspension identifier, and wherein the transceiver is further configured to send the first message to the location management network element based on the location service suspension identifier.

8. The first mobility management network element of claim 4, wherein the processor is further configured to determine that the terminal device needs to be handed over from the first access network device to the second access network device, and wherein the transceiver is further configured to send a third message to the gateway mobile location center, wherein the third message enables the gateway mobile location center to stop a timer for waiting for a location response message, enables the gateway mobile location center to send a message requesting a location service client to defer returning location information, and enables the gateway mobile location center to enter a state of asynchronously waiting for the location information.

9. A location management network element, comprising:
   a transceiver configured to:
      send a second positioning request to a first mobility management network element, wherein the second positioning request requests to perform positioning measurement on a terminal device; and
      receive a first message when the terminal device needs to be handed over from a first access network device to a second access network device; and
   a processor coupled to the transceiver and configured to suspend first positioning measurement on the terminal device based on the first message, wherein when the terminal device has been handed over to the second access network device, receive a second message, the transceiver is further configured to:
   receive a second message, and
     send a first positioning request based on the second message, wherein the first positioning request requests to perform second positioning measurement on the terminal device.

10. The location management network element of claim 9, wherein the transceiver is further configured to receive the first message from the first mobility management network element, and wherein the first mobility management network element is a source mobility management network element.

11. The location management network element of claim 9, wherein the transceiver is further configured to receive the first message from a second mobility management network element, and wherein the second mobility management network element is a target mobility management network element.

12. The location management network element of claim 9, wherein the transceiver is further configured to receive the second message from the first mobility management network element, wherein the first mobility management network element is a source mobility management network element.

13. The location management network element of claim 9, wherein the transceiver is further configured to receive the second message from the second mobility management network element, and wherein the second mobility management network element is a target mobility management network element.

14. The location management network element of claim 9, wherein the transceiver is further configured to send the first positioning request to the first mobility management network element based on the second message.

15. The location management network element of claim 9, wherein the transceiver is further configured to send the first positioning request to the second mobility management network element based on the second message.

16. The location management network element of claim 9, wherein the transceiver is further configured to receive a location service correlation identifier and a location service routing identifier from the second mobility management network element, and wherein the processor is further configured to determine, based on the location service correlation identifier and the location service routing identifier, that the second mobility management network element is an authorized network element that provides a service for the terminal device.

17. The location management network element of claim 9, wherein the transceiver is further configured to receive a location service correlation identifier and a location service routing identifier from the second mobility management network element, and wherein the processor is further configured to determine, based on the location service correlation identifier and the location service routing identifier, that the terminal device has been handed over from the first mobility management network element to the second mobility management network element.

18. A communication system, comprising:
   a first apparatus comprising a mobility management network element configured to:
     send a first message to a location management network element in response to a first determination that a terminal device needs to be handed over from a first access network device to a second access network device, wherein the first message indicates to suspend a first positioning measurement on the terminal device; and
     send a second message in response to a second determination that the terminal device has been handed over to the second access network device; and
   a second apparatus comprising a location management network element coupled to the mobility management network element and configured to:
     receive the second message; and
     send, to the mobility management network element and based on the second message, a first positioning request to perform a second positioning measurement on the terminal device.

19. The communication system of claim 18, wherein the mobility management network element is further configured to:
   receive a second positioning request to perform a third positioning measurement on the terminal device; and
   receive a first handover request.

20. The communication system of claim 18, wherein the mobility management network element is further configured to receive the first handover request from the first access network device.

* * * * *